United States Patent [19]

Lamprecht, Jr. et al.

[11] Patent Number: 5,467,433

[45] Date of Patent: Nov. 14, 1995

[54] LABEL PRINTING AND DATA COLLECTION PROGRAM GENERATOR

[75] Inventors: Dale E. Lamprecht, Jr.; Donald A. Morrison; Richard E. Schwabe, all of Dayton; Raymond D. Tavener, Kettering; Rex D. Watkins, Franklin, all of Ohio

[73] Assignee: Monarch Marking Systems, Inc., Dayton, Ohio

[21] Appl. No.: 869,253

[22] Filed: Apr. 15, 1992

[51] Int. Cl.$^6$ .................................................. G09F 3/08
[52] U.S. Cl. ........................................ 395/114; 395/117
[58] Field of Search ............................ 395/117, 114, 395/101, 115; 364/518, 523; 400/63

[56] References Cited

U.S. PATENT DOCUMENTS

| | | | |
|---|---|---|---|
| 4,939,674 | 7/1990 | Price et al. | 364/523 |
| 5,025,397 | 6/1991 | Susuki | 395/117 |
| 5,058,035 | 10/1991 | Nagata et al. | 364/518 |
| 5,123,758 | 6/1992 | Vematsu | 400/63 |
| 5,239,622 | 8/1993 | Best et al. | 395/117 |
| 5,268,993 | 12/1993 | Ikenoue et al. | 395/114 |
| 5,287,434 | 2/1994 | Bain et al. | 395/101 |

Primary Examiner—Mark R. Powell
Assistant Examiner—Steven P. Sax
Attorney, Agent, or Firm—McAndrews, Held & Malloy, Ltd.

[57] ABSTRACT

A program generator allows a user to create a software program capable of being executed by a remote labeler to control the printing of one or more labels and to control data collection operations thereof. The program generator stores a user entered sequence of commands selected from a set of commands that control label printing and data collection operations. The stored sequence of commands is validated in accordance with the program generator such that each command entered by the user is compared to a set of allowable commands to determine whether the command is valid or not. During the validation of each of the commands, the program generator determines whether the parameters of the command define allowable data manipulation operations to be performed by the labeler. If not, the program generator provides an error message that identifies the particular command and the error associated with the command. The program generator allows various application files to be selectively linked together to form an application program. Further, when downloading an application file to a labeler, the program generator automatically determines whether the application program requires a look-up file. If so, the program generator creates the necessary look-up file.

38 Claims, 41 Drawing Sheets

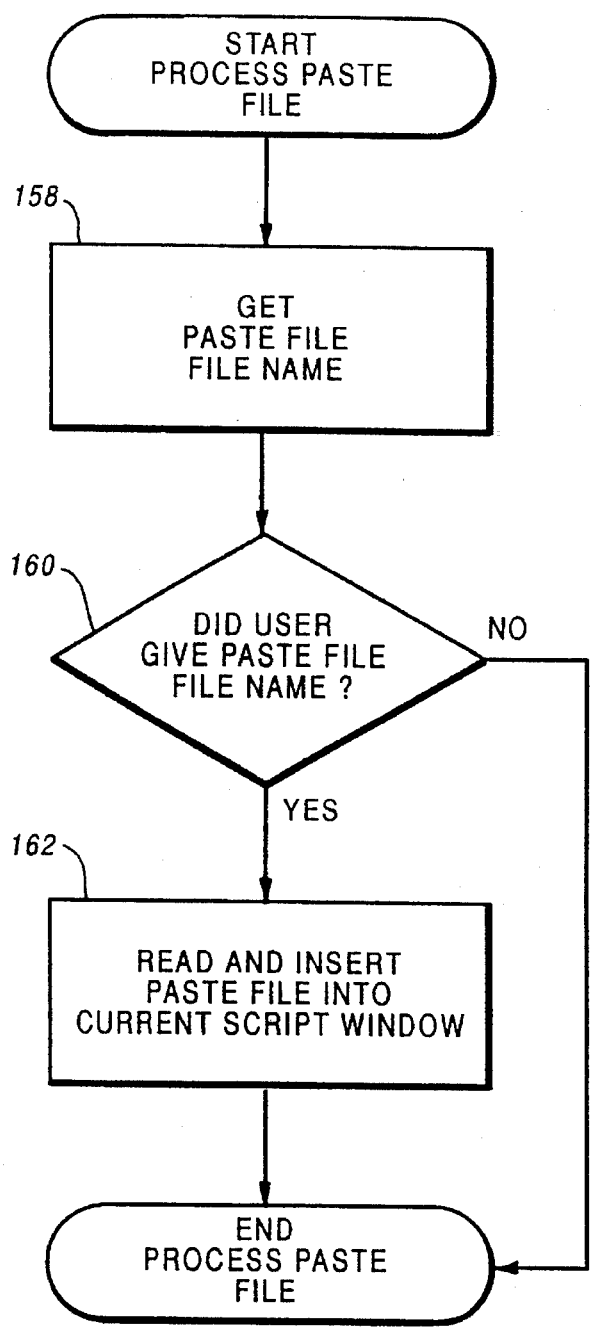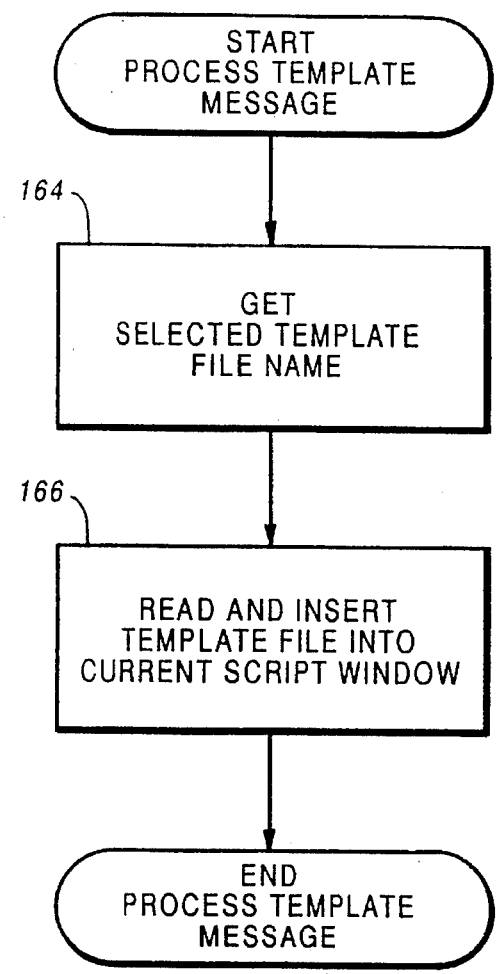

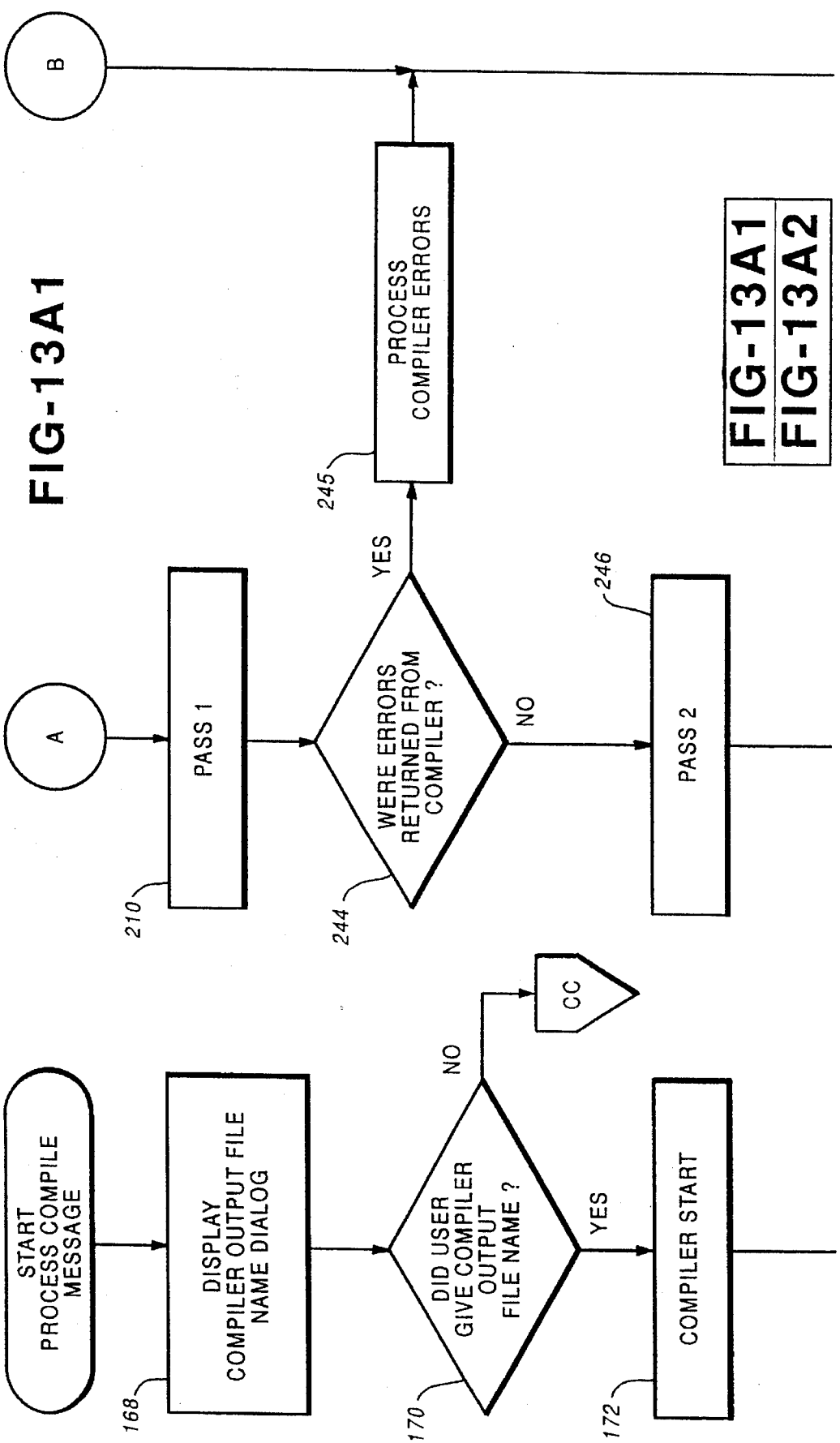

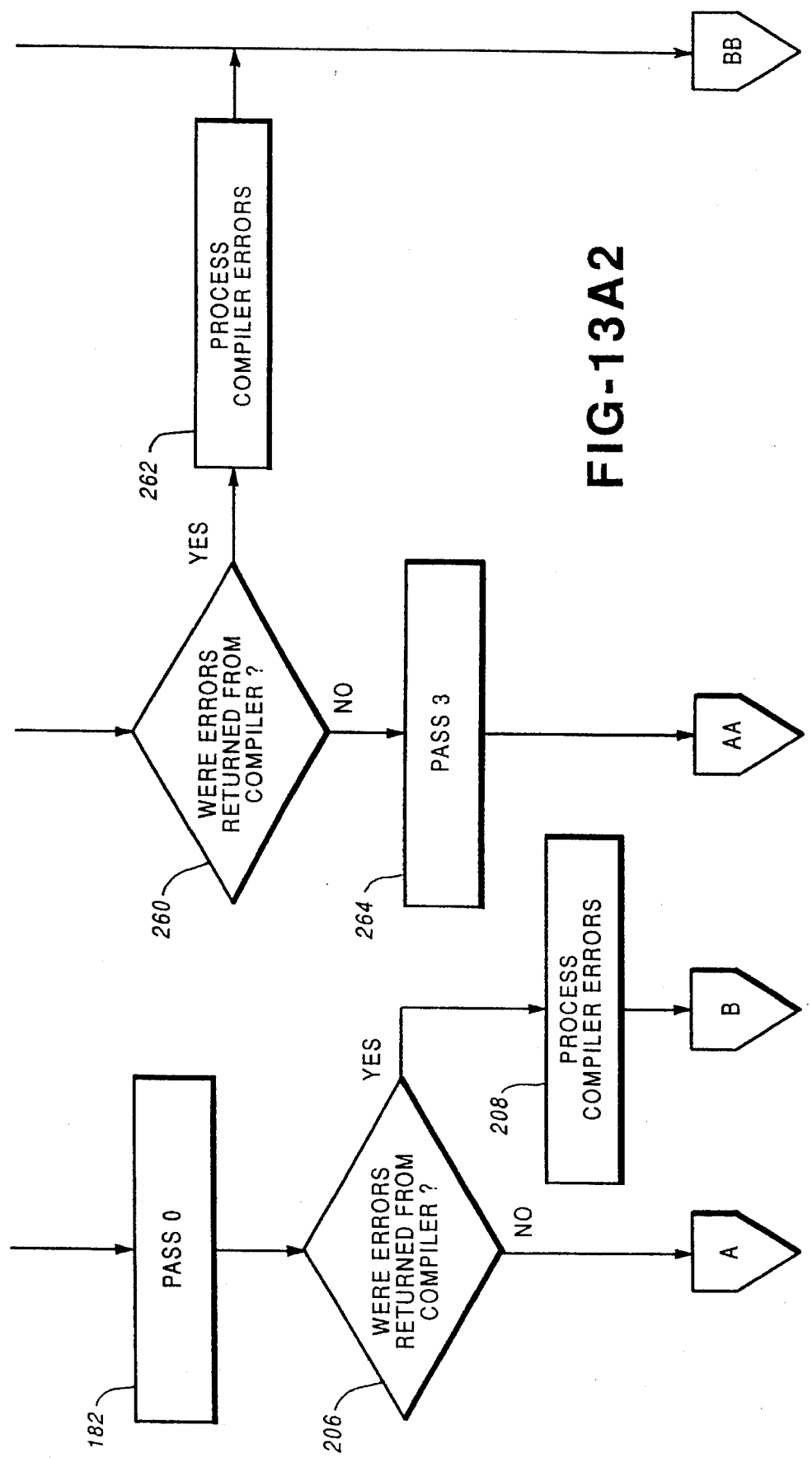
FIG-13A2

LABEL PRINTING AND DATA COLLECTION PROGRAM GENERATOR

TECHNICAL FIELD

The present invention is directed to a label printing and data collection program generator and more particularly to such a program generator that allows a user to create a software program capable of being executed by a remote labeler to control the printing and data collection operations thereof wherein the software program is formed of a sequence of commands selected from a set of predetermined commands that control label printing data collection and data manipulation operations.

BACKGROUND OF THE INVENTION

Program generators are known for aiding a user to create a software program for a particular application. One known program generator allows a user to create a program for a data collection system. More particularly, this generator allows the user to generate different programs that are specific to various data collection applications. This program generator is cumbersome to use, however. It combines editing with compiling so that each line of a program preceding a given line to be edited must be compiled before the given line can be edited. Further, this program generator does not have the capability of generating a program that controls a selective printing operation of a labeler as well as a data collection operation.

SUMMARY OF THE INVENTION

In accordance with the present invention, the disadvantages of prior program generators as discussed above have been overcome. The program generator of the present invention allows a user to create a software program capable of being executed by a labeler to control the printing and data collection operations thereof.

More particularly, the program generator of the present invention is used with a processing system. The processing system includes a display; an input device that is actuable by a user to enter information into the processing system; a memory for storing information and a processor that is coupled to the input device, display and memory wherein the processor operates in accordance with the program generator. The program generator includes means, when executed by the processor, for storing a user entered sequence of commands selected from a set of commands that control label printing, data collection and data manipulation operations. The stored sequence of commands is validated by the processor in accordance with the program generator such that the processor compares each command to the set of allowable commands to determine whether the command is valid or not. After validating the sequence of commands, the program generator translates the sequence of commands to form an application program that is capable of being executed by a remote labeler to control at least one of a label printing operation, a data collection operation or a data manipulation operation.

Each of the commands in the allowable set of commands may require that one or more parameters be entered by a user in association with the command. In validating a command, the program generator counts the number of parameters entered in association with the command to determine whether the number is allowable. The program generator also determines whether the parameters entered define an allowable printing, data collection or data manipulation operation. If a command is not validated, the program generator provides an error message that identifies the command and the error.

The user may also enter one or more commands that provide a directive to the program generator to aid in the creation of an application program. One such directive command allows a number of different files, i.e. programs, to be created separately, stored in a library and selectively linked together to create a new program. More particularly, the program generator is responsive to this command to insert into the program being generated the program file specified in the directive command. A further command that provides a directive to the program generator allows a print format file, containing a number of selectable print formats, to be attached to or associated with a data collection program. More particularly, the program generator is responsive to this command directive to insert into a labeler configuration file associated with the program, the contents of the specified print format file.

The program generator of the present invention also automatically determines whether a program being generated requires a look up file. If so, the program generator prompts the user to select data fields from a number of data files stored in a data base of the processing system as well as a range within which a field is searched for data records, the program generator automatically creating the necessary look up file from the user selected data fields and specified range values. It is noted that the data files from which the look up file is created may actually originate from the labeler. That is, the data base may be formed from data collected by the labeler and uploaded to the processing system. This allows the data collected by one labeler to be used at the processing system as a data base from which a look up table can be created for other labelers or printers that are coupled to the processing system.

In accordance with the present invention, the program generator includes an editor that is separate from the compiler so that each line of a program may be selectively edited without requiring that the entire program be compiled.

These and other objects, advantages and novel features of the present invention, as well as details of an illustrated embodiment thereof, will be more fully understood from the following description and from the drawing.

BRIEF DESCRIPTION OF THE DRAWING

FIG. 11 is a flow chart illustrating a Process Paste File routine of the program generator;

FIG. 12 is a flow chart illustrating a Process Template Message routine of the program generator;

FIGS. 13A–B form a Process Compile Message routine of the program generator of the present invention;

DESCRIPTION OF THE PREFERRED EMBODIMENT

Figure 1:
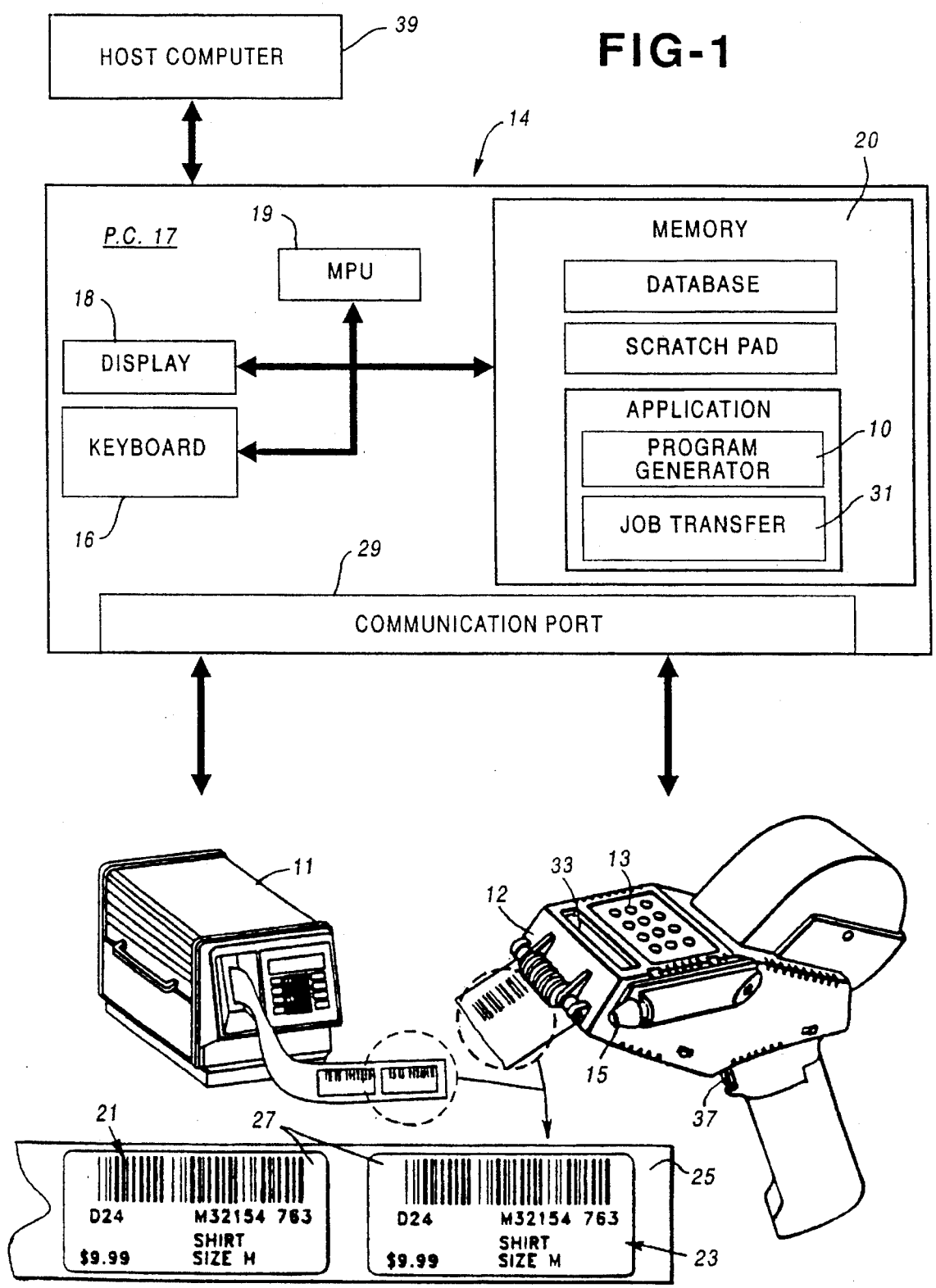
FIG. 1 is a block diagram illustrating the program generator of the present invention for generating a label printing and/or data collection program for a labeler as depicted therein.

The program generator 10 of the present invention allows a user to create, using a processing system 14, an application program for a remotely located labeler 12 to allow the labeler 12 to perform various data collection, data manipulation and label printing operations.

The labeler 12 for which an application program is generated may be a hand held labeler of the type described in U.S. patent application Ser. No. 07/858,703, entitled Programmable Hand Held Labeler, filed Mar. 27, 1992, which application is assigned to the assignee of the present invention and incorporated herein by reference. The labeler 12 prints alphanumeric information 21 and bar code information on record members such as labels 27 that are carried on a web. The labeler 12 can also collect data entered into the labeler from any combination of multiple input sources. More particularly, the labeler 12 includes a keyboard 13 and a scanner 15 capable of scanning bar code information in order to enter data into the labeler 12. The labeler 12 also includes an RS 232 communication port to communicate with the processing system 14 to allow the labeler to receive data therefrom. The labeler 12 is also capable of receiving an application program that is downloaded from the processing system 14 to the labeler via the RS 232 communication port, the application program being stored in a random access memory of the labeler. The application program that is capable of being executed by the labeler is in the form of a sequence of commands that controls the data collection, data manipulation and label printing operations of the labeler 12. Each command in the application program is associated with a command routine stored in a read only type of memory in the labeler 12. The labeler's processor executes a command of the application program stored in the labeler's random access memory by executing the associated command routine stored in the labeler's read only memory.

The labeler 12 can perform data manipulation operations to associate data input via any of the labeler's multiple input sources for selective printing of the associated data or for selective uploading of associated data to the processing system 14. The data manipulation operations are performed by the labeler 12 using various work buffers in the random access memory of the labeler. The work buffers are dynamically built by the labeler 12 in accordance with configuration records that are downloaded from the processing system 14 with the application program. These configuration records define the work buffers necessary to execute the application program as described below. The work buffers of the labeler 12 include a temporary work buffer, a look up table work buffer, a header work buffer, a print work buffer, a data collect work buffer and an ASCII string table. The labeler also includes a look up table file and a data collect file in its RAM. The look up table file stores a look up table downloaded to the labeler 12 from the processing system 14; whereas the data collect file stores the collected data for uploading to the processing system 14. The labeler 12 also includes an input buffer that temporarily stores all data received by the labeler 12 and a print format buffer to store a number of print formats according to which a label may be printed. Such print formats may include the UPC format, Code 39 format, etc.

The work buffers of the labeler 12 are utilized to store various types of data as follows: The temporary work buffer is used to store data in order to carry out arithmetic operations or other intermediate data manipulation operations. The string table stores alpha, numeric or alphanumeric strings that are output, for example, to a display 33 to display messages to the user such as prompts. The print buffer stores an image of the data to be printed on a label. The header work buffer stores data that is used infrequently and relates to or can be associated with a group of individual data line items that are stored in the data collect work buffer. The header data in the header work buffer and the individual data line items stored in the data collect work buffer are combined in the data collect file. Each of the look up table records stored in the look up table file have a number of fields. The look up table associates data records in various fields so that the data in one field can be accessed by data in an associated field. A look up table downloaded from the processing system 14 and stored in the look up table file can be modified by the data that is collected by the labeler 12. The modified look-up table can then be uploaded back to the processing system.

The processing system 14 for executing the application program generator 10, as shown in FIG. 1, includes a personal computer, P.C. 17, or the like. The labeler 12 is coupled to the P.C. 17 through a RS 232 interface 29. Alternatively, the personal computer 17 can communicate with the labeler 12 via a radio frequency interface if the labeler 12 includes such an interface also. The P.C. 17 includes a keyboard 16 for entering information into the system 14 in order to create a program for the labeler 12. Although not shown, a mouse or other suitable input device may also be used. The P.C. 17 includes a display 18 to prompt the user to enter information and to provide feedback to the user regarding the operation of the system. The P.C. 17 includes a microprocessor 19 that operates in accordance with software stored in a memory 20 and particularly in accordance with the application program generator 10 to generate a label printing and data collection program that is capable of being executed by the labeler 12. The microprocessor 19 also operates in accordance with a job transfer application 31 to control the downloading of information to the labeler 12 as well as communications with a host computer 39. It is noted that more than one labeler 12 may be coupled to the P.C. 17 for simultaneous communication therewith. Further, the P.C. 17 may be coupled to one or more table top printers, such as a printer 11, that is capable of printing information including bar code information on a record member carried on a web. For example, 32 printers and/or labelers may actually be connected to the P.C. 17. The P.C. 17 may also be coupled to a conventional text printer (not shown) so that a printout of an application program created by the application program generator 10 may be obtained.

The microprocessor 19 operates in accordance with the application program generator 10 to prompt a user to enter a sequence of commands selected from a set of data collection, data manipulation, label printing and directive commands. The directive commands direct the application program generator to perform various operations in order to aid in the creation of an application program, the application program being formed from the data collection, data manipulation and label printing commands. The directive commands include a DEFINE command, a FINCLUDE command, an INCLUDE command, a MACRO command and an UPLOADDEF command. The DEFINE command is used to define the various work buffer fields that are necessary for the application program being generated. The DEFINE command includes the word DEFINE followed by information identifying the type of buffer field, i.e. a header buffer field, temporary buffer field, data collect buffer field, print buffer field, or look up table buffer field. This information is followed by the logical name of the field and the length of the field. The DEFINE command can also designate whether the field is an alphanumeric field or a numeric only field. If the data type of the field is not specified, the application program generator 10 automatically assumes a default value for the data type, the default value being the alphanumeric data type. It is further noted that the only allowed value of the data type for a print buffer field is alphanumeric. Further, a field length can be specified in the DEFINE command to be from 1 to 64 bytes.

The FINCLUDE command is used to signal the compiler of the application program generator 10 to insert into the configuration file generated for an application program the contents of a specified format file. Multiple FINCLUDE commands are allowed. The format files specified in the FINCLUDE commands are inserted at the end of the configuration file containing the work buffer definitions for the application program.

The INCLUDE command allows a number of different script files to be created separately and selectively linked together to create various new application programs. More particularly, the INCLUDE statement allows a user to create a library of script files in the memory 20 wherein each script file contains commands for performing different functions. This feature allows the user great flexibility and aids the ease with which an application program can be generated. The compiler of the application generator 10 is responsive to an INCLUDE command to insert into the application program currently being generated the source statements located in the file identified in the INCLUDE command. It is noted that nested Include commands are not allowed.

A MACRO command is a single command that is expanded to multiple commands during script translation. Each time a MACRO command is encountered, the commands associated with the macro are inserted in the application program being generated. An AUTOSTART command is used to cause the labeler 12 to automatically start executing the application program immediately after it has been loaded into the labeler 12.

The UPLOADDEF command defines the information needed by a labeler 12 to communicate with the P.C. 17 in order to upload information thereto. The UPLOADDEF command includes information identifying the type of packet to be uploaded to the P.C. which may either be a job packet or a sequential file packet. The UPLOADDEF command also includes information identifying the type of file being uploaded which may be either a data collect file or a look up file. For a sequential file packet the UPLOADDEF command includes information identifying the file in the memory 20 where the information uploaded from the labeler 12 is to be stored and for a job packet file the command will designate the job configuration file name. Mode information is also included in the UPLOADDEF command, the mode may either be a Write mode in order to write the file, or to overwrite the file if it already exists. Alternatively, the mode may be an Append mode to append the uploaded information to a file. For a job packet, the command will also include a source key designation where the source key is the logical field name of a record in the header work buffer that will link together the header records and data collect or or line item records stored in the data collect file of the labeler 12.

The data collection and label printing commands used to form an application program for a labeler 12 include various commands to control the manipulation of data in the labeler 12 so that selected data, input from various ones of the input sources of the labeler 12, may be selectively associated to allow associated data to be printed together or to be uploaded to the processing system 14 together. Among the set of allowable commands are a number of input/output commands that are used to control such operations of the labeler 12 as data collection, communications and printing. These routines include a Get routine, a Scanner Initialization routine, a Locate routine, a Download routine, an Upload routine, a Print routine, a Beep routine, a System Set routine and a System Check routine.

The Get command allows the labeler 12 to receive data input thereto from the keyboard 13, scanner 15 or communication port. The Get command includes information identifying whether the data to be input is alphanumeric or numeric. The Get command also includes information identifying the source of the input data, i.e. the scanner 15, keyboard 13 and/or the communication port of the labeler 12 and further specifies the minimum and maximum number of characters to be allowed for a valid data entry. The Scanner Initialization command allows the labeler 12 to initialize the scanner to read the desired bar code symbology. The Scanner Initialization command includes information identifying the type of scanner 15 being used with the labeler 12 and the type of bar code to be scanned, i.e., for example whether the bar code is a UPC bar code, a code 39 bar code, etc. The Locate command is used to position a cursor on a display 33 of the labeler 12 to a row and column of the display as specified in the Locate command. A Download command is used to load a new look up table from the processing system 14 to the labeler 12 via the communication ports of the processing system and labeler. An Upload command is used to upload either a data collect file or a look up table file from the labeler 12 to the processing system 14. The Upload command includes information identifying the data collect file or the look up file. The Print command is used to cause the contents of a print buffer of the labeler 12 to be printed in the format specified in the print command. More particularly, the Print command includes information indicating whether to prompt for null fields i.e., missing data, or not as well as information identifying the format according to which the information in the print buffer of the labeler 12 is to print. The Beep command is used to sound a beeper of the labeler 12 for .5 seconds.

The System Set command is used to set various system parameters of the labeler 12. The System Set command includes information identifying the particular parameter to be set, the parameter being the scanner, autotrigger, autoenter, date length, multiple labels, strips of labels, currency symbol or foreign prompts. When the System Set command identifies the scanner parameter, the command also includes information identifying the type of scanner 15 being used with the labeler 12 and the type of bar code to be scanned, i.e. for example, whether the bar code is a UPC bar code, a Code 39 bar code, etc. The System Set command can be used to initialize the scanner 15 in the same manner as the Scanner Initialize command is used. When the System Set command identifies the autotrigger parameter, the command also includes information indicating whether the autotrigger option is enabled or disabled. If the autotrigger option is enabled, a label is printed as soon as an image of the label is built in the print buffer of the labeler 12 without requiring actuation of the labeler's trigger 37. Similarly, when the system Set command identifies the autoenter parameter, the command includes information identifying whether the autoenter option is disabled or enabled. If the autoenter option is disabled, a user must actuate the enter key after information is scanned with the scanner 15. If the autoenter option is enabled, the enter key need not be actuated after a scan. When the System Set command identifies the date length parameter, the command also includes the allowable length of the system date of the labeler 12. When the System Set command identifies the multiple labels parameter, the command also includes information identifying the number of identical labels to be printed before a sequential count depicted on the label is incremented. When the System Set command identifies the strips of labels parameter, the command includes information identifying the number of duplicate labels to be printed by the labeler 12. When the System Set command identifies the currency symbol parameter, the command also includes information identifying the particular currency symbol to be used, i.e. the American dollar symbol, the British pound symbol, etc. When the System Set command identifies the foreign prompts parameter, the command also includes information identifying the foreign language to be used for prompts. Spanish, French or German prompts are available as well as English prompts. The System Check command is used to check the status of the battery or the random access memory of the labeler 12 as specified in the System Check command.

Also among the set of allowable commands are commands that provide data manipulation so as to allow data to be sorted and associated with other data that is stored in the random access memory of the labeler 12 using the work buffers and files of the labeler 12. Some data manipulation commands further perform mathematical operations on the data. Other manipulation commands are used by the labeler 12 to manage the data files or to provide controls for the application program itself. The data manipulation commands allow the user to have great flexibility in rearranging the data stored in the random access memory of the labeler 12 so that data input from various ones of the input sources of the labeler 12, i.e. the keyboard, scanner and/or communication port can be selectively associated, at any time, to allow the associated data to be printed together or to be uploaded to the P.C. 17 together in order to minimize the need for processing the collected data at the P.C. 17 or the host computer 39. These commands include a Move command, a Validate command, a Compare command, a Concatenate command, a Right String command, a Left String command, a Mid String command, an Upper Case command, a Field Length command, a Right Strip command, a Left Strip command, an Add command, a Subtract command, an Increment command, a Decrement command, a Divide command, a Multiply command, a Clear command, a Read command, a Write Append command, a Write Current command, a Query command, a Seek command, an Exit command, a Call command, a Return command, a Jump command and a Delay command.

The Move command is used to copy data from a source field to a destination field in the labeler's RAM without affecting the contents of the source field. The Move command includes information identifying the source field of data wherein the source field may be the labeler's input buffer, an ASCII string number, a literal value, a field in the temporary buffer, a field in the data collect work buffer, a field in the look up table work buffer or a field in the header work buffer of the labeler 12. The Move command also includes information identifying the destination of the data, the destination being the input buffer, a field in the print buffer, a field in the temporary work buffer, a field in the data collect work buffer, a field in the look up table work buffer, a field in the header work buffer, the scanner 15, the communication port or the display 33 of the labeler 12. The Validate command is used to validate a field of data in the RAM of the labeler 12 utilizing the check digit of the field. The Validate command includes information identifying the field to be validated and the type of check digit used. A Compare command is used to compare the contents of a first field in the RAM of the labeler 12 with the contents of a second field in the labeler's RAM. The Compare command includes information indicating the type of comparison to be performed, i.e., an equal comparison, a less than comparison, a greater than comparison, a less than or equal to comparison or a greater than or equal to comparison. The first and second fields specified in the Compare command may each be a particular field in the input buffer, an ASCII string, a numeric field, a field in the temporary work buffer, a field in the data collect work buffer, a field in the look up table work buffer or a field in the header work buffer of the labeler 12. A Concatenate command is used to append data in a source field to data in a destination field but does not affect the contents of the source field. The Concatenate includes information identifying the source field of data as well as information identifying the destination field of data. The source field of data may be the input buffer, a ASCII string number, a literal value, a field in the temporary work buffer, a field in the data collect work buffer, a field in the look up table work buffer or a field in the header work buffer of the labeler 12. The destination field for the data may be the input buffer, a field in the print buffer, a field in the temporary work buffer, a field in the data collect work buffer, a field in the look up table work buffer or a field in the header work buffer of the labeler 12. A Right String command is used to extract a specified number of the right most characters from a string in a specified first field in the labeler's RAM and to copy the extracted characters to a specified second field. The Right String command includes information identifying the number of right most characters to be extracted as well as the identity of the first and second fields which may be fields from the temporary work buffer, data collect work buffer, look up table work buffer and header work buffer of the labeler 12. The first field may also be a field in the input buffer of the labeler 12. The Left String command is similar to the Right String command except that it is used to extract a specified number of the left most characters from a specified first field and to copy those characters to a specified second field. The first and second fields can be any field from the buffers discussed above with respect to the Right String command. A Mid String command is similar to the Right String and Left String commands but is used to move characters in a specified mid position in a first field to a specified second field. Again, the first and second fields of the Mid String command may be any field from the buffers discussed above with respect to the Right String command. The Upper Case command is used to convert lower case characters to upper case characters wherein the command identifies the field to be converted. The field identified in the Upper Case command to be converted may be a field in the input buffer, the temporary work buffer, the data collect work buffer, the look up table work buffer or the header work buffer. The Field Length command is used to place the length of the contents of a specified source field into a specified destination field. The source field identified in the Field Length command may be a field in the temporary work buffer, the data collect work buffer, the look up table work buffer or the header work buffer of the labeler 12. The destination field specified in the Field Length command may be a field from the temporary work buffer, the data collect work buffer, the look up table work buffer, the header work buffer or the print work buffer of the labeler 12. The Right Strip command is used to strip off from the right a number of characters specified in the command from a first field and to store the remaining characters of the first field in the second field. The data of the first field remains intact, however. The Right Strip command includes information identifying the number of characters to be stripped, the number being any number from 1 to 64. The first field specified in the Right Strip command may be a field in the input buffer, the temporary work buffer or the header work buffer of the labeler 12. The second field may be a field in the temporary work buffer, the data collect work buffer, the look up table work buffer or the header work buffer of the labeler 12. The Left Strip command is the same as the Right Strip command except that it is used to strip off from the left a number of characters from a first field and to store the remaining characters of the first field in the second field.

The following commands are used to perform mathematical operations on data. More particularly, the Add command is used to add the numerical values from a first and a second field both of which are identified in the Add command. The first and second fields may be any field in the temporary work buffer, the data collect work buffer, the look up table work buffer or the header work buffer of the labeler 12. Further, the first field specified in the Add command may be a literal value. The result of the Add operation is saved in the second specified field. A Subtract command is used to subtract the contents of a first specified field from the contents of a second specified field, the result being stored in the second field. The first and second fields specified in the Subtract command may be chosen from the same labeler buffers as discussed above with respect to the Add command wherein the first field may also be a specified literal value. An Increment command is similar to the Add command but is used to increment a specified numeric field by one. The Increment command includes the identity of the field to be incremented which may be a field from the temporary work buffer, the data collect work buffer, the look up table work buffer or the header work buffer of the labeler 12. Similarly, a Decrement command is used to decrement a specified numeric field by one. The Decrement command includes the identity of the field to be decremented which may be a field in the temporary work buffer, the look up table work buffer, the data collect work buffer or the header work buffer of the labeler 12. The Divide command is used to divide the contents of a specified first field by the contents of a specified second field. This is an integer divide operation where the result of the operation is stored in the designated second field, remainders being ignored. The first field may be a field from the temporary work buffer, the data collect work buffer, the look up table work buffer or the header work buffer of the labeler 12. The first field may also be a specified numeric value. The second field may be a designated field in the temporary work buffer, the data collect work buffer, the look up table work buffer or the header work buffer of the labeler 12. The Multiply command is used to multiply the contents of a first specified field by the contents of a second specified field, the result being saved in the second specified field. The first field may be a field from the temporary work buffer, the data collect work buffer, the look up table work buffer or the header work buffer of the labeler 12. The first field may also be a specified numeric value. The second field may be a field from the temporary work buffer, the data collect work buffer, the look up table work buffer or the header work buffer of the labeler 12.

The following manipulation commands are used to manage various data files. A Clear command is used to clear the work buffers or files of the labeler 12 or a specified field therein or to clear the display of the labeler 12. The Clear command includes the identity of the labeler element to be cleared such as the print buffer, the data collect work buffer, the entire data collect file, the look up table work buffer, the entire look up table file, the temporary work buffer, the header work buffer, the input buffer, the display of the labeler 12 or a specified field in the temporary work buffer, the data collect work buffer, the look up table work buffer, the header work buffer or the print buffer. A Read command is used to move records from either the data collect file or the look up table file into an appropriate work buffer. The Read command includes information identifying whether a data collect read, header read or look up read is to be performed. A Write Append command is used to save the contents of a specified work buffer in the data collect file of the labeler 12. The Write Append command includes information identifying whether the contents of the header buffer or the data collect buffer is to be saved in the data collect file. The Write Current command is used to save a specified work buffer in either the data collect file or in the look up table file of the labeler 12 at the current pointer location. This command allows an edit type function to occur. The Write Current command includes information identifying the work buffer to be saved such as the look up table work buffer, the data collect work buffer or the header work buffer. The Query command is used to search the data collect file or the look up file of the labeler 12 to find a record that contains a specific value. This command can be used to validate data entered from any of the input sources of the labeler 12 such as its keyboard, scanner or communication port. The Query command includes information identifying the type of query as well as a first and a second field. The second field may be taken from the input buffer, or it may be an ASCII string or numeric string, or a particular field from the temporary work buffer, the data collect work buffer, the header work buffer or the look up table work buffer of the labeler 12. The first field specified in the Query command is the field to be searched. The first field may be a specific field in the look up table file, the data collect file or the header work buffer. The type of query may be an equal to query to locate the first record where the specified second field is equal to the contents of the specified first field; a less than query to locate the first record where the contents of the specified second field is less than the contents of the specified first field; a greater than query to locate the first record where the contents of the second specified field is greater than the contents of the first specified field; a less than or equal to query to locate the first records where the contents of the second specified field is less than or equal to the contents of the first specified field; or a greater than or equal to query to locate the first record where the contents of the second specified field is greater than or equal to the contents of the first specified field. The Seek command is used to position a pointer within a specified file. The Seek command includes information identifying either the data collect file or the look up table file and information identifying whether the pointer is to be positioned at the start of the file, the end of the file, to the next record in the file or to the previous record in the file relative to the current pointer position.

The following commands provide controls for the application program itself. More particularly, an Exit command is used to exit the execution of an application program. A Suspend command is also used to exit the execution of an application program but it further enables the application program execution to be resumed at the command line immediately following the Suspend command upon re-entry to the application. This is in contrast to the Exit command wherein program execution is resumed following an Exit command at the first line of the application upon re-entry to the program. A Call command is used to call one line of code as a subroutine. A Return command is used to allow a subroutine to be exited before reaching the end of the subroutine. Control resumes at the next command following the Call to that subroutine. The Jump command provides a method to allow a program to jump to a specified line number. A Delay command is used to delay the execution of the application for a period of time as specified in the Delay command wherein the delay time may be 0.1 second to 9.9 seconds. The allowable commands also include commands to program one or more programmable keys of the labeler 12. More particularly, a hotkey command defines a key to be used to call a routine in the application if the specified key is actuated during the keyboard input. These programmable keys or hotkeys can be defined anywhere in the application program and are globally defined. The hotkey command includes information identifying which key or keys are to be hotkeys. More particularly, a recall key, space key, load key, left arrow key or right arrow key may each be designated as hotkeys. The hotkey command also identifies the function or subroutine to be called whenever the hotkey is actuated. A Disable hotkey command is used to disable one or more of the hotkeys as specified in the Disable command. Similarly, the Enable hotkey command is used to enable one or more of the hotkeys specified in the Enable hotkey command.

Figure 2:
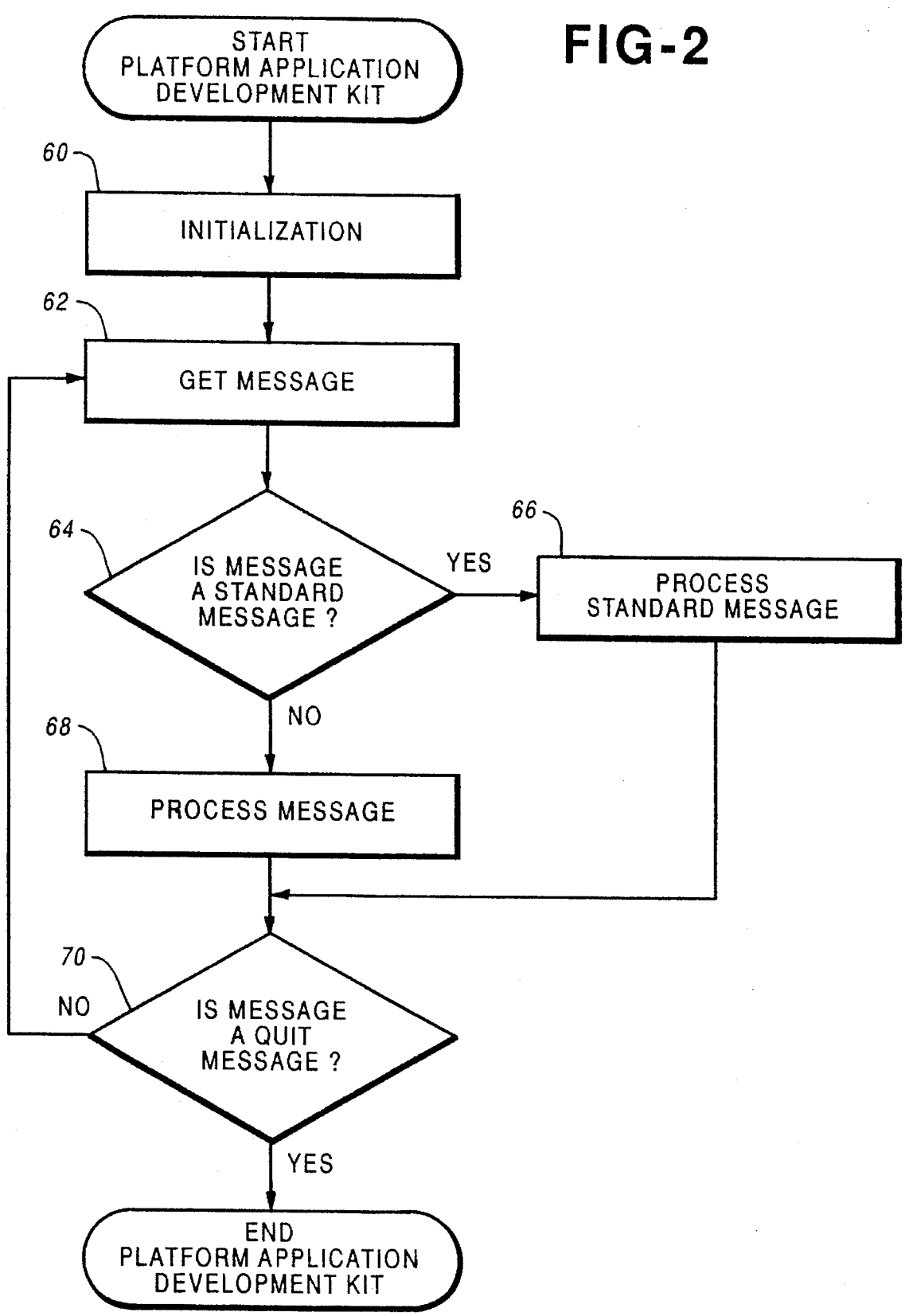
FIG. 2 is a flow chart illustrating a Main Program Generator routine of the present invention.

As shown in FIG. 2 upon initialization of the application program generator 10 at a block 60, the microprocessor 19 prompts the user to enter a message such as file, edit, template, compile or a standard message in order to start the generation of an application program. At a block 62, the microprocessor gets the message entered by the user via the keyboard 16 or a mouse and proceeds to block 64 to determine whether the message is a standard message or not. If the message is a standard message directed to the operating system of the processor 19, the processor 19 proceeds to block 66 to process the standard message. If the microprocessor 19 at block 64 determines that the message entered is other than a standard message, the microprocessor proceeds to block 68 to process the message in accordance with the routine depicted in FIG. 3. Thereafter, at block 70 the microprocessor determines whether a Quit message has been received and if so, the microprocessor 19 exits the application program generator routine. Otherwise, the microprocessor proceeds from block 70 to block 62 to process another message.

Figure 3A:
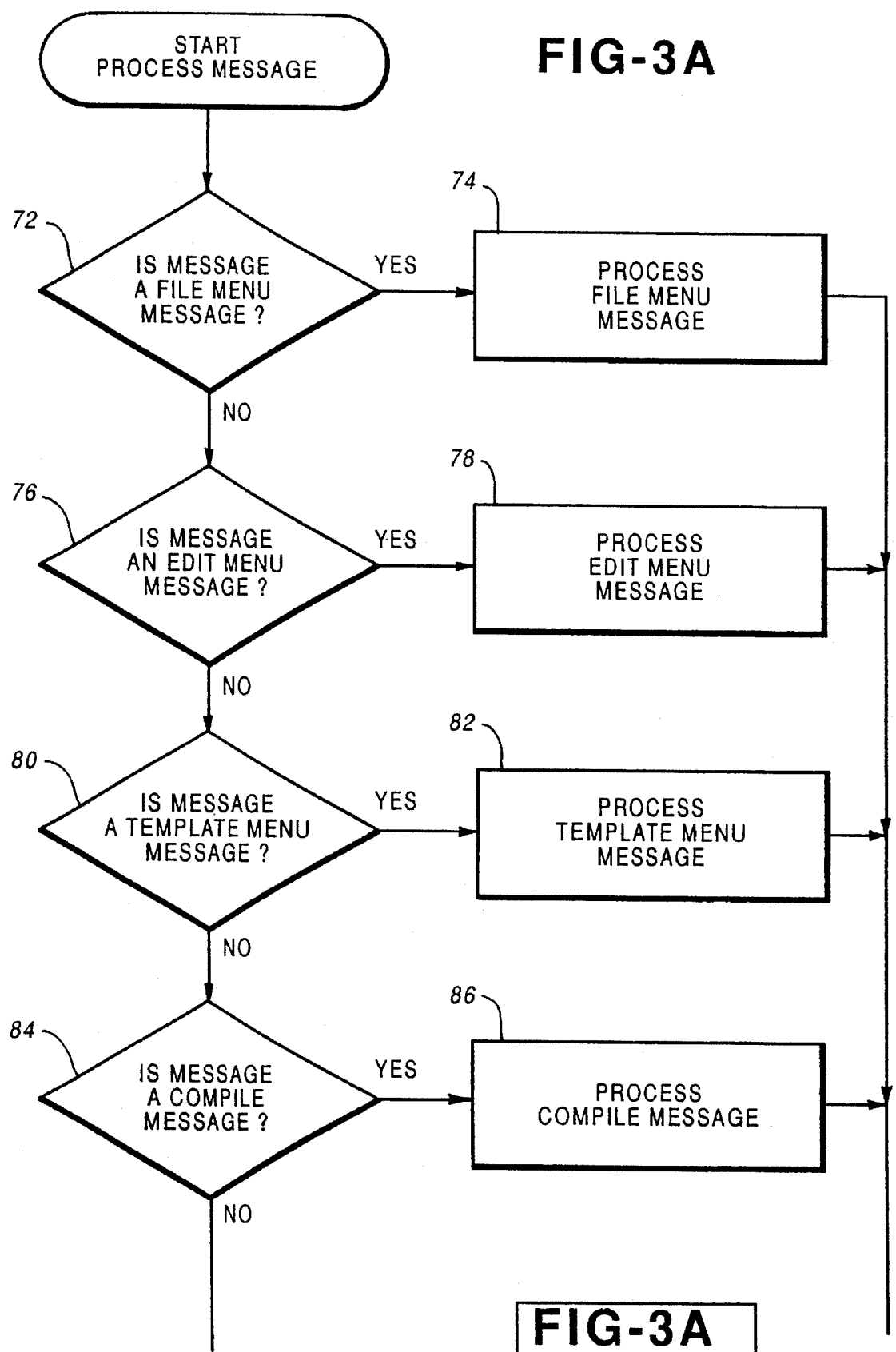
FIG. 3 is a flow chart illustrating a Process Message routine of the program generator.
Figure 3B:
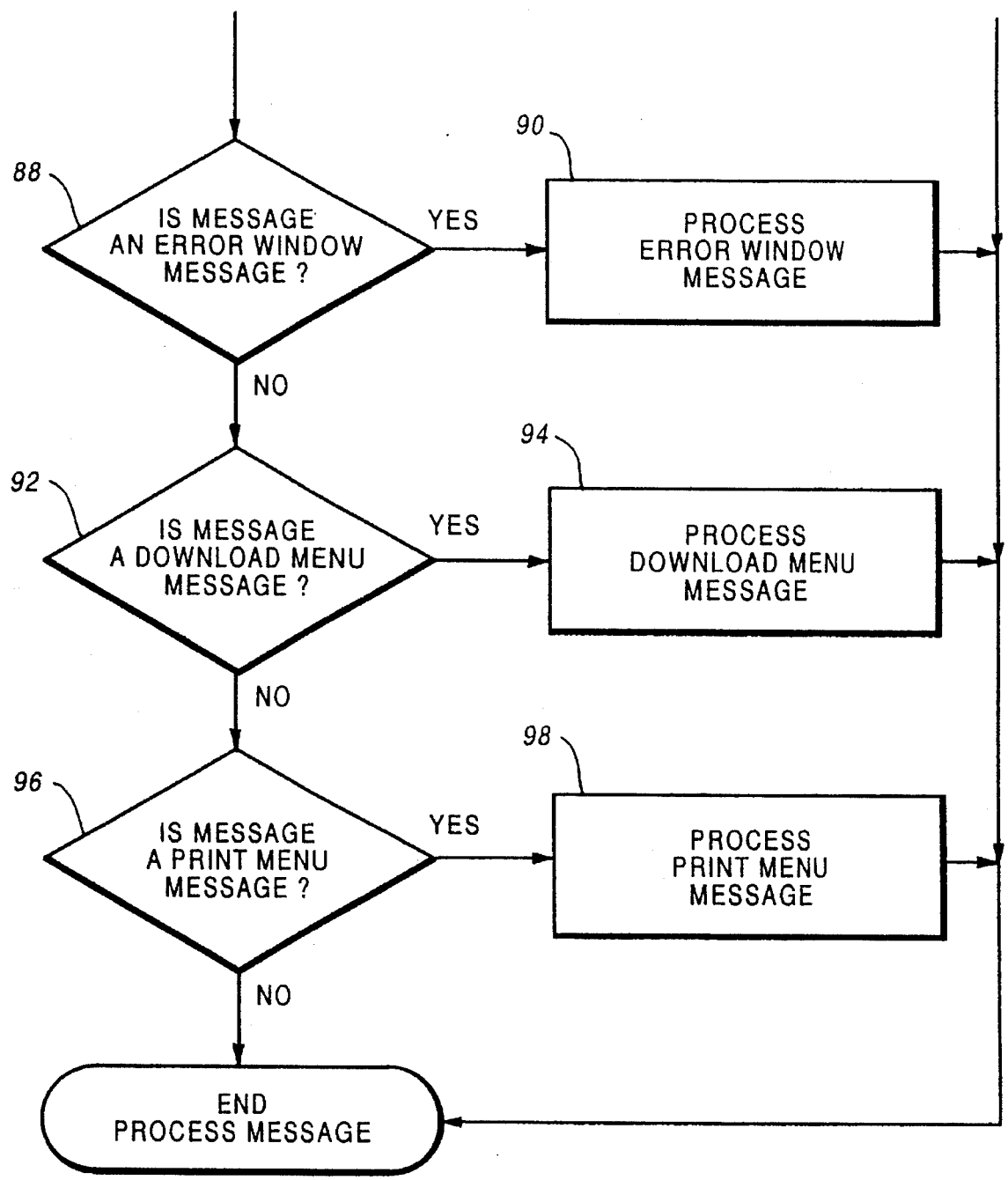

As shown in FIG. 3, the microprocessor 19 in processing the messages first determines at a block 72 whether the message is a file menu message such as Open, Close, Save or Save As. If the message is one of the messages selected from a file menu, the microprocessor 19 proceeds to block 74 to process the file menu message. If the microprocessor 19 determines at block 72 that the message was not a file menu message, the microprocessor proceeds to block 76 to determine whether the message is an Edit menu message. If so, the microprocessor proceeds to block 78 to process the edit message as discussed below with respect to FIGS. 10 and 11. At block 80 the microprocessor 19 determines whether the message is a Template menu message. If so, the microprocessor 19 processes the template message in accordance with the flow chart depicted in FIG. 12. At a block 84, the microprocessor 19 determines whether the message is a Compile message and if so the microprocessor 19 processes the Compile message at a block 86 in accordance with the flow charts depicted in FIG. 13 and FIGS. 19–29. When the microprocessor 19 in accordance with the Compiler routine detects errors in a script file, an error log window is created on the display 18 listing each command having an error and the type of error. The user is able to correct errors logged in the error log window utilizing error window messages. At a block 88 the microprocessor 19 determines whether an error window message is received and if so the microprocessor processes the message at a block 90 to allow the user to correct the error and to return to the error log window to find other errors that may exist. At a block 92 the microprocessor 19 determines whether a message from a Download menu is received and if so, the microprocessor at block 94 processes the download message. The download messages allow a user to select the communication port of the P.C. 17 through which an application program is to be downloaded to a labeler so that the application can be downloaded to one of many labelers coupled to the system 14. At block 94 the microprocessor 19 also determines whether a look up table is required for the specified application program and if so, the microprocessor 19 creates a look up table to be downloaded with the application program. It is noted that look up tables can also be downloaded to a labeler 12 independent of an application program. At block 96 the microprocessor determines whether a print menu message has been received and if so, the microprocessor proceeds to block 98 to print a file stored in the memory 20 on the text printer of the P.C. 17.

Figure 4:
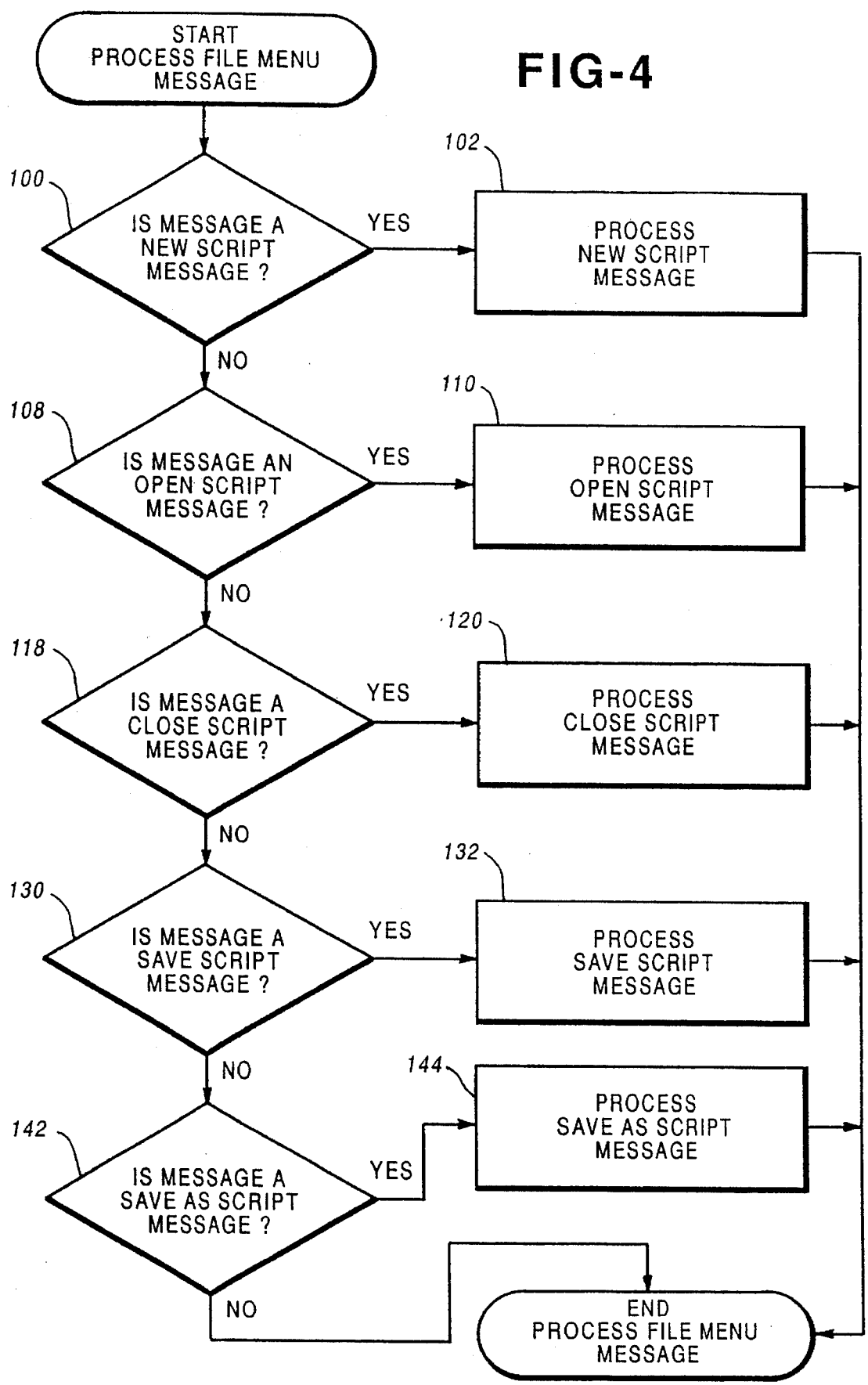
FIG. 4 is a flow chart illustrating a Process File Menu Message routine of the program generator.
Figure 5:
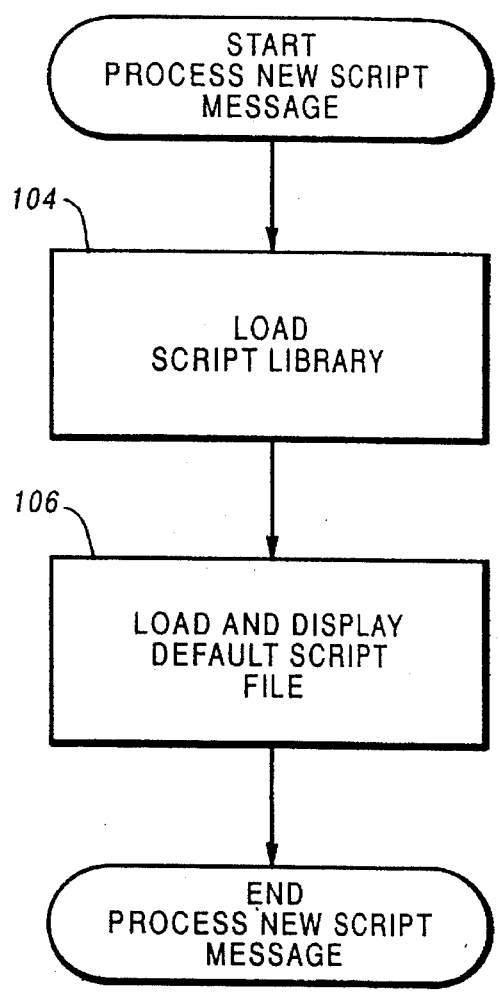
FIG. 5 is a flow chart illustrating a Process New Script Message routine of the program generator.

When the microprocessor 19 determines that a user has selected an option from the file menu, the microprocessor operates in accordance with the flow chart depicted in FIG. 4 to process the selected file menu message. More particularly, at a block 100, the microprocessor 19 determines whether the message is a new script message and if so the microprocessor proceeds to a block 102 to process the new script message in accordance with the flow chart depicted in FIG. 5. It is noted that a script as used herein refers to the sequence of commands entered into the processing system 14, the sequence including commands to be executed by the labeler 12 and directive commands to be executed by the microprocessor 19 in generating an application program for the labeler 12. As shown in FIG. 5, the microprocessor at a block 104 first sets up a script library and at a block 106 displays a default script file on the display 18 for the user. The default script file includes three comment lines that allow a user to enter an application name, author and date. The comment lines are followed by three lines, the first line depicting "FUNCTION START", the second line depicting "BEGIN" and the third line depicting "END". The "START" function in the first line of the default script file displayed to the user serves as the starting point for the execution of the application program to be generated. The words "BEGIN" and "END" define the boundary of the function. The "START" function will typically control execution of a program application by directing calls to other functions in the program application. A function as used herein refers to an independent sequence of commands designed to perform a specific task. The function name identifies a particular function whereas the function body refers to the sequence of commands that define the specific task of the function. A function returns to the caller for example the "START" function when the key word "END" or a "RETURN" command is executed. Therefore, in processing a new script message, the microprocessor at block 102 displays a type of starting template for a new script application.

Figure 6:
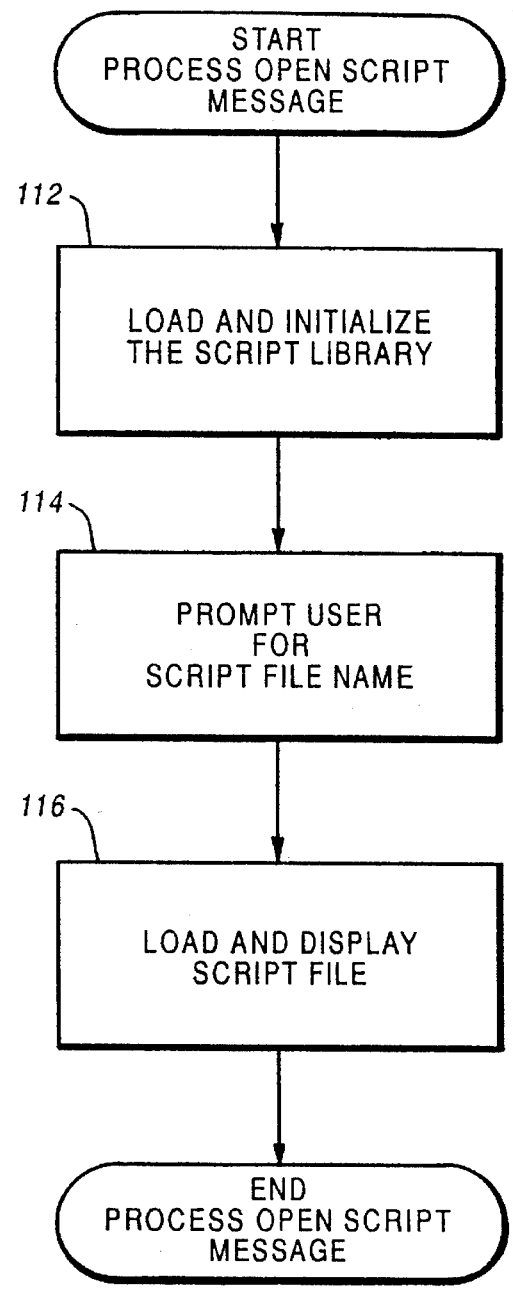
FIG. 6 is a flow chart illustrating a Process Open Script Message routine of the program generator.

If the microprocessor 19 determines at a block 108, shown in FIG. 4 that the open script message has been selected from the file menu, the microprocessor proceeds to block 110 to process the open script message in accordance with the flow chart depicted in FIG. 6 wherein the microprocessor 19 prompts the user for the name of the script file to be opened. More particularly, as shown in FIG. 6, the microprocessor 19 at a block 112 first sets up the script library and at block 114 prompts the user for a script file name. The microprocessor 19 prompts the user for a script file name by displaying a list of script files already named as well as various directories. The microprocessor also depicts a box labeled "open file name:" to allow a user to type in a script file name. Once a script file is selected, the microprocessor at a block 116 loads and displays the selected script file.

Figure 7:
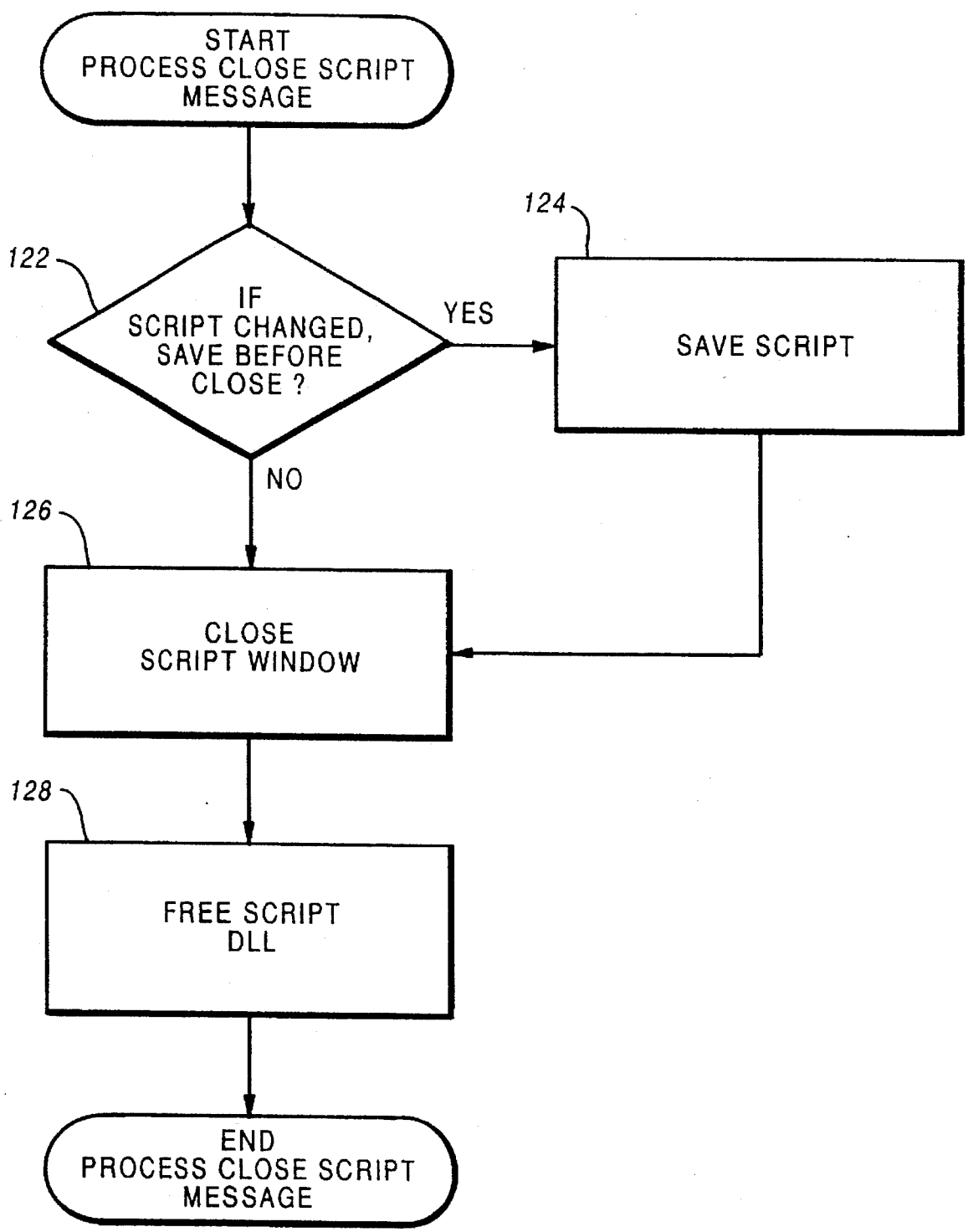
FIG. 7 is a flow chart illustrating a Process Close Script Message routine of the program generator.

If the microprocessor determines that a close script message has been selected from the file menu at a block 118, the microprocessor 19 proceeds to a block 120 to process the close script message in accordance with the flow chart depicted in FIG. 7. As shown therein, in order to process a close script message, the microprocessor 19 at a block 122 first determines whether the script has been changed or not and if changes have been made, the microprocessor 19 prompts the user to save the file before it is closed if that is what the user desires. If the user opts to save the file, the microprocessor proceeds to a block 124 to write the script file to a disk. Thereafter, at a block 126 the microprocessor 19 closes the script window being depicted on the display 18 and at a block 128 removes the script library that the microprocessor 19 was working with from the scratch pad area of the P.C.'s memory 20.

Figure 8:
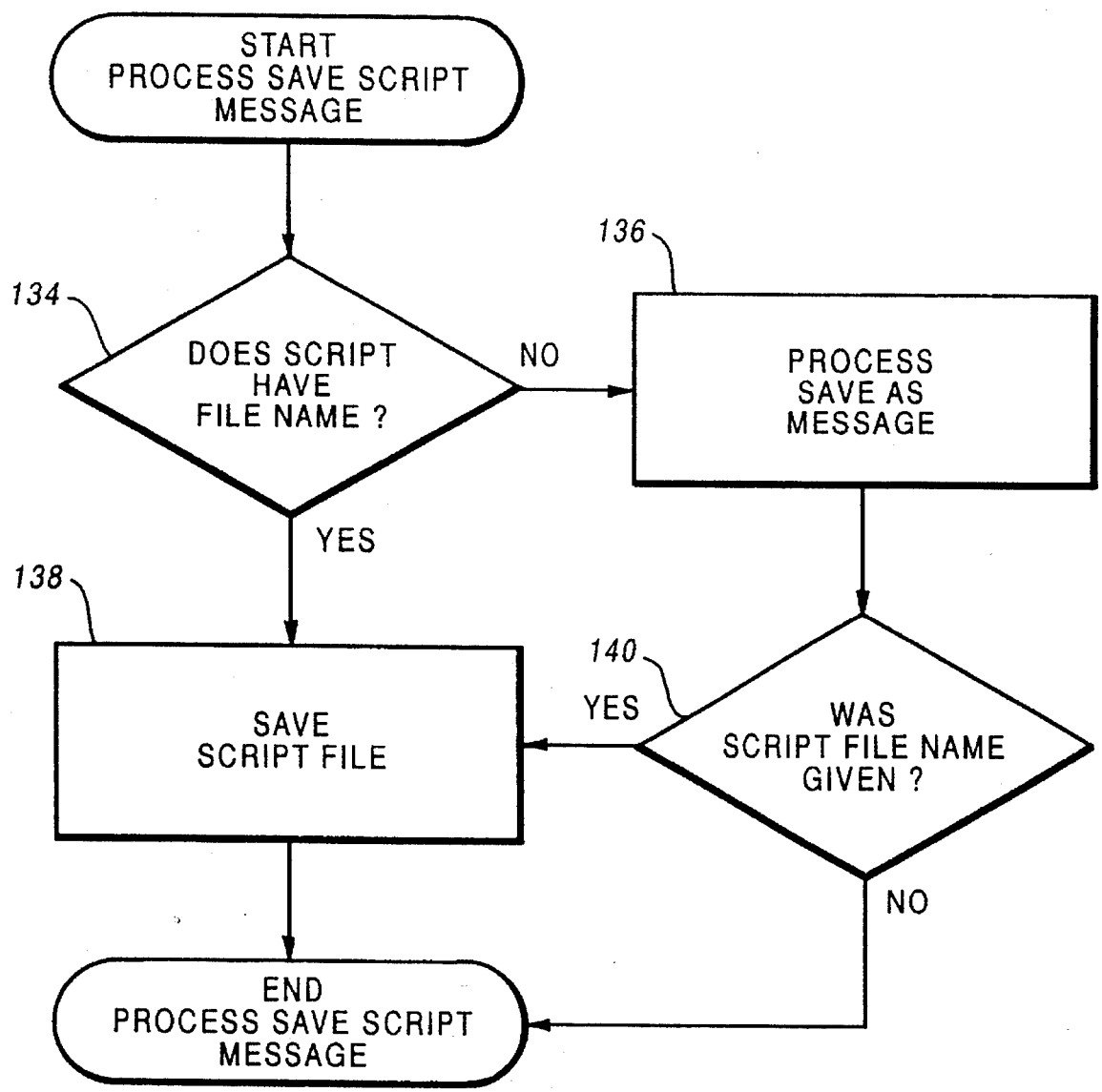
FIG. 8 is a flow chart illustrating a Process Save Script Message routine of the program generator.
Figure 9:
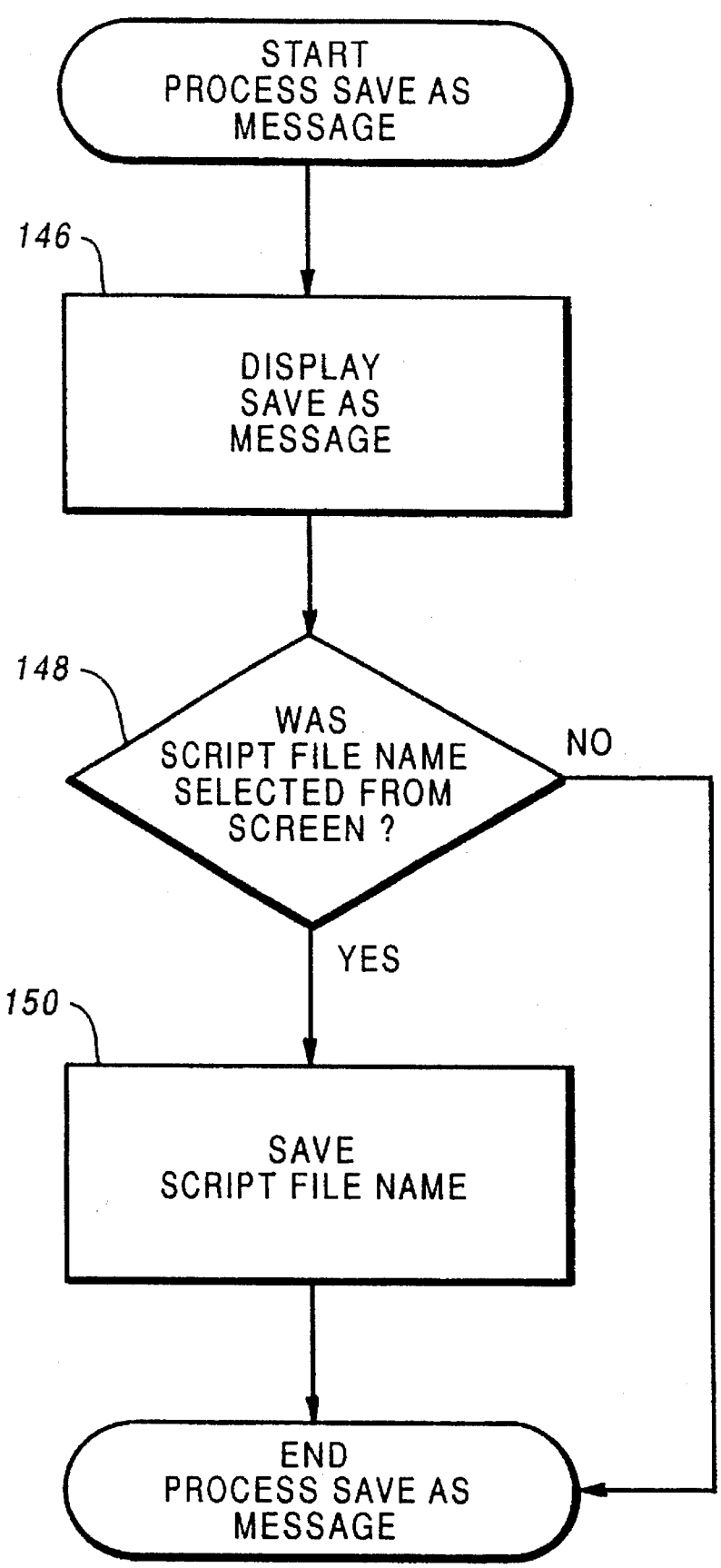
FIG. 9 is a flow chart illustrating a Process Save As Message routine of the program generator.

If the microprocessor 19 determines at a block 130 that the save script message has been selected by a user from the file menu, the microprocessor proceeds to block 132 to process the save script message in accordance with the flow chart depicted in FIG. 8. As shown therein, the microprocessor 19 at a block 134 first determines whether the script has a file name and if not, the microprocessor proceeds to block 136 to process a save as message as depicted in FIG. 9. If the microprocessor determines at block 134 that the script does have a file name, the microprocessor at block 138 saves the script file under the name that the script was created. If the microprocessor determines at a block 142 that a save as script message has been selected, the microprocessor proceeds to block 144 to process the save as message in accordance with the flow chart depicted in FIG. 9. As shown therein, the microprocessor at a block 146 first displays a "save as" screen which prompts the user to save the file under a different file name by displaying the words "save file as:" adjacent to a data entry box. The microprocessor 19 also controls the display 18 to list various directories. Thereafter, the microprocessor proceeds to block 148 to determine whether the script file name was selected and if so, the microprocessor proceeds to block 150 to save the script file name. It is noted that if a user enters a file name that already exists, the microprocessor 19 controls the display 18 to ask the user for permission to overwrite the existing file. Once the file is renamed, the script is written to disk.

Figure 10:
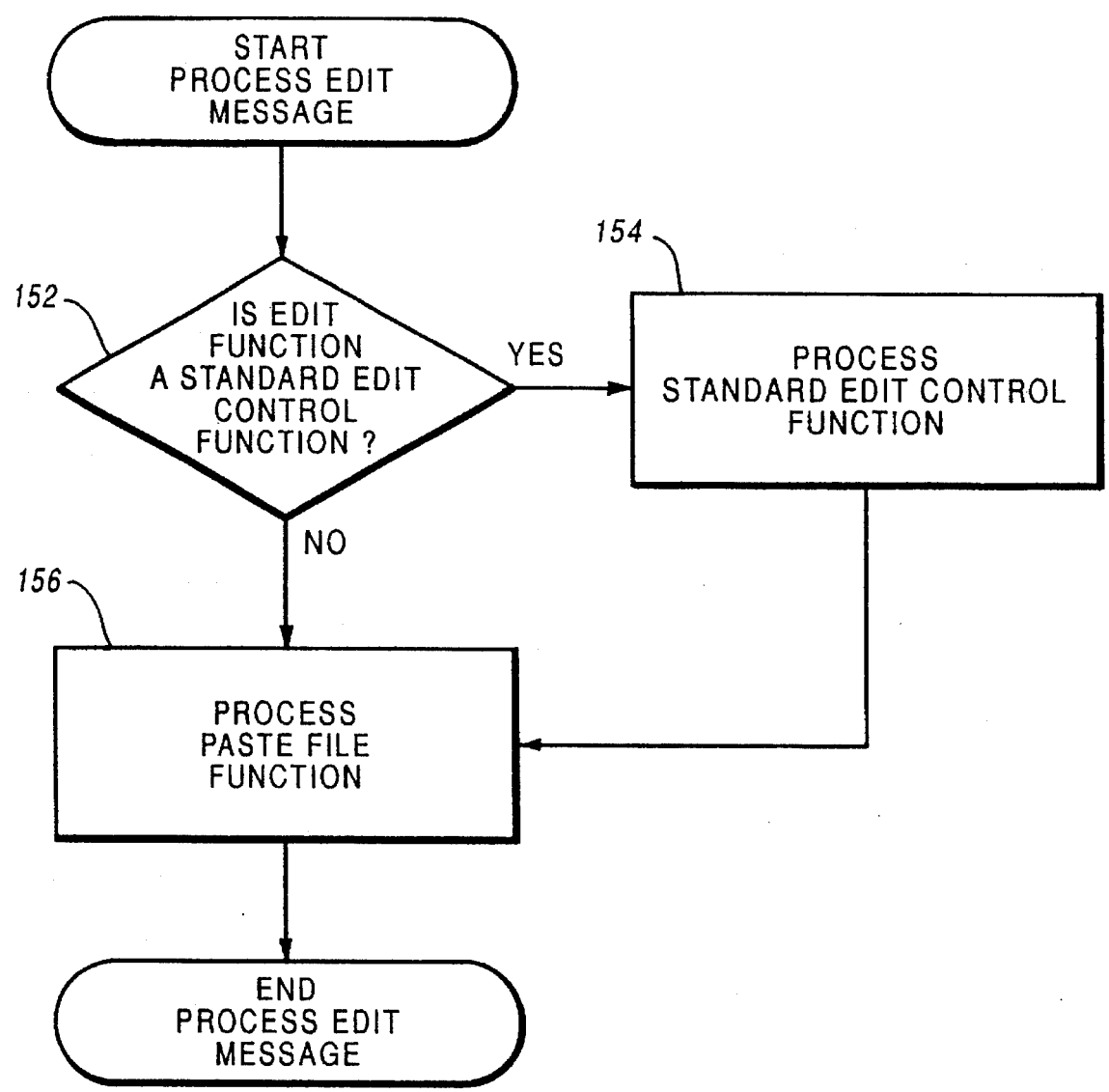
FIG. 10 is a flow chart illustrating a Process Edit Message routine of the program generator.

When the microprocessor 19 determines that an edit operation has been selected, the microprocessor operates in accordance with the routine depicted in FIG. 10 by displaying an edit menu with the following options: undo, cut, copy, paste and delete. If the microprocessor 19 determines at a block 152 that either of the functions undo, cut, copy or delete has been selected by a user from the edit menu, the microprocessor proceeds to block 154 to pass the edit message to the Windows operating system, these edit options being standard edit control functions of a Window operating system. If however, the microprocessor determines that the paste edit option has been selected, the microprocessor proceeds to block 156 to process the paste file function in accordance with the flow chart depicted in FIG. 11. More particularly, at a block 158 the microprocessor 19 prompts the user to enter the name of the file to be pasted. Thereafter, at a block 16 the microprocessor 19 determines whether the user has entered a file name and if so the microprocessor proceeds to block 162 to read and insert the entered paste file into the current script at the current position of the cursor depicted on the display 18. The paste file edit option therefore allows a user to select a paste file to be added to a current script at a given position as indicated by the cursor on the display 18.

When the microprocessor 19 determines that the user has selected the template option, the microprocessor operates in accordance with the flow chart depicted in FIG. 12. A template message is used to speed the creation of a script by allowing various predetermined command layouts to be inserted into a script. More particularly, as shown in FIG. 12, the microprocessor at a block 164 first prompts the user to select a defined template from the following list of templates contained in a menu: Function, Macro, Data Collect Define, Header Define, Temporary Define, Printer Define, Look Up Define and Include. After the user has selected a template from the template menu, the microprocessor proceeds to block 166 to read and insert the selected template file into the current script window. For example, if the "FUNCTION" template is selected, the microprocessor 19 inserts three lines of text into the current script at the location of the cursor, the first line of text being "FUNCTION <Function name>" the second line of text being "BEGIN" and the third line of text being "END".

Figure 13B:
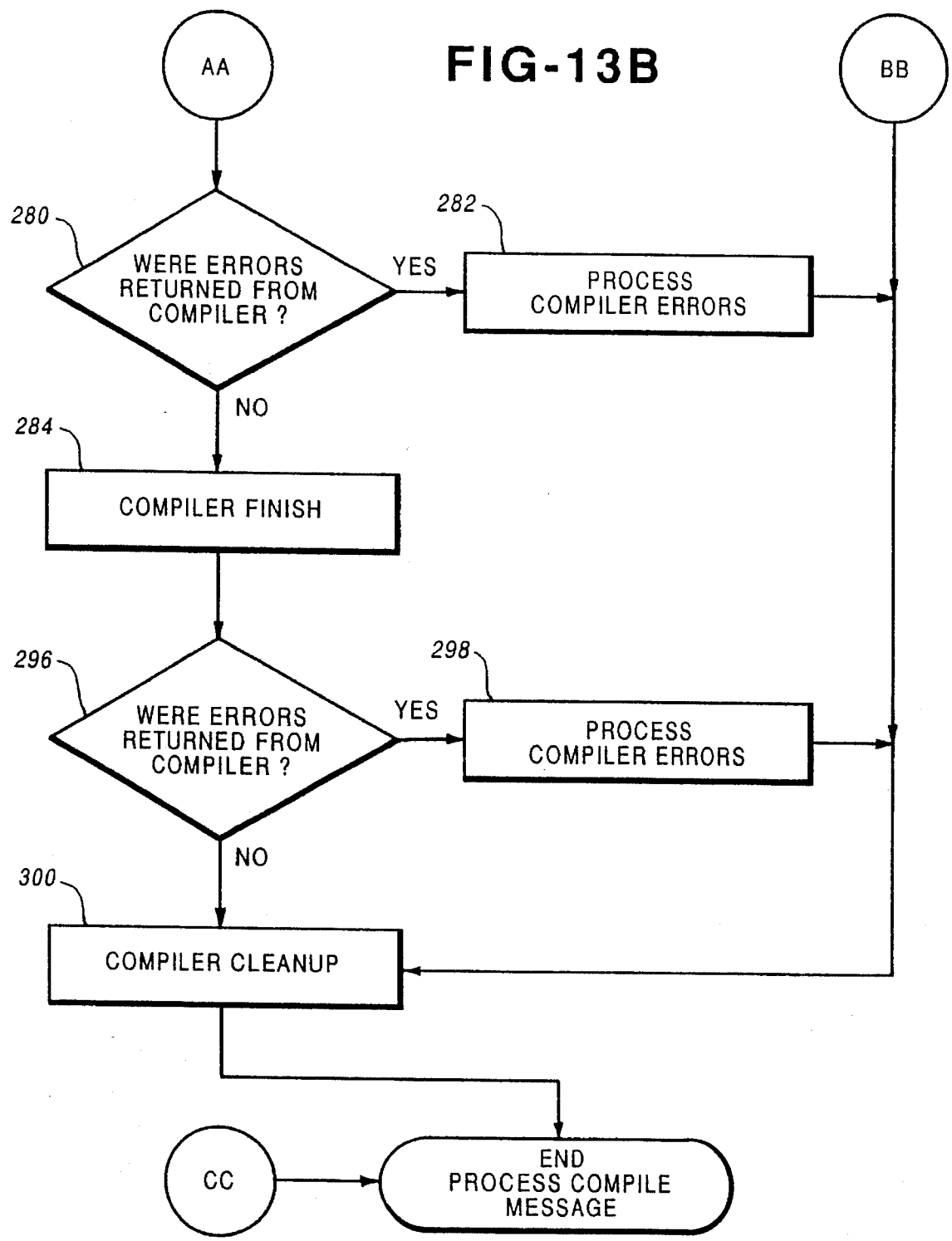

When the microprocessor 19 determines that a user has selected the compile option, the microprocessor 19 proceeds to block 168 as shown in FIG. 13 to prompt the user to enter the name of the output file for the executable application program that is to be built in accordance with the compile routine. Thereafter, the microprocessor 19 determines at block 170 whether the user entered an output file name and if so, the microprocessor proceeds to block 172 to execute the compiler start routine depicted in FIG. 19.

Figure 19:
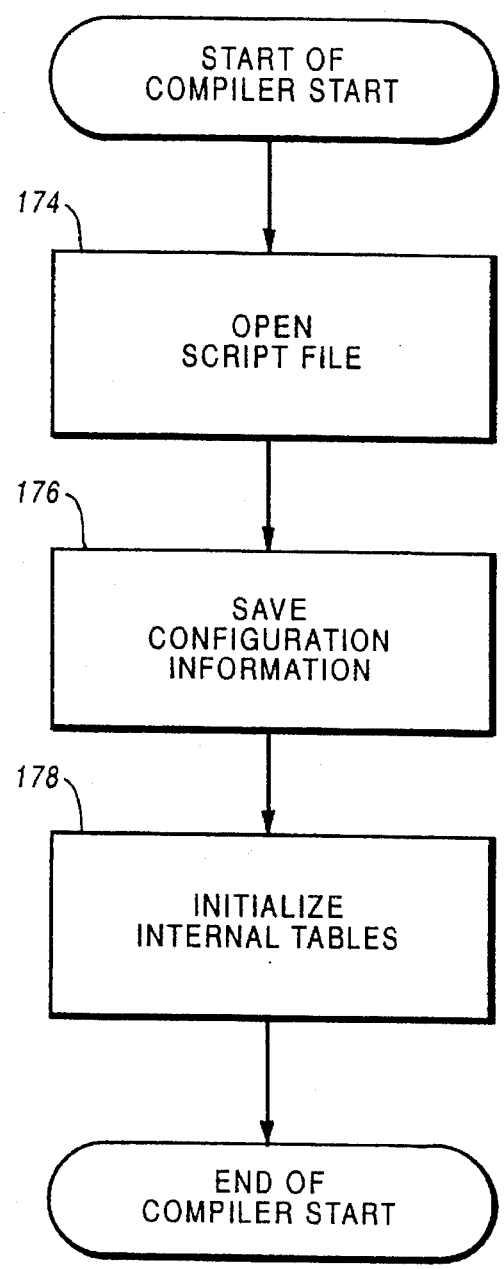
FIG. 19 is a flow chart illustrating a Compiler Start routine of the program generator.

As shown in FIG. 19, upon entering the compiler start routine, the microprocessor 19 at block 174 first opens the specified script file. Thereafter, at a block 176 the configuration information is saved. At a block 178 the microprocessor 19 initializes various internal tables needed during the compiler routine. Returning to FIG. 13, after the compiler is initialized at block 172, the microprocessor 19 begins the first of a four pass translator that uses temporary files to communicate between the different passes and that uses global memory to store the generated tables needed by the different passes.

Figure 20:
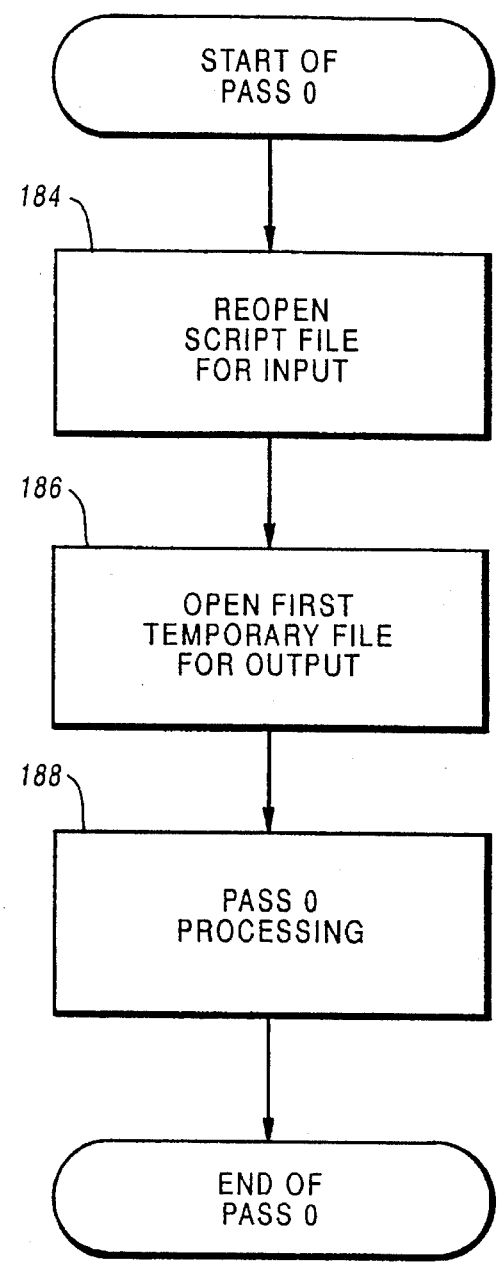
FIG. 20 is an illustration of a Pass 0 routine of the compiler.
Figure 21:
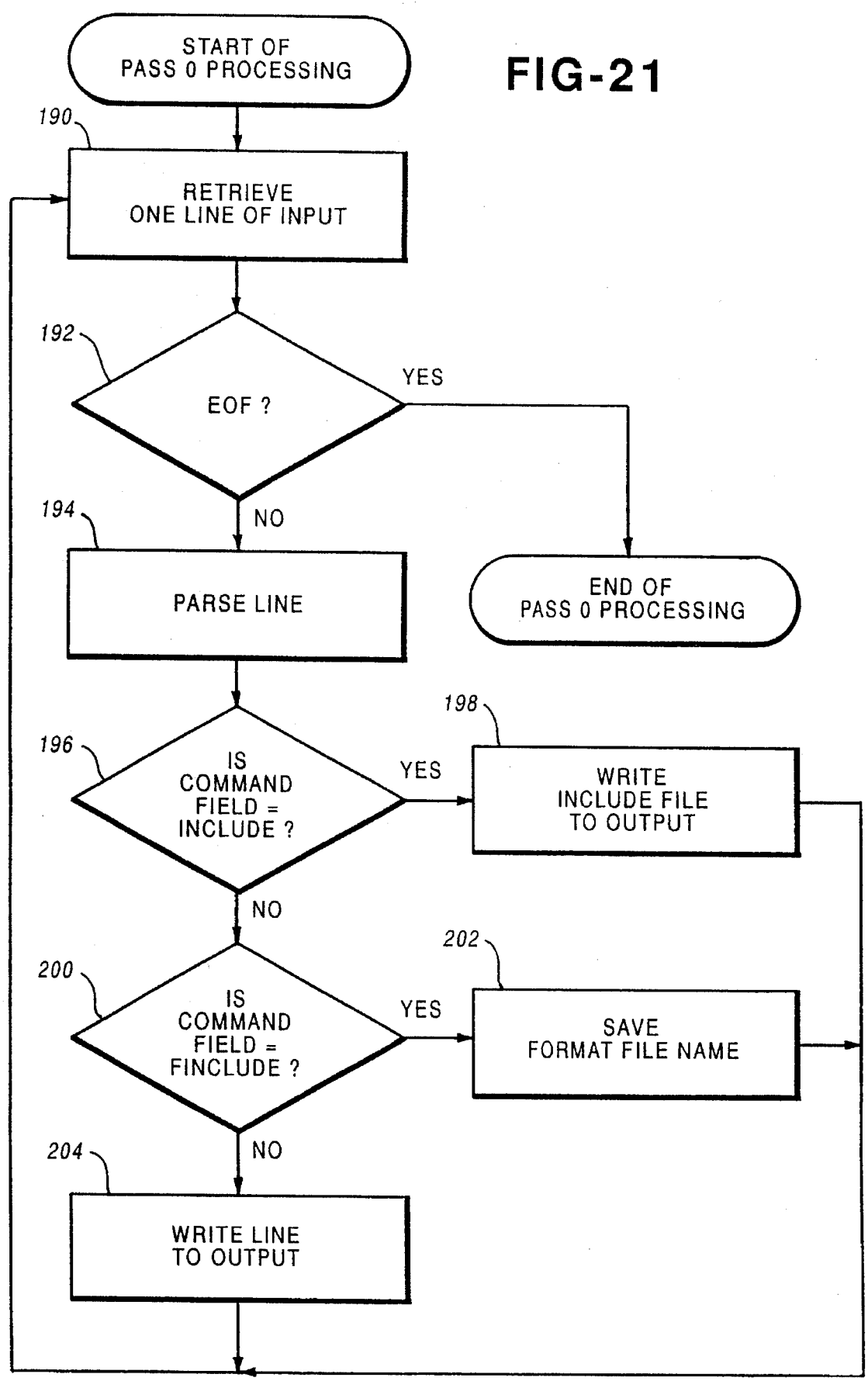
FIG. 21 is a flow chart illustrating a Pass 0 processing routine of the compiler.

More particularly, at a block 182, the microprocessor 19 executes pass 0 of the translator in accordance with FIGS. 20 and 21. During pass 0, the first of three temporary files is generated by expanding any Include statements encountered in the user generated application script. During this pass, the microprocessor 19 also checks for the FINCLUDE statement and saves the file name associated with that statement if found. More particularly, as shown in FIG. 20 at block 184, the microprocessor at the start of pass 0 first reopens the script file for input. Thereafter, at a block 186 the microprocessor 19 opens a first temporary file for output. At block 188, the microprocessor 19 executes the pass 0 processing depicted in FIG. 21. As shown in FIG. 21, the microprocessor 19 at a block 190 first retrieves one line of the script file and at block 192 determines whether this is an end of file statement. If not, the microprocessor continues to block 194 to parse the line of the script file. At block 196 the microprocessor 19 determines whether the INCLUDE command is in the line of script and if so, the microprocessor proceeds to block 198 to write the file specified in the INCLUDE command to the first temporary file. If the microprocessor 19 determines that the line of script does not have the INCLUDE command therein, the microprocessor proceeds to block 200 to determine whether the line of script has the FINCLUDE command. If so, the microprocessor proceeds to block 202 to save the name of the format file specified in the FINCLUDE command. If the microprocessor determines at block 200 that the line does not have the FINCLUDE command, the microprocessor 19 proceeds to block 204 to write the line of script to the first temporary file, thereafter returning to block 190.

Figure 22:
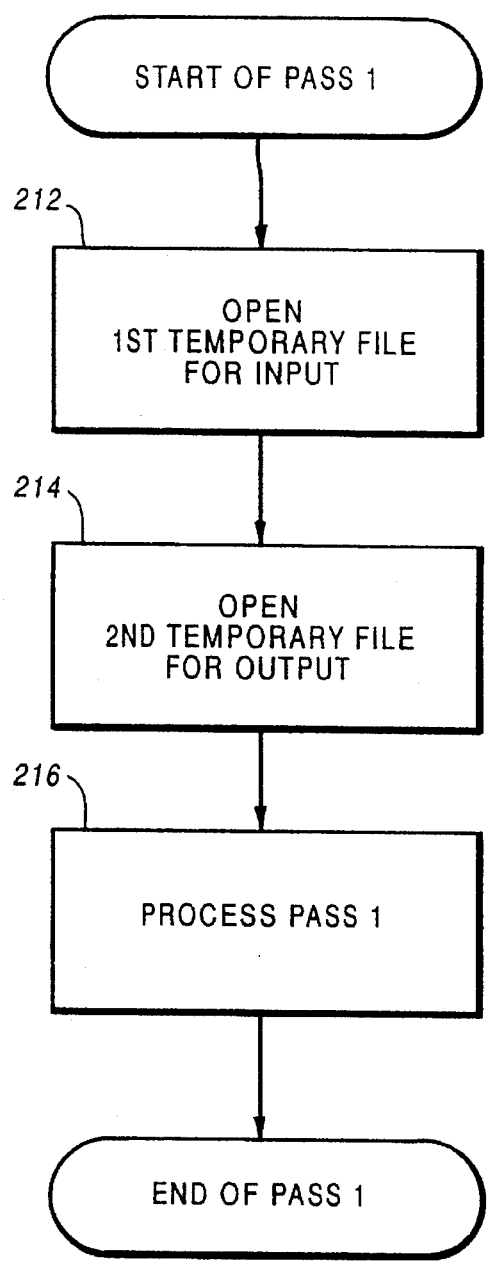
FIG. 22 is a flow chart illustrating a Pass 1 routine of the compiler.
Figures 23A, 23B:
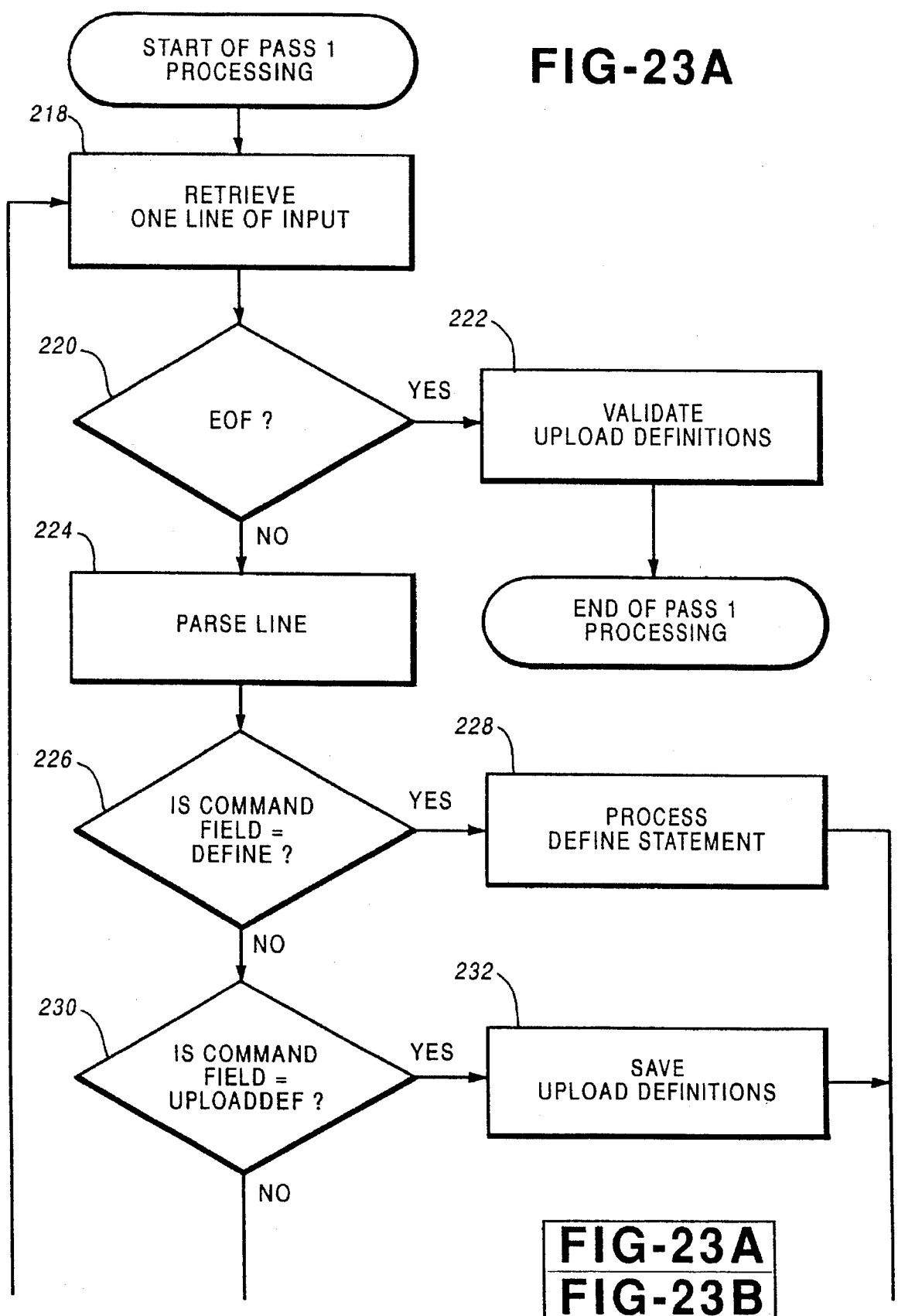
FIG. 23 is a flow chart illustrating the processing of the Pass 1 routine.
Figure 23B:
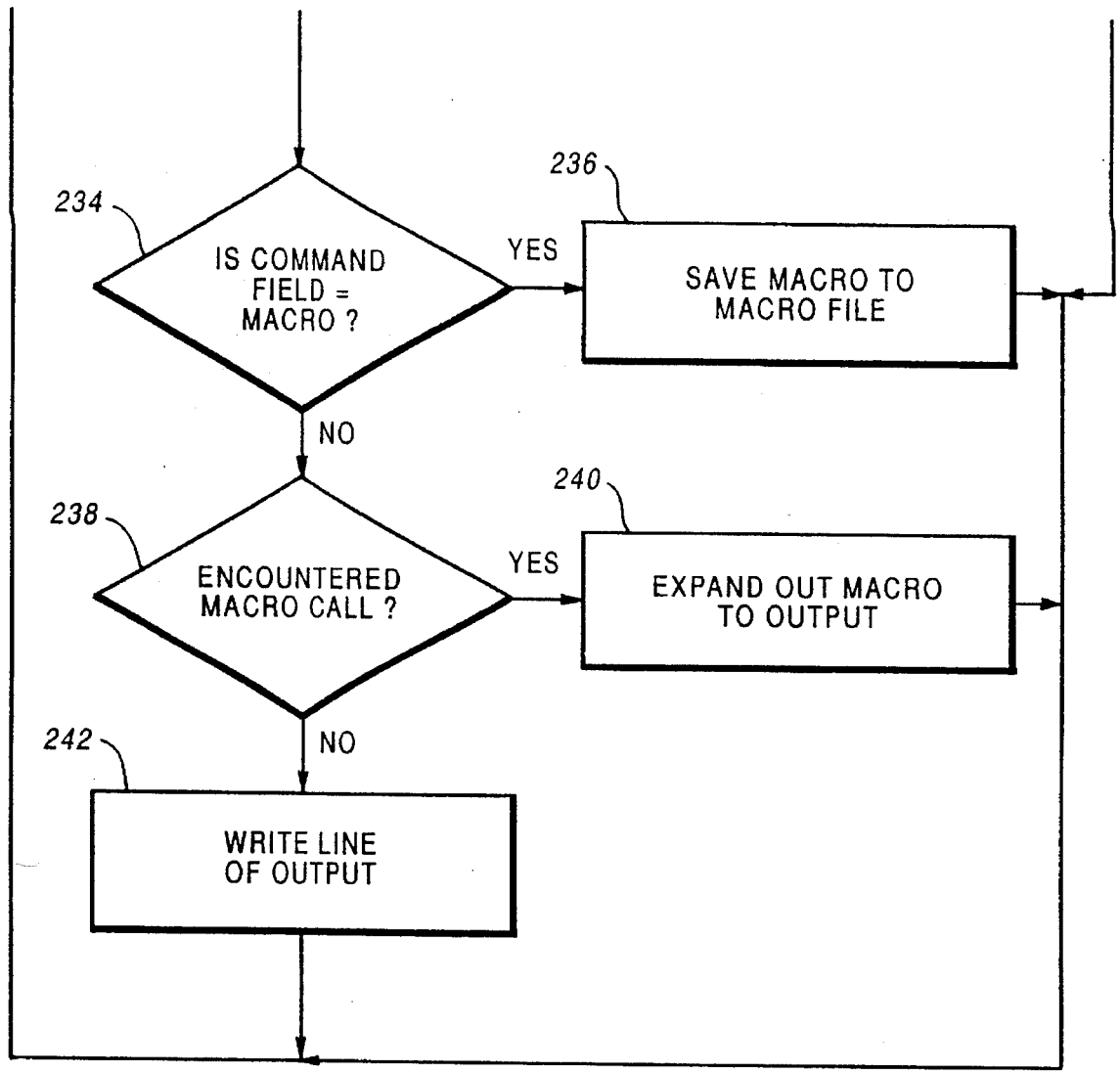

Returning to FIG. 13, after executing pass 0 at block 182, the microprocessor 19 proceeds to block 206 to determine whether any errors were returned from the Compiler routine and if so the microprocessor 19 processes the compiler errors at block 208. If no compiler errors were returned from the execution of pass 0, the microprocessor 19 proceeds to block 210 to execute pass 1 as shown in FIGS. 22 and 23. The microprocessor 19 utilizes during pass 1, the first temporary file generated by the microprocessor during pass 0. During pass 1, any upload definition commands found in the script are located and stored. Further, the buffer field tables from any Define commands in the script are built. During pass 1 a second temporary file is generated which is utilized during pass 2 and pass 3. This temporary file has the INCLUDE statement expanded and DEFINE statements stripped out.

More particularly, as shown in FIG. 22, at the start of pass 1 the microprocessor 19 at a block 212 opens the first temporary file for input and at block 214 opens the second temporary file for output. Thereafter, the microprocessor 19 at a block 216 processes the pass 1 routine depicted in FIG. 23. As shown in FIG. 23, the microprocessor at block 218 retrieves one line from the first temporary file and at block 220 determines whether this is the end of the file. If so, the microprocessor proceeds to block 222 to validate any upload definitions found. If the microprocessor 19 determines at block 220 that the line retrieved at block 218 is not the end of the file, the microprocessor proceeds to block 224 to parse the retrieved line. Thereafter, the microprocessor at block 226 determines whether the line includes the Define command and if so, the microprocessor proceeds to block 228 to process the Define statement by breaking the Define command into its component parts which are saved for later use. If the microprocessor determines at block 230 that the retrieved line includes the Upload definition command at block 230, the microprocessor 19 at a block 232 saves the upload definitions specified in the command for later use. If the microprocessor determines at a block 234 that the retrieved line includes the Macro command, the microprocessor 19 proceeds to block 236 to save the macro to a temporary macro file. If the microprocessor 19 determines at block 238 that a macro call has been encountered, the microprocessor 19 proceeds to block 240 to write to the second temporary file the sequence of commands associated with the macro. If the microprocessor determines that the retrieved line did not include the Define command, the Upload definition command, the Macro command or a macro call, the microprocessor at a block 242 writes the retrieved line to the second temporary file, thereafter returning to block 218.

Returning to FIG. 13, after executing pass 1 at block 210, the microprocessor 19 at a block 244 determines whether any errors were returned from pass 1 and if so, the microprocessor proceeds to block 245 to process the compiler errors. However, if no compiler errors were returned from pass 1, the microprocessor proceeds to block 246 to execute pass 2 in accordance with the flow charts depicted in FIGS. 24 and 25. During the second pass, the second temporary file built by pass 1 is read and each command in the file is validated. Label and function tables used by pass 3 are also built during pass 2 and undefined buffer fields are checked for.

Figure 24:
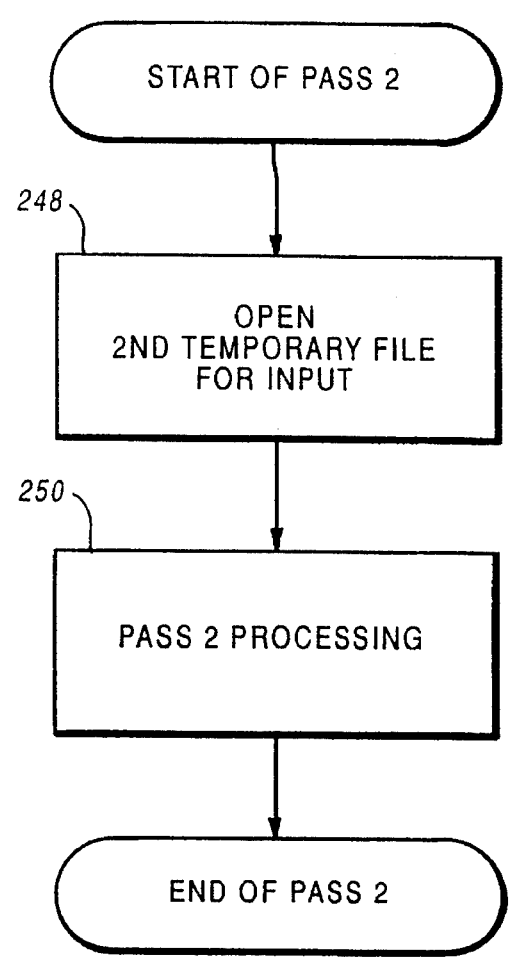
FIG. 24 is a flow chart illustrating a Pass 2 routine of the compiler.
Figure 25:
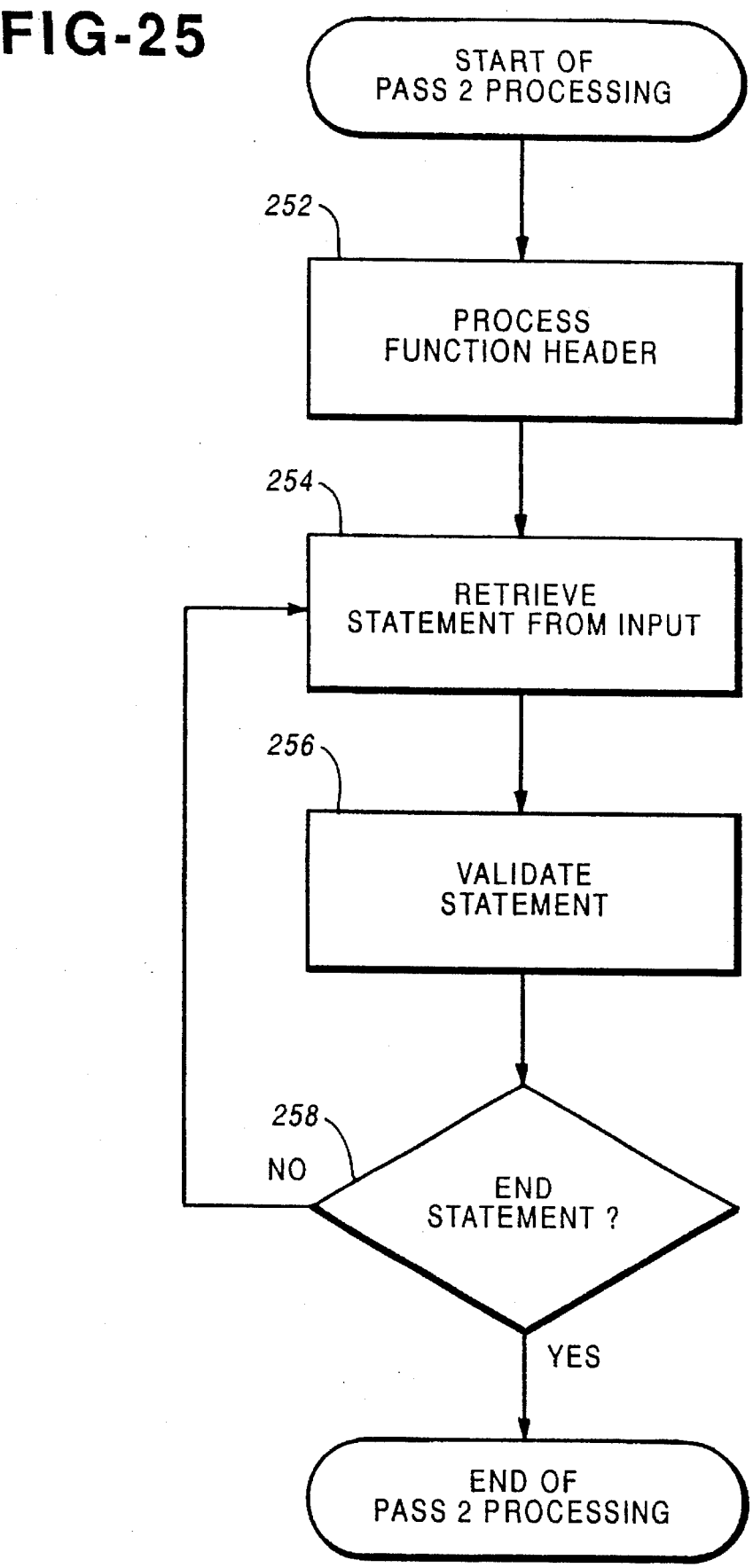
FIG. 25 is a flow chart illustrating the processing of the Pass 2 routine.

More particularly, as shown in FIG. 24, at the start of pass 2 the microprocessor 10 at a block 248 opens the second temporary file for input and at block 250 implements pass 2 in accordance with the flow chart depicted in FIG. 25. As shown in FIG. 25, the microprocessor at a block 252 processes each function header by searching for the word "FUNCTION" and storing the name of the function in a table with the associated line number in the script. Thereafter, at a block 254, the microprocessor 19 retrieves a line from the second temporary file and at block 256 the microprocessor validates the command specified in the retrieved line of script. Examples of the validation routines for five commands are illustrated in FIGS. 30–34 discussed below. As will be appreciated by one of ordinary skill in the art, the validation routines for the remaining commands are very similar to those depicted. Therefore the validation routines will not be described in detail. During pass 2, each of the commands of the script is retrieved and validated at blocks 254 and 256 until the End statement is encountered as determined by the microprocessor at block 258.

With reference again to FIG. 13, upon finishing the execution of pass 2, the microprocessor 19 proceeds to block 260 to determine whether any errors were returned from the execution of pass 2 and if so, the microprocessor proceeds to block 262 to process the compiler errors. If no compiler errors were returned from the execution of pass 2, the microprocessor proceeds from bock 260 to block 264 to execute pass 3. During pass 3, the microprocessor 19 reads the second temporary file built during pass 1 and converts the second temporary file into an application file packet, the packet being stored in a third temporary file. The microprocessor 19 validates functions and labels during pass 3 and further builds the ASCII string and number tables.

Figure 26:
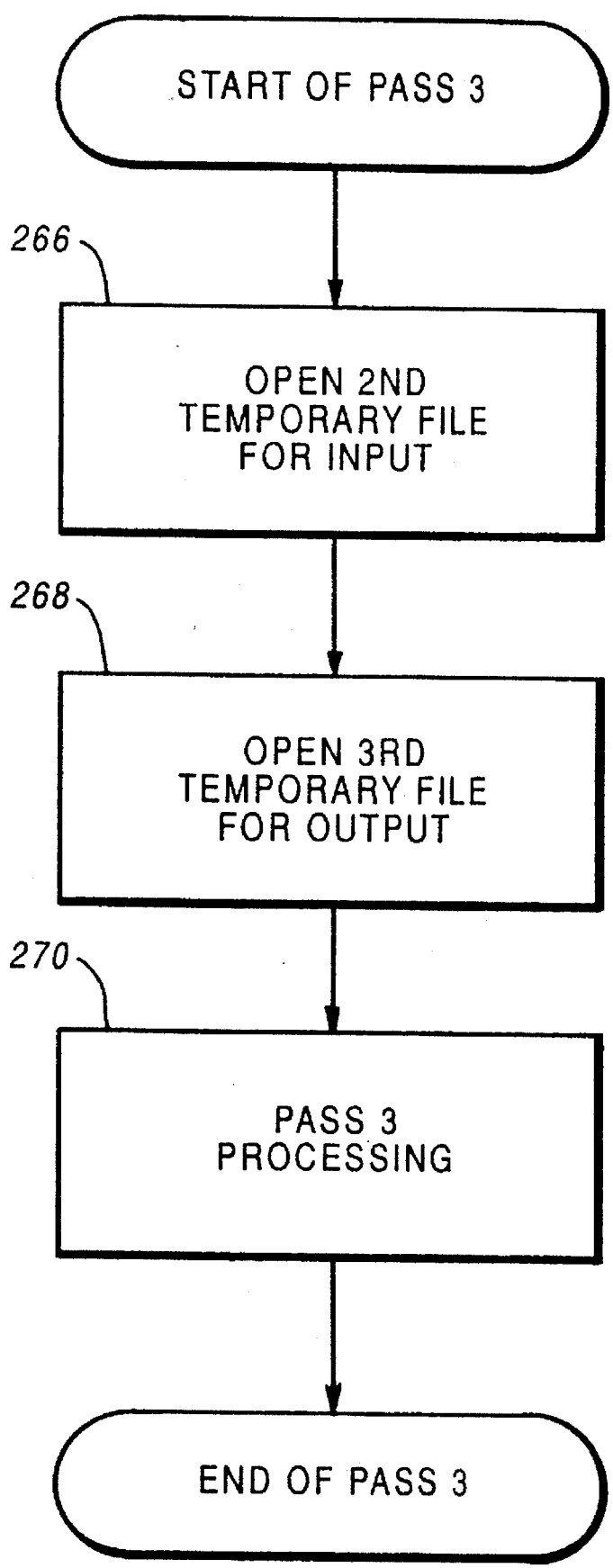
FIG. 26 is a flow chart illustrating a Pass 3 routine of the compiler.
Figure 27:
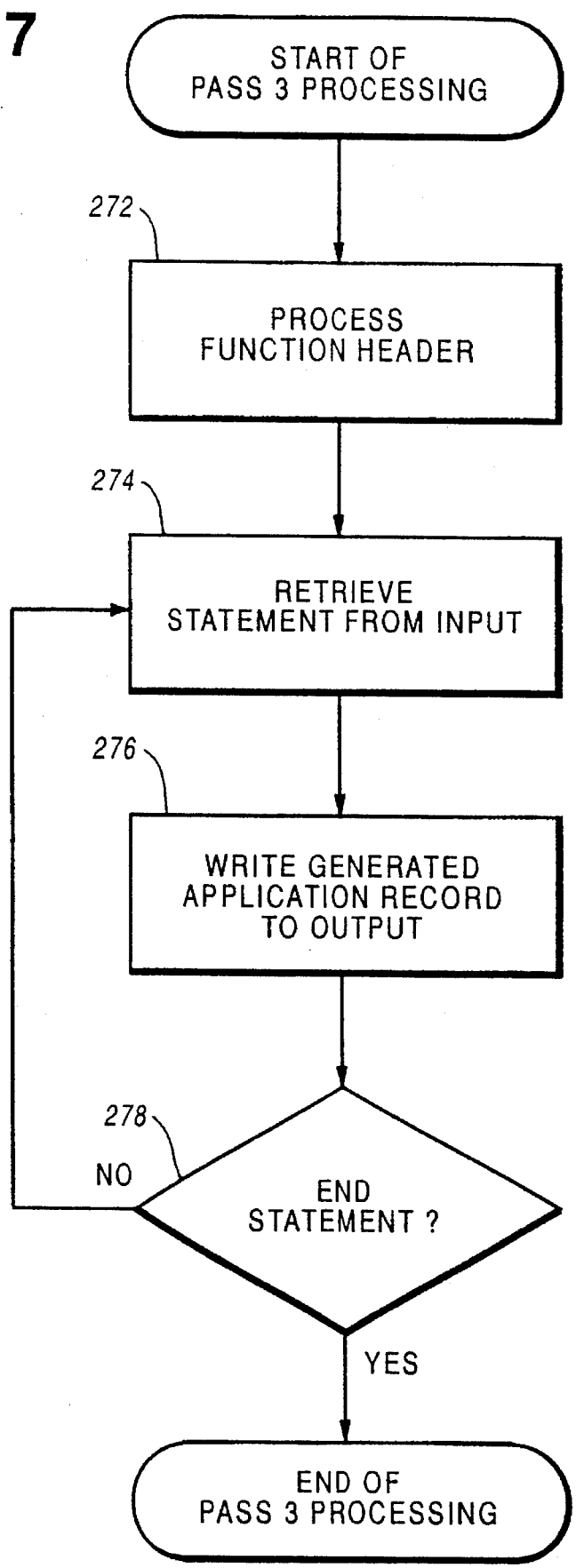
FIG. 27 is flow chart illustrating the processing the Pass 3 routine.

More particularly, as shown in FIGS. 26 and 27, the microprocessor 19 at the start of pass 3, first opens the second temporary file for input at a block 266. Thereafter, the microprocessor 19 at a block 268 opens a third temporary file for output and proceeds to block 270 to execute pass 3 in accordance with the flow chart depicted in FIG. 27. As shown in FIG. 27, the microprocessor at a block 272 processes the function header and at block 274 retrieves a line from the second temporary file. Thereafter, the microprocessor 19 at a block 276 translates the retrieved line into a command record that is capable of being executed by the labeler 12 and writes the translated line to the third temporary file. It is noted that at block 276 certain commands are combined. For example, a Right Strip or Left Strip Command is translated into a Strip command which includes information indicating whether the characters are to be stripped from the right or left. Further, the Suspend command is translated into an Exit command with a suspend option designated therein. The microprocessor proceeds to translate each line of the second temporary file in accordance with blocks 274, 276 and 278 until the End statement is encountered.

Figure 28:
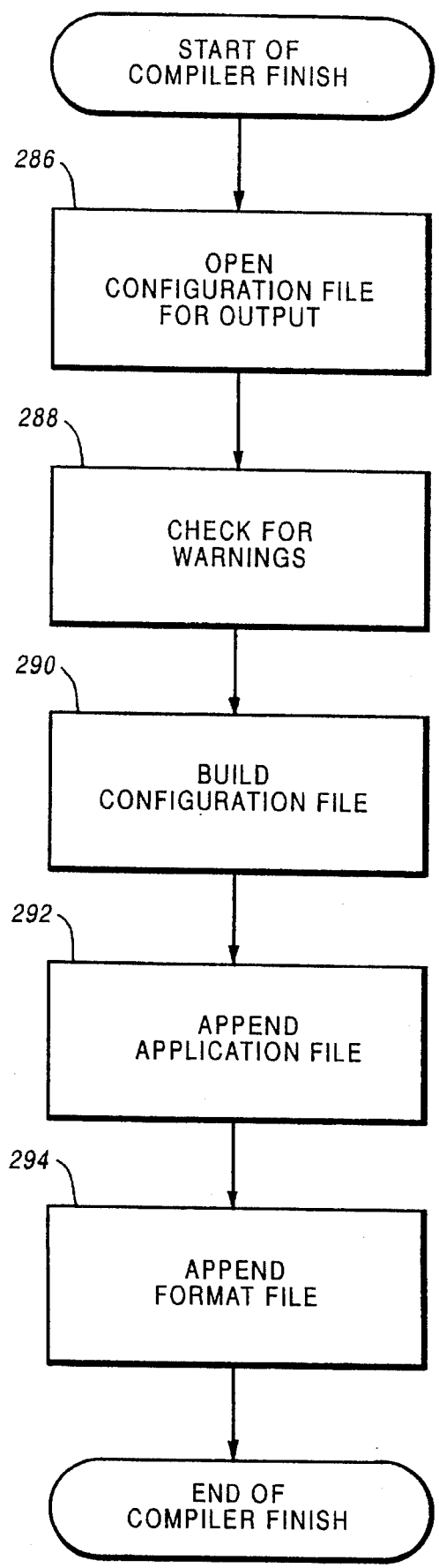
FIG. 28 is a flow chart illustrating a Compiler Finish routine.

Returning to FIG. 13, the microprocessor at a block 280 determines whether any errors were returned form pass 3 and if so, the microprocessor 19 processes the compiler errors at a block 282. If no compiler errors were returned from the execution of pass 3, the microprocessor proceeds to block 284 to execute a Compiler Finish routine as depicted in FIG. 28. During the execution of the Compiler Finish routine, the microprocessor 19 builds a configuration file from the third temporary file generated during pass 3 and the tables generated during passes 1, 2 and 3. First the buffer definition packets are written to the configuration file followed by the ASCII string and number packets. Thereafter, the Upload definition is written to the configuration file followed by the temporary file that holds the application file packet. If an error is encountered during the building of the configuration file, the file is deleted. If no errors have been encountered, the file specified in any FINCLUDE command is appended to the end of the configuration file.

More particularly, as shown in FIG. 28, the microprocessor at a block 286 opens a configuration file for output. Thereafter, the microprocessor 19 at a block 288 checks for warning messages. At block 290 the microprocessor builds the configuration file from the work buffer definitions. Thereafter, at a block 292 the microprocessor appends the application file and at block 294 the microprocessor 19 appends the format files specified in any FINCLUDE statements.

Figure 29:
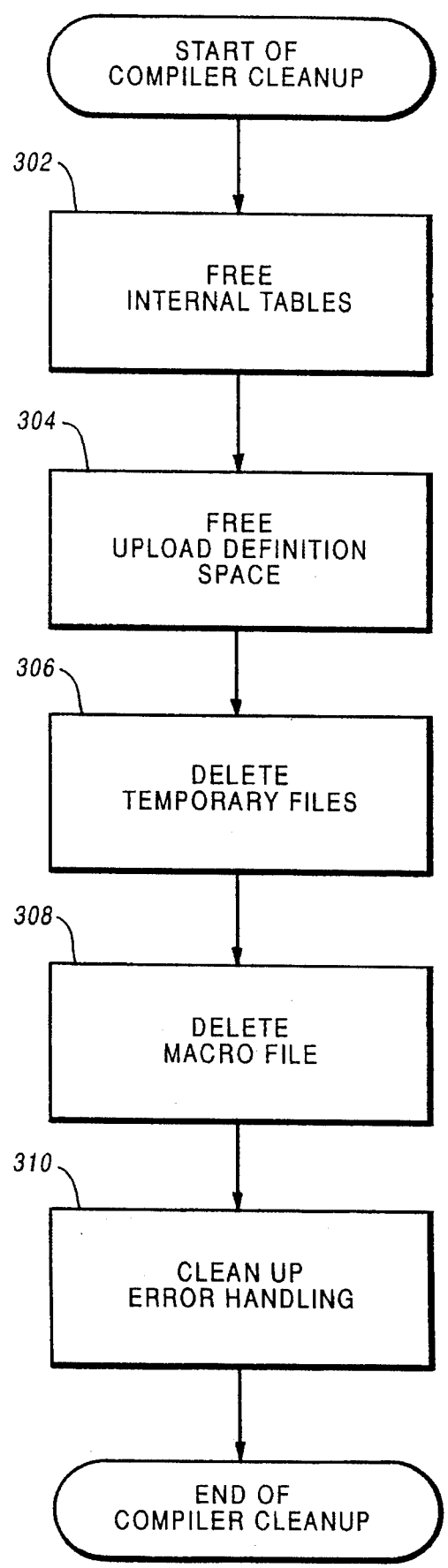
FIG. 29 is a flow chart illustrating a Compiler Clean Up routine.
Figure 30A:
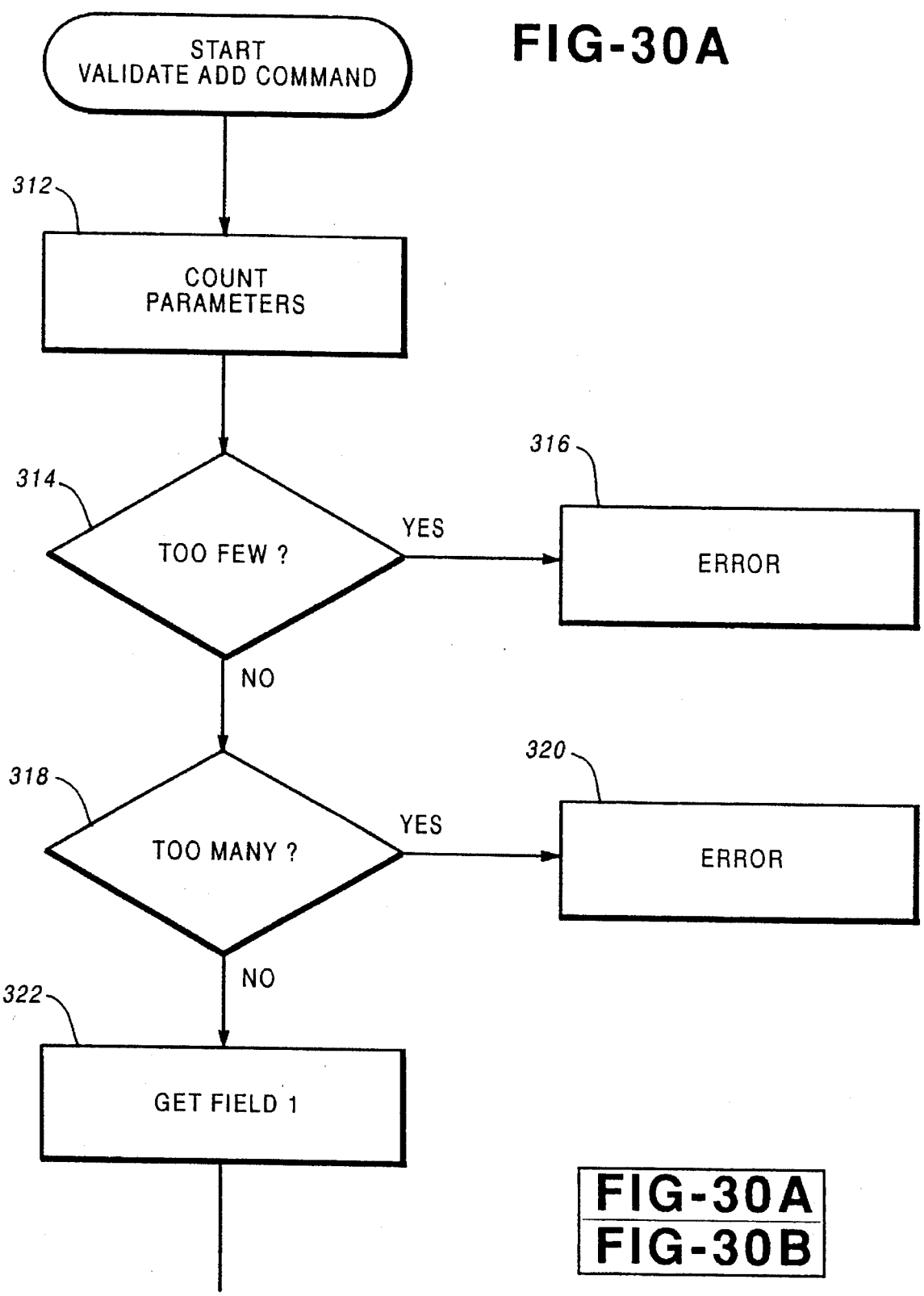
FIG. 30 is a flow chart illustrating a Validate Add command routine of the program generator.
Figure 30B:
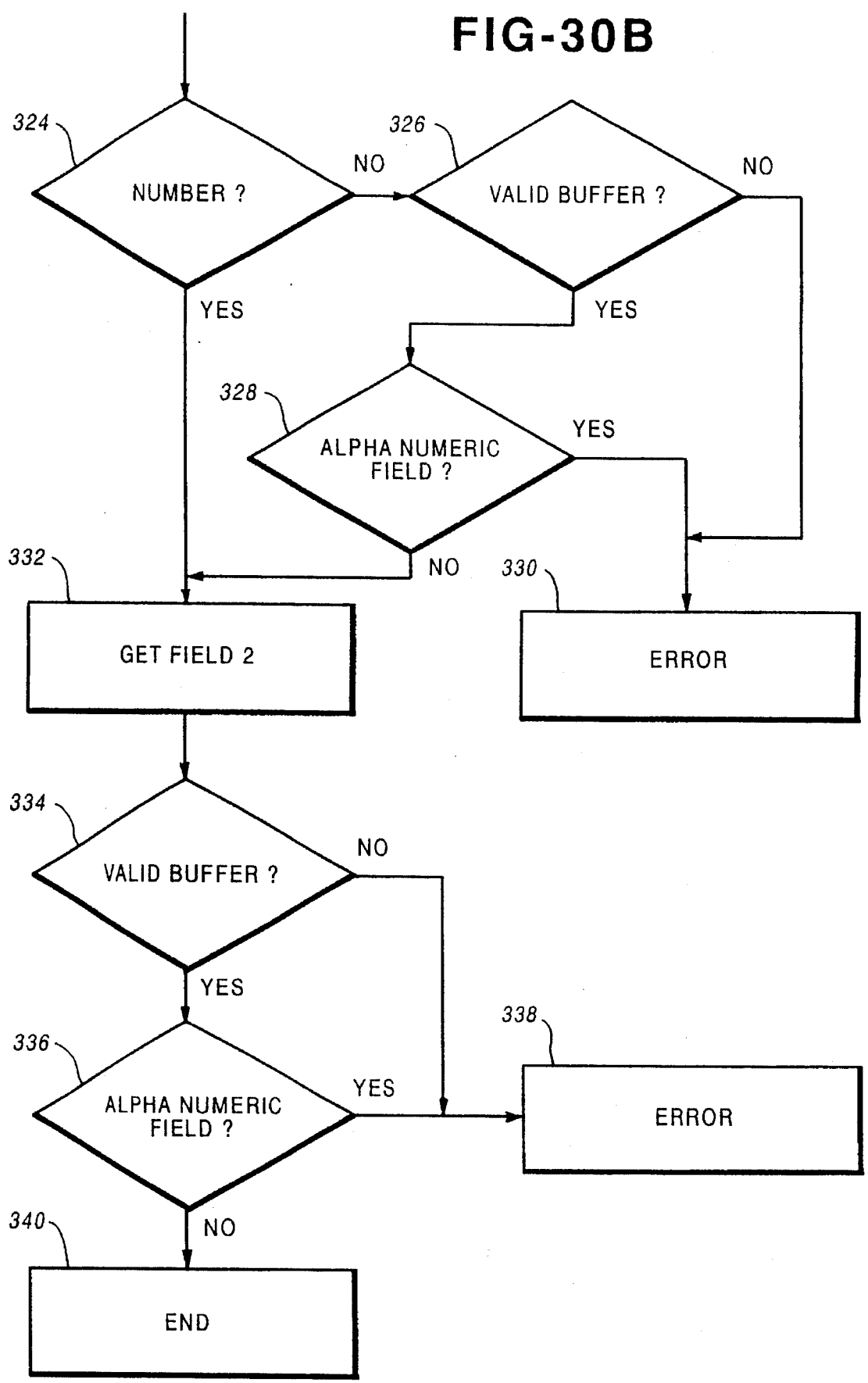

Again returning to FIG. 13, the microprocessor at a block 296 determines whether any errors were returned from the Compiler Finish routine and if so, the microprocessor proceeds to block 298 to process the compiler errors. If no errors were returned from the Compiler Finish routine, the microprocessor proceeds to block 300 to execute the Compiler Clean Up routine depicted in FIG. 29. More particularly, as shown in FIG. 29, the microprocessor 19 at a block 302 frees the internal tables and at block 304 frees the upload definition space. The microprocessor at a block 306 then deletes the temporary files generated during the operation of the compiler and at block 308 the microprocessor 19 deletes the macro file. Thereafter, the microprocessor at a block 310 cleans up error handling.

The microprocessor 19 validates each command of a user generated script during the execution of the compiler as discussed above. More particularly, the microprocessor 19 in accordance with the routine depicted in FIG. 30, validates the Add command as follows. At a block 312, the microprocessor counts the parameters specified in the Add command. At block 314 the microprocessor determines whether there are too few parameters and if so, the microprocessor at a block 316 logs an error message. The microprocessor 19 also checks at a block 318 whether too many parameters are specified in the Add command and if so, the microprocessor proceeds to block 320 to log an error message. If the number of parameters specified in the Add command is a valid number, the microprocessor 19 proceeds to block 322 to get the first field from the Add command. Thereafter, the microprocessor at a block 324 determines whether the first field is a number and if so, the microprocessor proceeds to block 332. If the microprocessor determines at block 324 that the first field is not a number, the microprocessor proceeds to block 326 to determine whether the first field represents a valid buffer definition. If not, the microprocessor proceeds to block 330 to log an error message. If the microprocessor at block 326 determines that the first field specifies a valid buffer definition and if the microprocessor further determines at block 328 that the field of the buffer specified is not an alphanumeric field, the microprocessor proceeds to block 332. Otherwise, the microprocessor logs an error message at block 330. At block 332 the microprocessor retrieves the second field of the add command. Thereafter, the microprocessor at a block 334 determines whether the second field includes a valid buffer definition and determines at block 336 whether the buffer field specified is an alphanumeric field. If the second field does not specify a valid buffer or the field is an alphanumeric field, the microprocessor proceeds to block 338 to log an error message. Otherwise, the Add command is validated. It is noted, that when the microprocessor 19 logs an error message, the microprocessor generates a message that identifies the type of error and the line number of the script where the error occurred so that the user can easily edit the script to correct any errors therein.

Figure 31A:
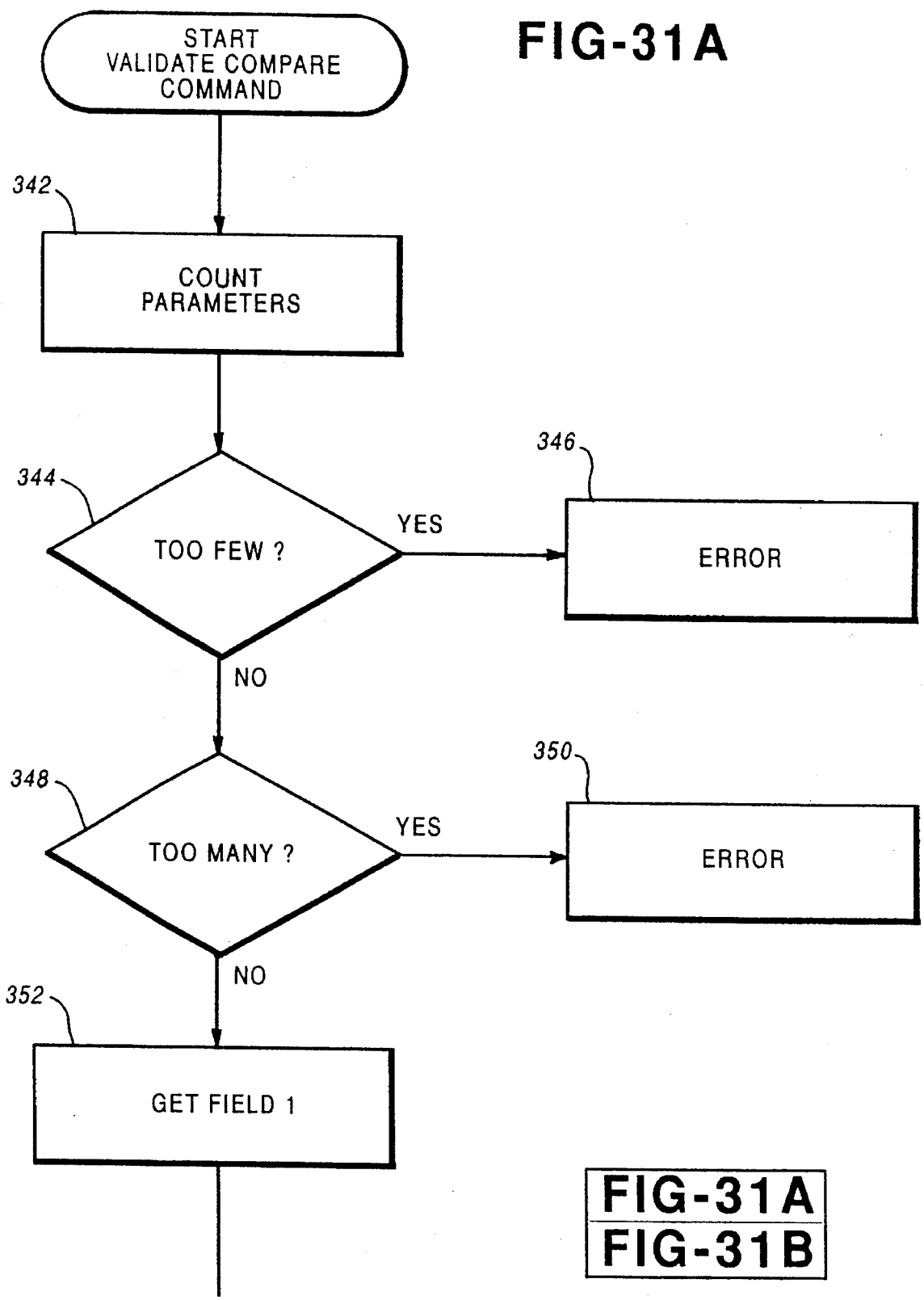
FIG. 31 is a flow chart illustrating a Validate Compare command routine of the program generator.
Figure 31B:
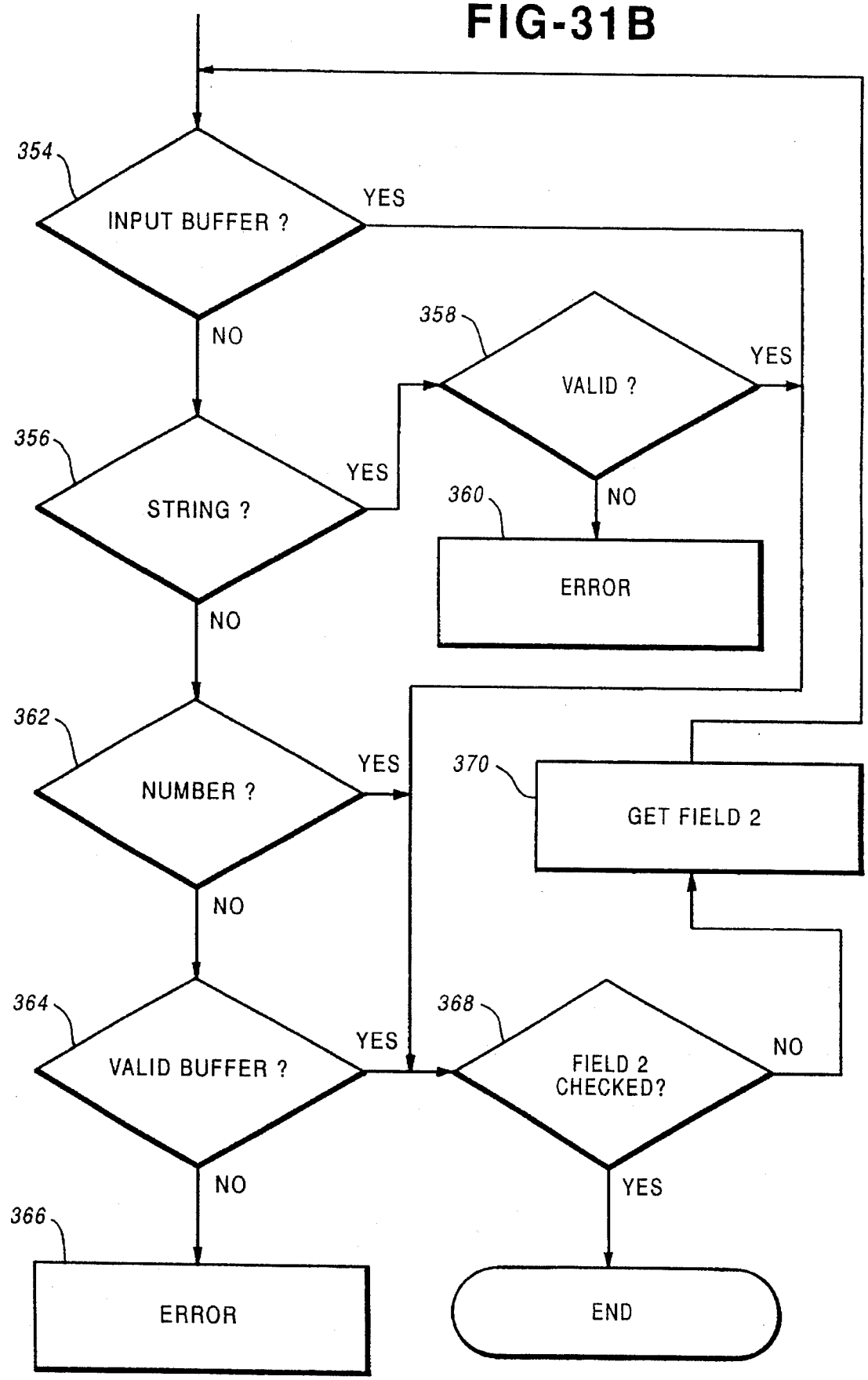

The validation routine for the Compare command is depicted in FIG. 31. Upon entering the Validate Compare command, the microprocessor at a block 342 counts the parameters in the Compare command. At block 344 and 348 the microprocessor respectively determines whether there are too few or too many parameters and if so, the microprocessor logs the appropriate error message at respective blocks 346 and 350. If the number of parameters specified in the Compare command is validated, the microprocessor proceeds to block 352 to retrieve the first field from the Compare command. Thereafter, at a block 354 the microprocessor determines whether the first field specifies the input buffer and if so, the microprocessor proceeds to block 368 to check the second field specified in the Compare command. If the microprocessor determines at block 354 that the input buffer was not specified in the first field, the microprocessor determines at a block 356 whether a string was specified and if so, proceeds to block 358 to determine whether the string is valid. If the string is determined to be valid, the microprocessor 19 proceeds to block 368; otherwise, the microprocessor proceeds to block 360 to log an error message. If the microprocessor determines at block 356 that the first field was not a string, the microprocessor proceeds to block 362 to determine whether the first field specifies a number and if so, the microprocessor proceeds to block 368. Otherwise, the microprocessor proceeds to block 364 to determine whether the first field specifies a valid buffer definition. If not, the microprocessor 19 proceeds to block 366 to log an error message. If the microprocessor at a block 368 determines that the second field has not been checked, the microprocessor proceeds to block 370 to retrieve the second field and returns to block 354 to validate the second field as discussed above with respect to the first field.

Figure 32A:
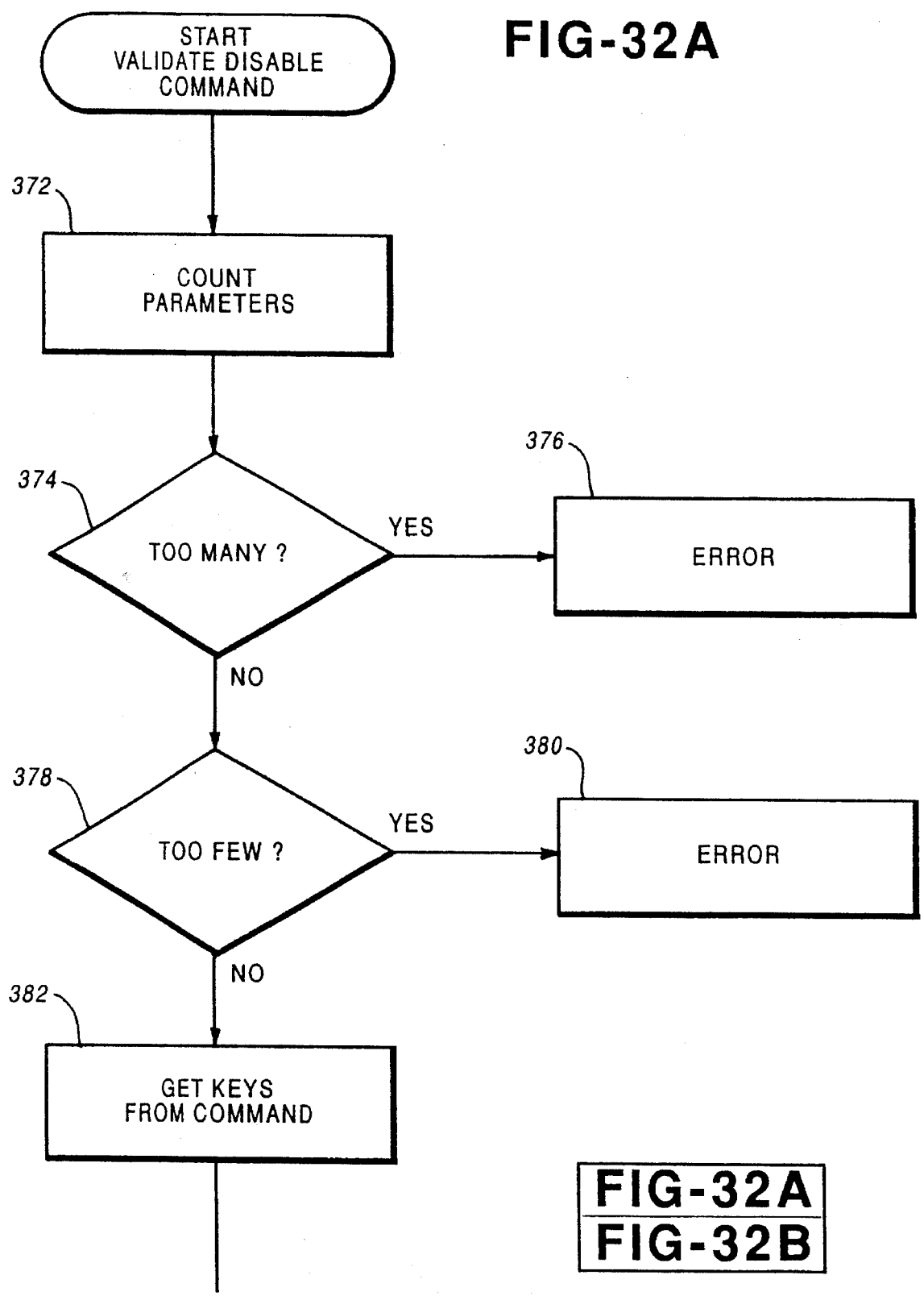
FIG. 32 is a flow chart illustrating a Validate Disable command routine of the program generator.
Figure 32B:
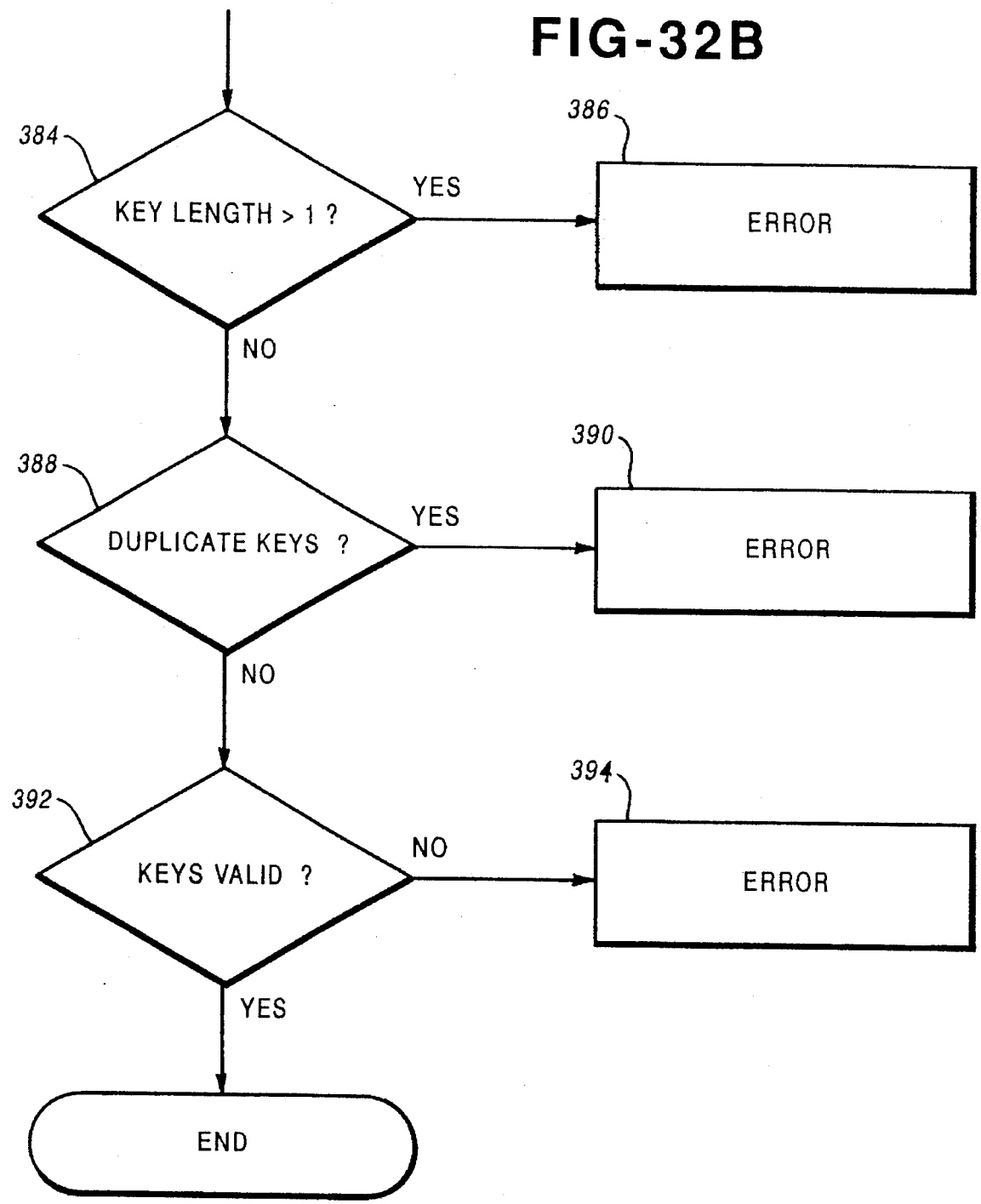

The microprocessor as shown in FIG. 32 validates a Disable command for a programmable key, i.e. a hot key, as follows. The microprocessor 19 first counts the number of parameters in the Disable command at a block 372. Thereafter, at respective blocks 374 and 378, the microprocessor determines whether there are too many or too few parameters in the Disable command and if so, the microprocessor 19 proceeds to a respective block 376 or 380 to log in an error message. If the number of parameters in the Disable command validates, the microprocessor proceeds to block 382 to get the keys specified in the Disable command. Thereafter, at a block 384 the microprocessor determines whether the length of the key is greater than one and if so, the microprocessor 19 proceeds to a block 386 to log an error message. Otherwise, the microprocessor 19 proceeds to a block 388 to determine whether any duplicate keys are specified in the Disable command. If duplicate keys are specified the microprocessor proceeds to block 390 to log an error message. Finally, at a block 392 the microprocessor 19 determines whether the keys specified are valid programmable keys, i.e. hotkeys. If not, the microprocessor proceeds to block 394 to log an error message.

Figure 33A:
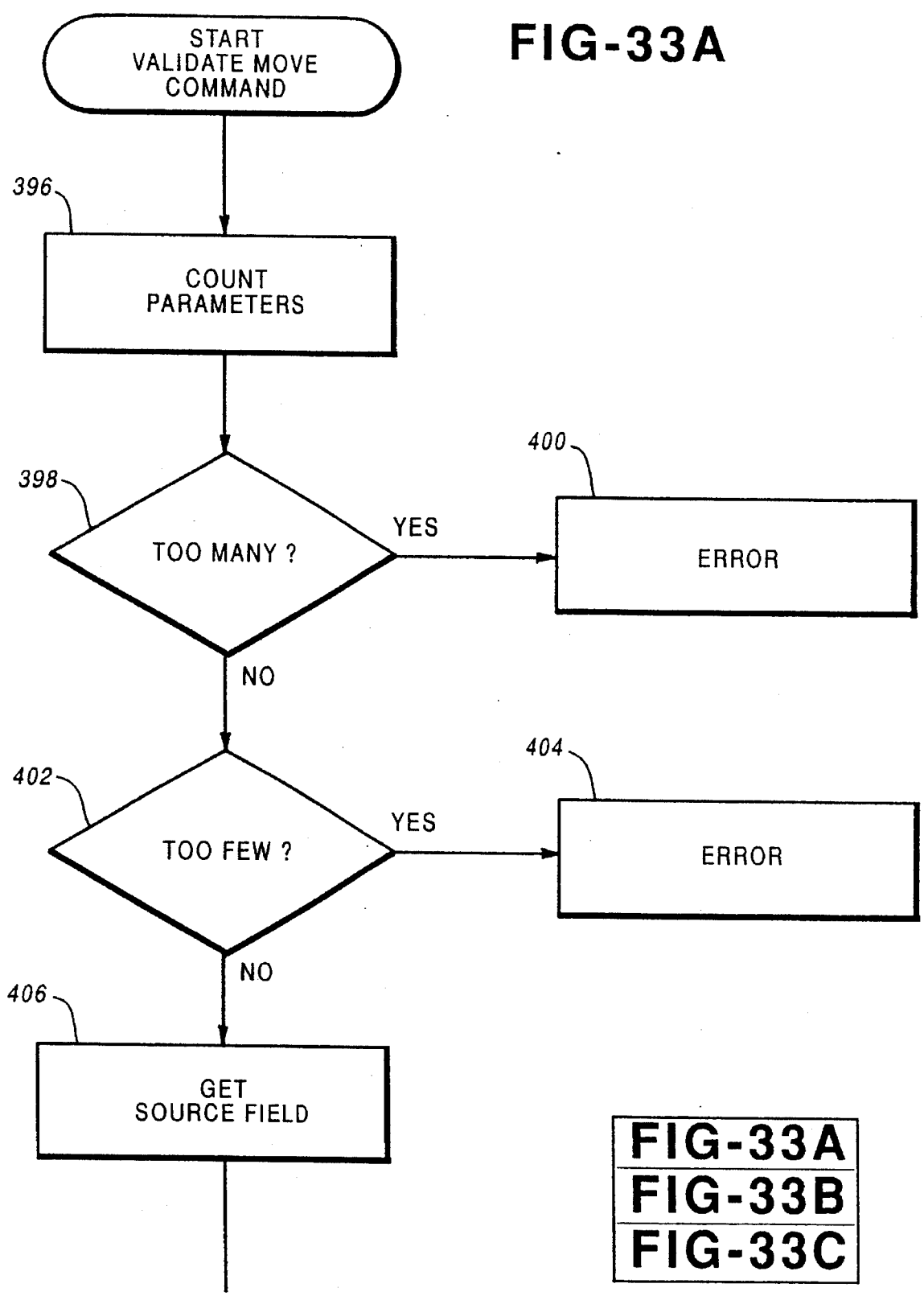
FIG. 33 is a flow chart illustrating a Validate Move command routine of the program generator.
Figure 33B:
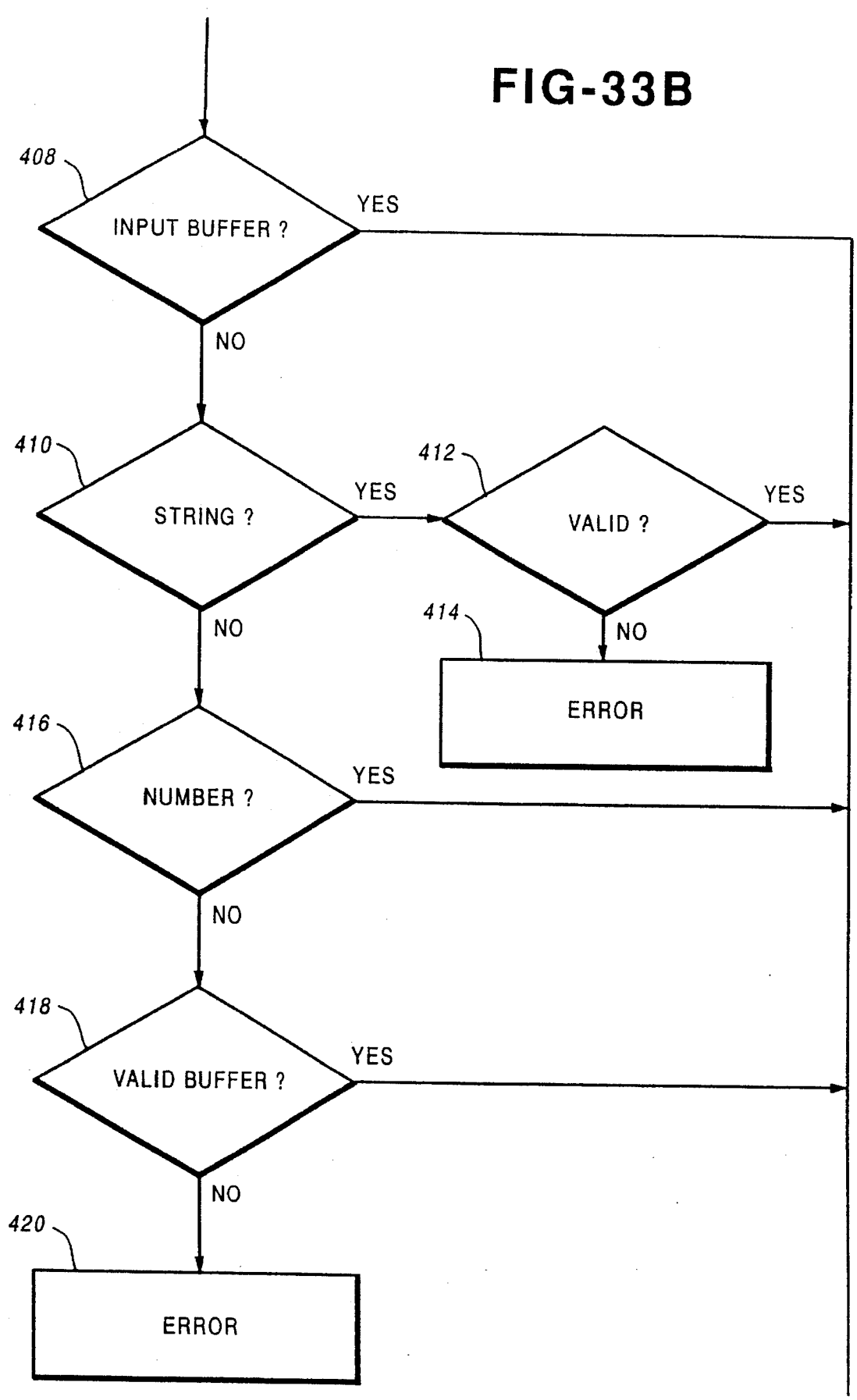
Figure 33C:
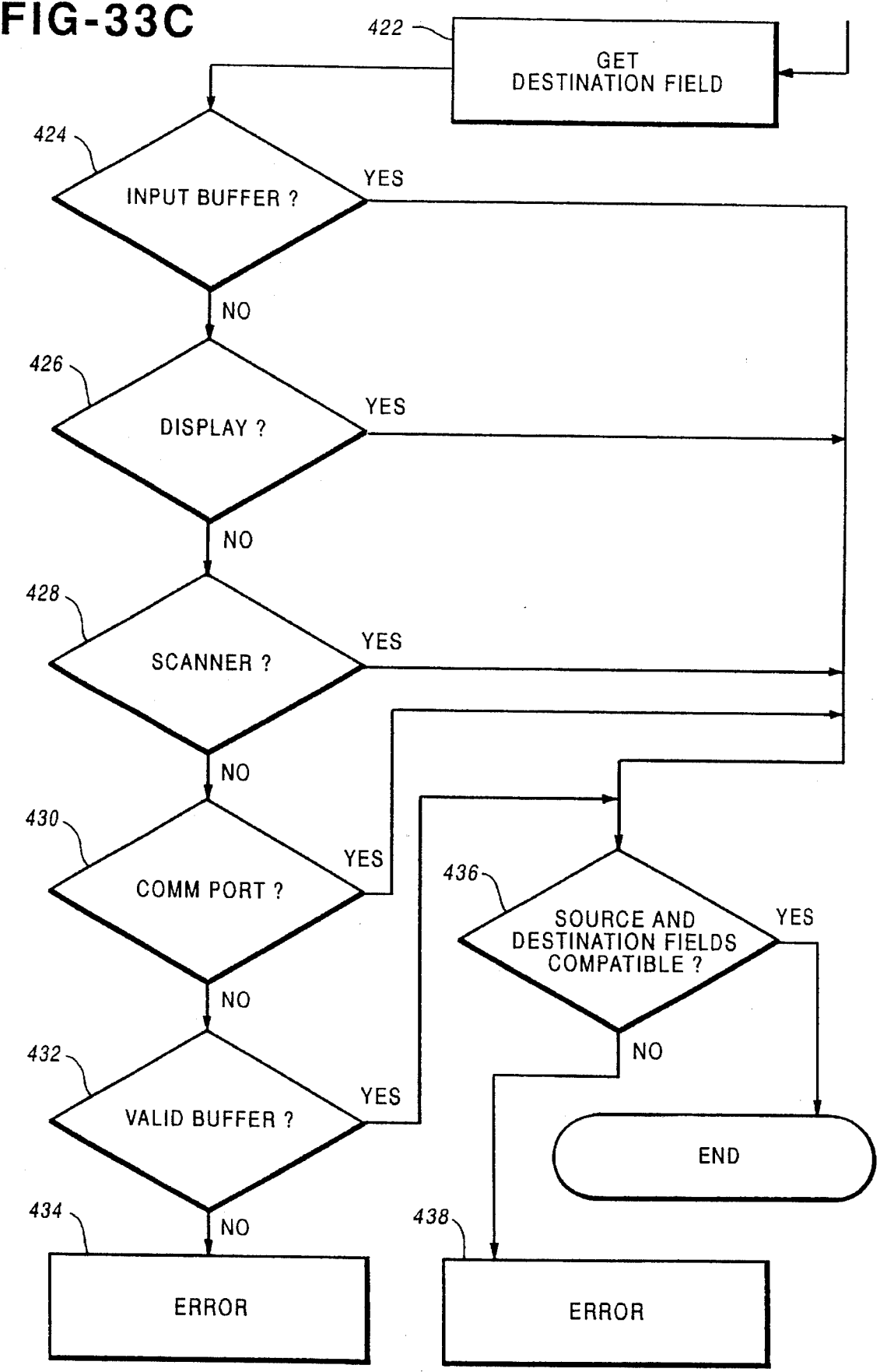

The microprocessor 19 validates a Move command in accordance with the flow chart depicted in FIG. 33. More particularly, the microprocessor at a block 396 counts the number of parameters in the Move command. Thereafter, the microprocessor determines at respective blocks 398 and 402 whether there are too many or too few parameters and if so, the microprocessor proceeds to a respective block 400 or 404 to log the appropriate error message. If the number of parameters in the Move command validates, the microprocessor proceeds to a block 406 to retrieve the source field specified in the Move command. The microprocessor next determines at a block 408 whether the source field is the input buffer and if so, the microprocessor proceeds to block 422 to retrieve the destination field. If the source field does not designate the input buffer, the microprocessor proceeds to block 410 to determine whether the source field is a string. if so, the microprocessor proceeds to block 412 to determine whether the string is valid and if so, the microprocessor proceeds to block 422. If the string is not valid, the microprocessor logs an error message at block 414. If the microprocessor 19 determines that the source field is not a string but determines that the source field is a number at a block 416, the microprocessor proceeds to block 422. Otherwise, the microprocessor proceeds to block 418 to determine whether the source field represents a field in a valid buffer. If not, the microprocessor proceeds to block 420 to log an error message. After the source field is validated, the microprocessor proceeds to a block 422 to retrieve the destination field. Thereafter, at block 424 the microprocessor determines whether the destination field is the input buffer and if so, the microprocessor proceeds to block 436. Otherwise, the microprocessor proceeds to block 426 to determine whether the destination field designates the display 33 of the labeler 12. If not, the microprocessor proceeds to respective blocks 428 and 430 to determine whether the destination field specifies the scanner 15 or the communication port of the labeler 12. Thereafter, the microprocessor proceeds to block 432 to determine whether the second field designates a field in a validly defined buffer. If not, the microprocessor proceeds to block 434 to log an error. After validating the destination field at a respective block 424, 426, 428, 430 or 432, the microprocessor proceeds to block 436 to determine whether the source and destination fields designated are compatible. More particularly, the microprocessor determines whether the source field is an alphanumeric field and whether the destination field is a numeric field. If so, the microprocessor proceeds to block 438 to log an error message.

Figure 34A:
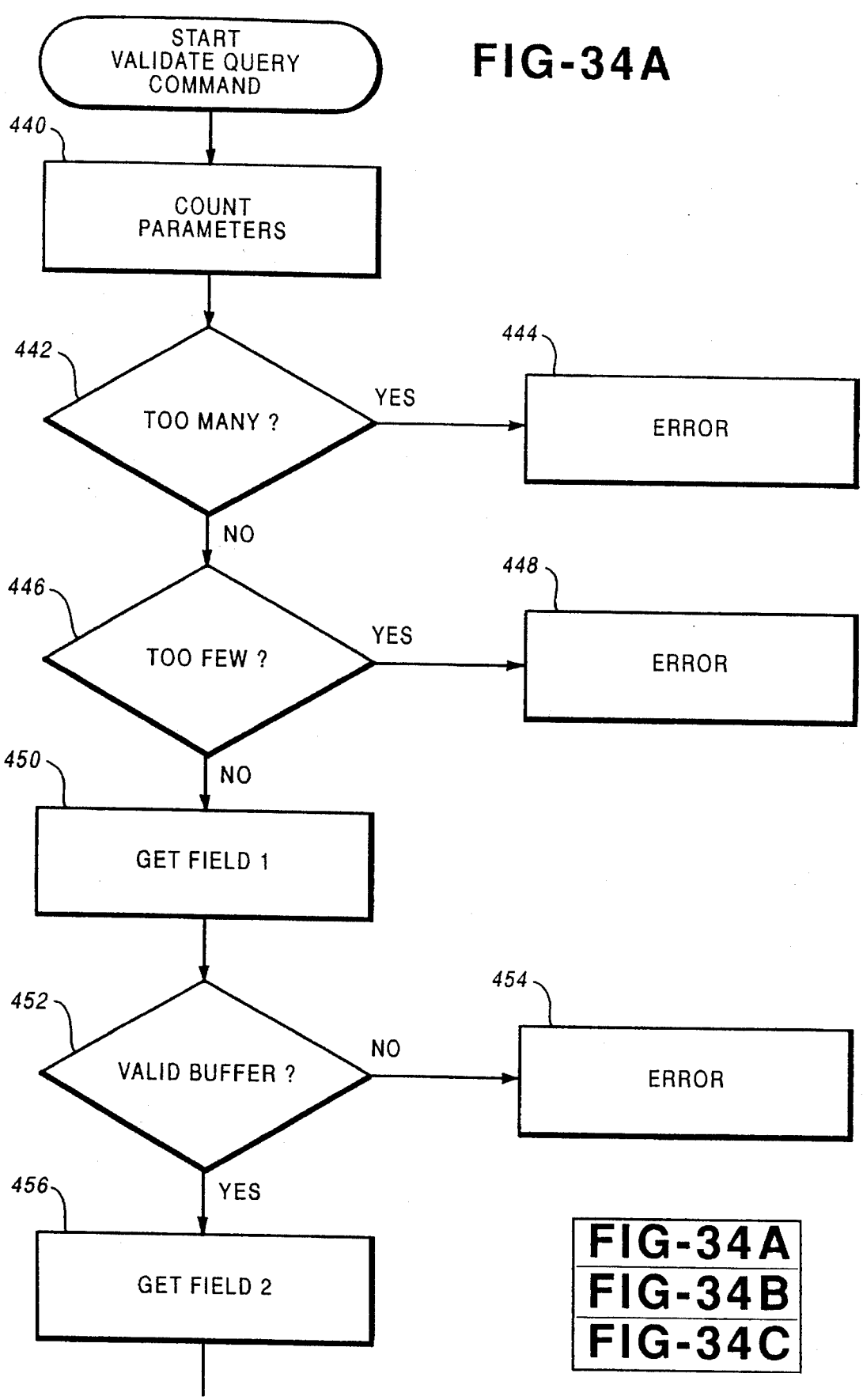
FIG. 34 is a flow chart illustrating a Validate Query command routine of the program generator.
Figure 34B:
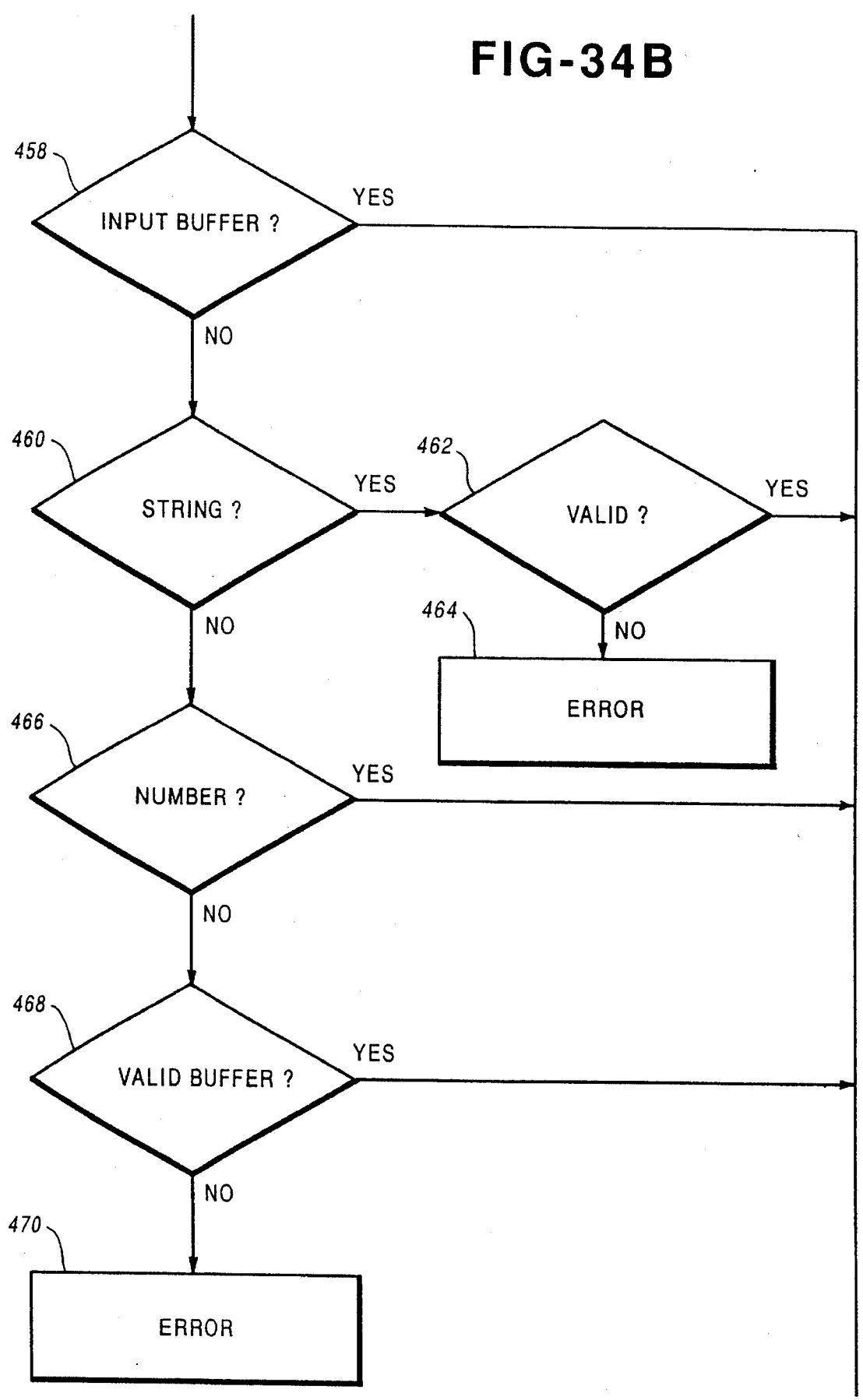
Figure 34C:
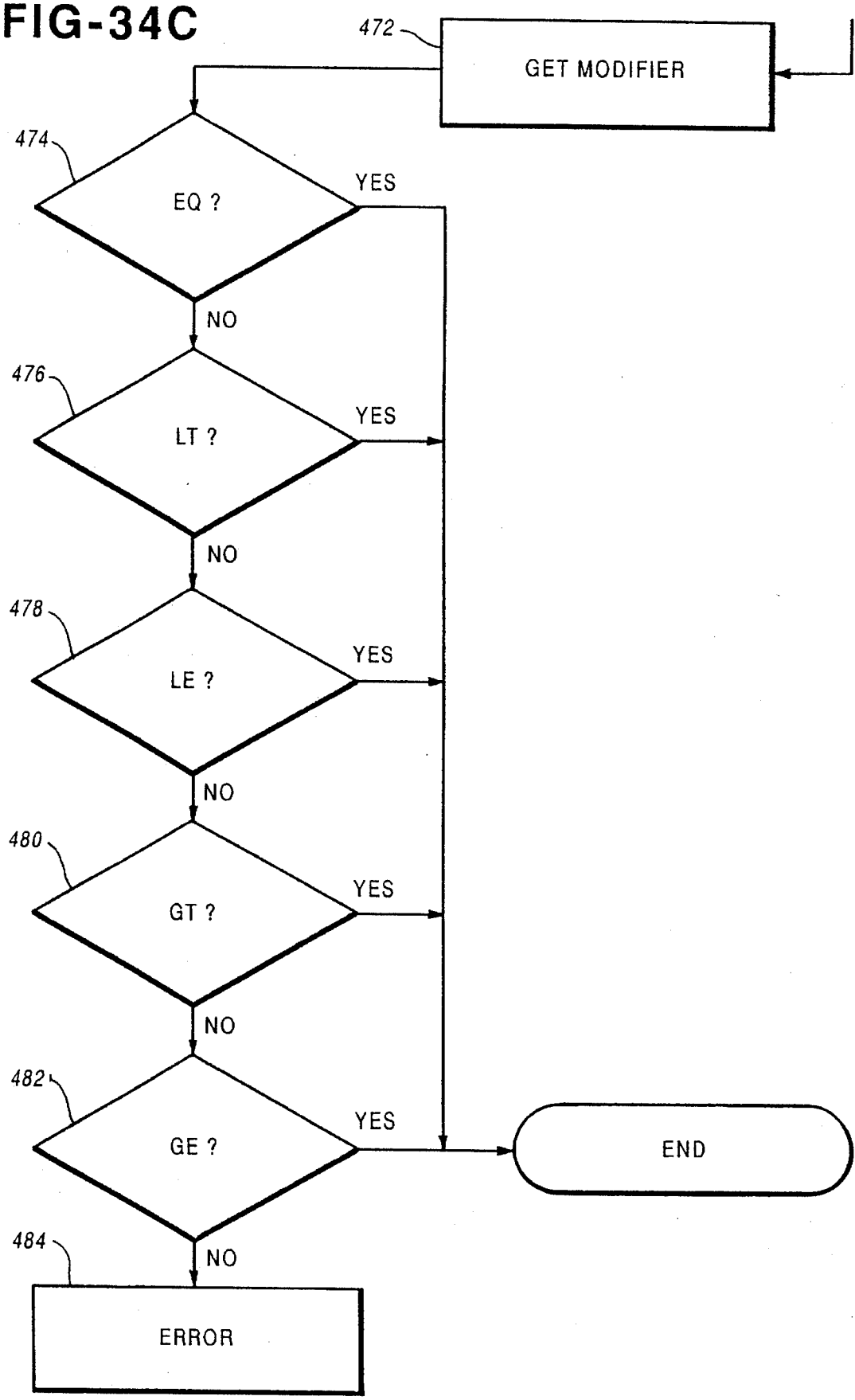

The microprocessor validates a Query command as depicted in FIG. 34. More particularly, at a block 440 the microprocessor counts the number of parameters specified in the Query command. Thereafter, the microprocessor 19 at a respective block 442 or 446 determines whether too many or too few parameters are specified in the Query command and if so, the microprocessor 19 proceeds to a respective block 444 or 448 to log an error message. If the number of parameters specified in the Query command validates, the microprocessor 19 proceeds to a block 450 to get the first field specified in the Query command. Thereafter, the microprocessor at a block 452 determines whether the first field includes a valid buffer definition and if not, the microprocessor proceeds to block 454 to log an error message. If the first field validates as determined by the microprocessor at block 452, the microprocessor 19 proceeds to block 456 to retrieve the second field from the Query command. Thereafter, the microprocessor determines whether the second field designates the input buffer and if so, the microprocessor 19 proceeds to block 472. Otherwise, the microprocessor proceeds to block 460 to determine whether the second field designates a string. Thereafter, the microprocessor proceeds to block 462 to determine whether the string is valid and if so proceeds to block 472. Otherwise, the microprocessor proceeds to block 464 to log an error message. If the microprocessor 19 determines that the second field does not designate the input buffer or a string, the microprocessor proceeds to block 466 to determine whether the second field is a number and if so, the microprocessor proceeds to block 472. Otherwise, the microprocessor proceeds to block 468 to determine whether the second field includes a valid buffer definition. If not, the microprocessor logs an error message at block 470. At block 472 the microprocessor 19 retrieves the modifier from the Query command and proceeds to block 474 to determine whether the modifier designates an equal query. If so, the microprocessor exits the Validate Query command routine. If the modifier does not designate an equal query, the microprocessor proceeds to blocks 476, 478, 480 and 482 to respectively determine whether the query is a less than query, a less than or equal to query, a greater than query or a greater than or equal to query. If the modifier is not an allowable modifier, the microprocessor logs an error message at a block 484.

Figure 14:
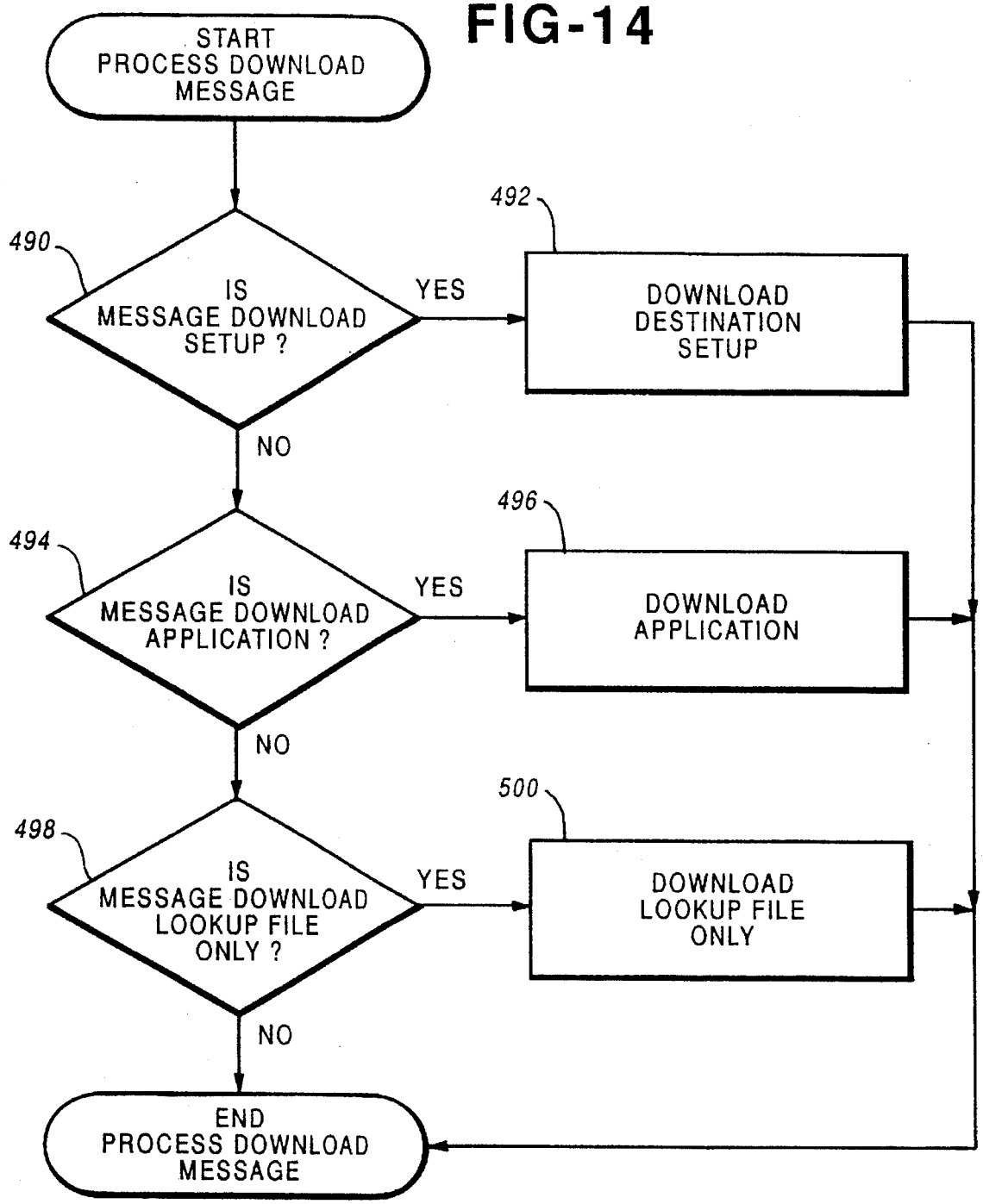
FIG. 14 is a flow chart illustrating a Process Download Message routine of the program generator.
Figure 15:
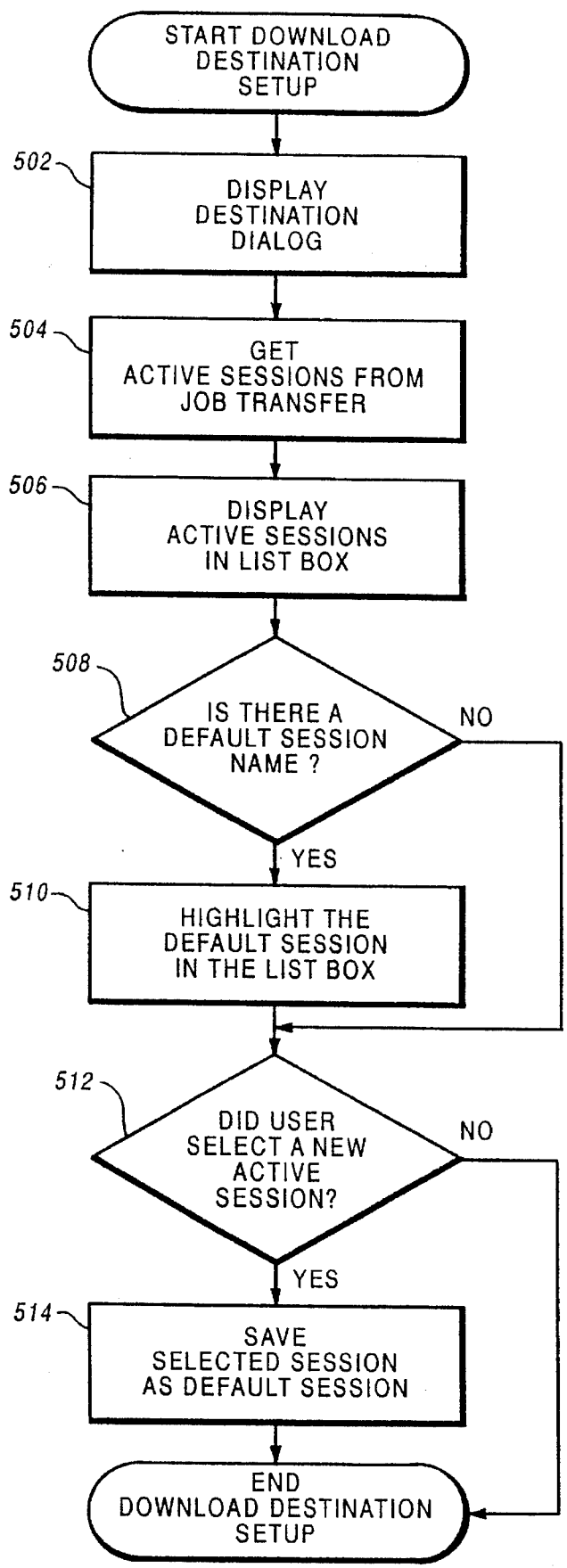
FIG. 15 is a flow chart illustrating a Download Destination Set Up routine of the program generator.

The microprocessor 19 is responsive to a download message selected from the main menu to operate in accordance with the flow chart depicted in FIG. 14. More particularly, the microprocessor 19 at a block 490 determines whether the message is the download set-up message and if so proceeds to block 492 to process the download destination set-up routine as illustrated in FIG. 15. If the microprocessor determines that the message was not the download set-up message, the microprocessor proceeds to block 494 to determine whether the message is a download application message. If the message is a download application message, the microprocessor proceeds to block 496 to download a specified application in accordance with the flow charts depicted in FIG. 16 and 17. If the microprocessor determines at a block 498 that the message is a download look-up file only message, the microprocessor proceeds to block 500 to download to a labeler 12 the look-up file only in accordance with the flow chart depicted in FIG. 18.

The microprocessor 19 processes a download setup message as shown in FIG. 15 by displaying at a block 502 information on the display 18 to prompt a user to select the particular communication port for the desired destination of the download, i.e. a particular labeler 12 by entering the logical name of the port, the logical names of the communication ports of the labeler 12 being depicted on the display 18. Thereafter, at a block 504, the microprocessor 19 calls the job transfer application 31 to get the active sessions, a session being a port monitoring process of the job transfer application 31. At a block 506 the microprocessor 19 displays the active sessions on the display 18 and proceeds to block 508 to determine whether the user has already selected a session. If so, the microprocessor proceeds to block 510 to highlight the selected session on the display 18. At a block 512 the microprocessor 19 determines whether the user has selected a new active session and if so, the microprocessor proceeds to block 514 to save the newly selected session as the default session referred to above in blocks 508 and 510.

Figure 16:
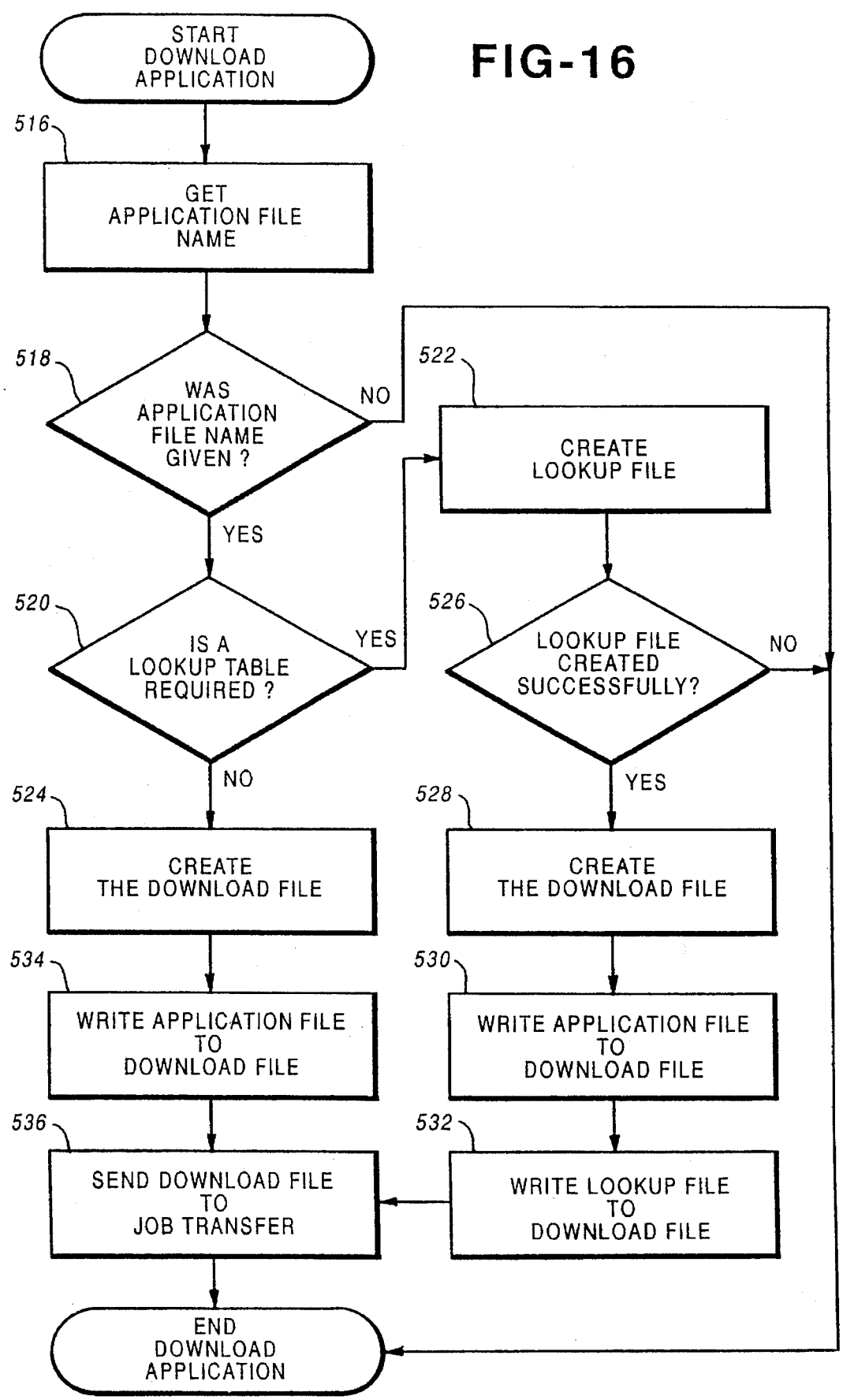
FIG. 16 is flow chart illustrating a Download Application routine of the program generator.

Once an application file has been compiled, a user can download the application file to the labeler 12 via the RS232 communication port by selecting the download application item from the download menu. In response thereto, the microprocessor 19 displays a list of all of the completed application files that have been generated. To prompt the user to select a particular application file to be downloaded, the microprocessor 19 as shown in FIG. 16, gets the application file name at a block 516 as selected by a user and thereafter proceeds to block 518. In response to the selection of an application file name as determined at block 518, the microprocessor proceeds to block 520 to determine whether a look-up table is required for the application file. If a look-up table is defined in the configuration records generated by the compiler, the microprocessor determines that a look-up table is required and proceeds to block 522 to create the look-up file as discussed in detail below with respect to FIG. 17. After implementing the flow chart depicted in FIG. 17, the microprocessor proceeds to block 526 to determine whether the lookup file was created successfully. If so, the microprocessor at a block 528 creates a download file and at block 530 the microprocessor 19 writes the application file to the download file. Thereafter, the microprocessor 19 at a block 532 writes the look-up file created at block 522 to the download file also. Next, the microprocessor proceeds to block 536 to send the download file to the job transfer application 31 for downloading to the labeler 12. If the microprocessor determines at block 520 that a look-up table is not required for the application file to be downloaded, the microprocessor proceeds to block 524 to create the download file for the application file only. More particularly, the microprocessor proceeds from block 524 to block 534 to write the application file to the download file and at block 536 the microprocessor 19 sends the download file to the job transfer application 31 for downloading to the labeler 12.

Figure 17:
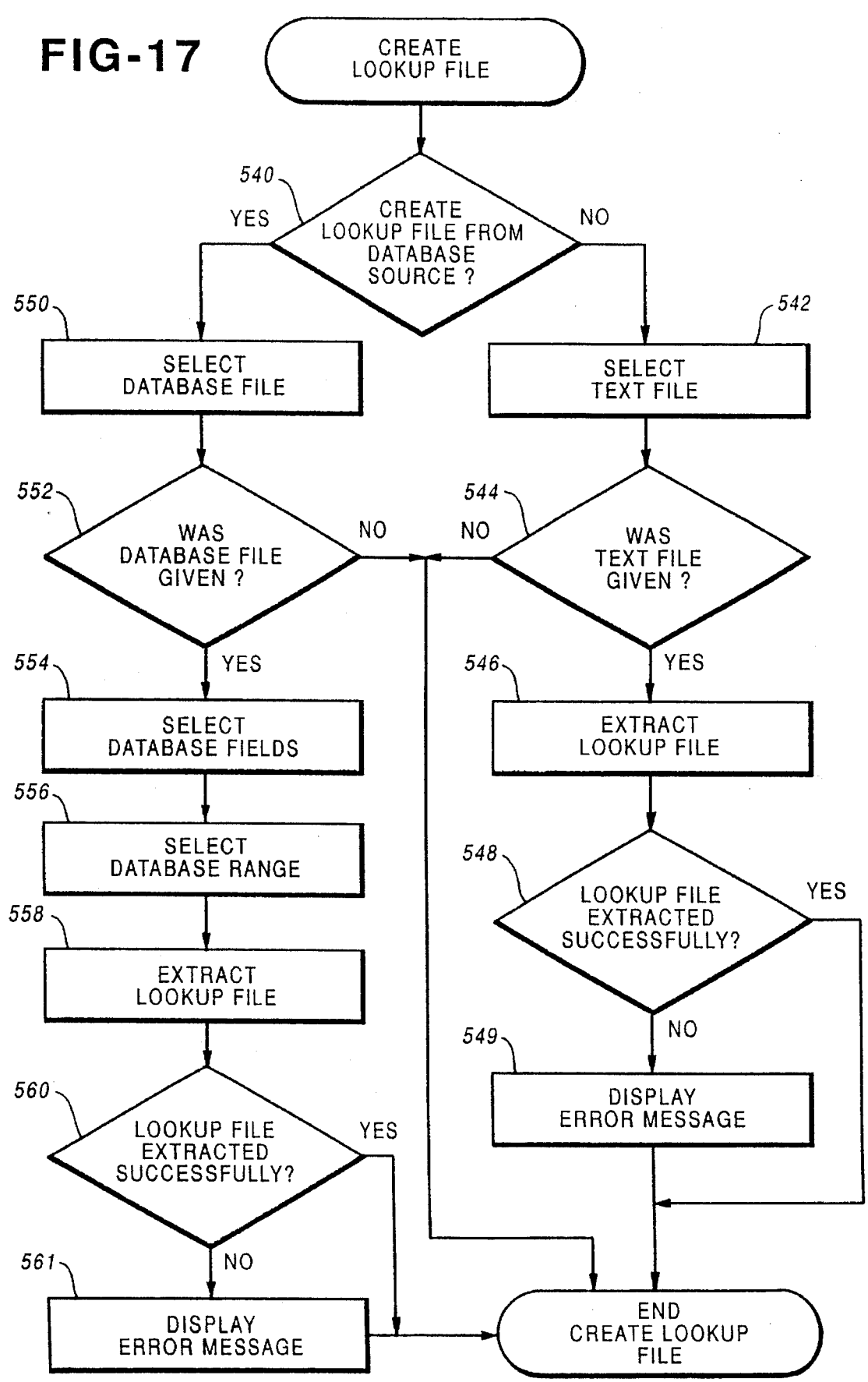
FIG. 17 is a flow chart illustrating a Create Look Up File routine of the program generator.

A look-up table is created by the microprocessor 19 in accordance with the flow chart depicted in FIG. 17. More particularly, the microprocessor 19 at a block 540 first determines whether the look-up file is to be created from a database source. If not, the microprocessor 19 controls the display 18 to depict previously created ASCII files so that the user can select a file from which the look-up table is extracted. At a block 544, the microprocessor determines whether a particular text file was selected by a user and if so, the microprocessor 19 proceeds to block 546 to extract the look-up file from the designated text file. Thereafter, the microprocessor 19 proceeds to block 548 to determine whether the look-up file was extracted successfully by comparing the look-up file to the look-up table definition to see whether it matches. If the look-up file was not extracted successfully, the microprocessor proceeds to block 549 to display an error message. If the microprocessor determines at the block 540 that the look-up file is to be created from fields selected from the database, the microprocessor proceeds to block 550 from block 540. At block 550, the microprocessor 19 controls the display 18 to display the available database files from which fields may be selected by the user to form a look-up table. At a block 552 the microprocessor 19 determines whether the user selected a particular database file and if so, the microprocessor proceeds to block 554. At block 554, the microprocessor 19 displays all of the fields in the selected database. The microprocessor 19 also controls the display 18 at block 554 to display a list of the look up table script fields that are specified in the look-up table definition from the configuration file. The look up table script fields are displayed in the same order as they were defined by the user in generating the script. This order also defines how the look-up table definition record is laid out and thus, how the look-up table records are to be ordered. Between the list of available fields in the database and the list of the look up table script fields is an initially empty box labeled look-up fields. As the user assigns a database field to each script field the look-up fields box is updated with the information so that the user can easily correlate and assign a particular database field to each script field. After the database fields have been selected, for each database field entered the user selects a database range to define the search criteria that is used to extract records from the selected database file for inclusion in the look-up table. For example, the user can instruct the microprocessor 19 to search all records of the selected database field that are greater than or greater than or equal to a particular value and/or that are less than or less than or equal to a particular value. Once the search range is selected, the microprocessor proceeds to block 558 to extract the records for the selected database field from the selected database file in accordance with the search criteria to thereby create the look up table. Thereafter, the microprocessor proceeds to block 560 to determine whether the look-up file was extracted successfully and if not, the microprocessor proceeds to block 561 to display an error message.

Figure 18:
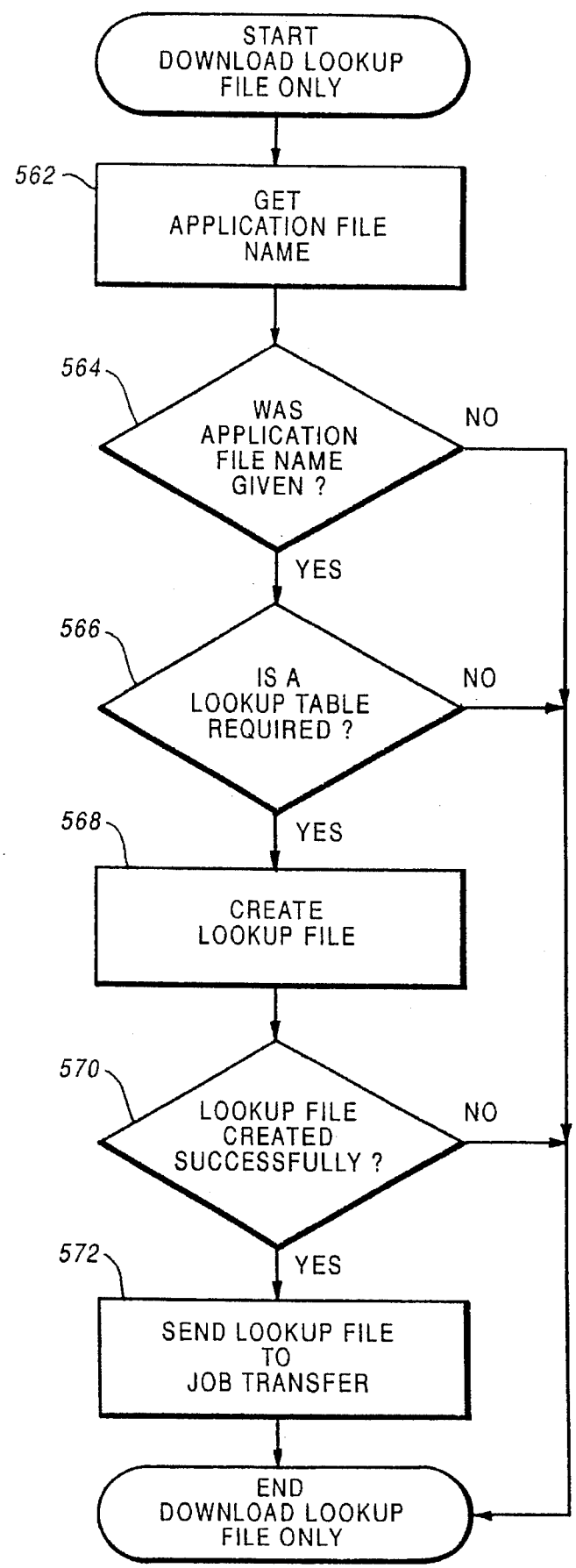
FIG. 18 is a flow chart illustrating a Download Look Up File Only routine of the program generator.

The microprocessor 19 is responsive to a download look-up file only message to operate in accordance with the flow chart depicted in. FIG. 18. More particularly, the microprocessor 19 at a block 562 displays a list of the names of the application files that have been compiled and proceeds to block 564 to determine whether the user has selected a particular application file name to which the lookup file to be downloaded is to be associated with. Once an application file name is selected by a user, the microprocessor 19 proceeds to block 566 to determine whether a look-up table is required for the selected application file. If so, the microprocessor proceeds to block 568 to create a look-up file as discussed above with respect to FIG. 17. The microprocessor thereafter determines at a block 570 whether the look-up file was created successfully and if so, the microprocessor 19 proceeds to block 572 to send only the look-up file to the job transfer application 31.

A sample script program with comments is illustrated in Appendix A. The sample script program illustrates how selected ones of the various commands are used to form a script program that is entered by a user. The microprocessor 19 as discussed above, is responsive to the entry of such a script program to validate each of the commands contained in the script program and to compile the program with the definitions of the various work buffers of the labeler 12 so as to generate an application file that can be downloaded to the labeler 12 and executed thereby to control label printing, data collection and data manipulation operations.

Many modifications and variations of the present invention are possible in light of the above teachings. Thus, it is to be understood that, within the scope of the appended claims, the invention may be practiced otherwise than as described hereinabove.

Application Example

```
;-----------------------------------------------------------
;            Sample script program
;-----------------------------------------------------------
;
; Header record buffer is:
DEFINE HEADER,Employee,        6,A
DEFINE HEADER,Store,           8,A
;
; Data Collect record buffer is:
DEFINE DATACOLLECT,SKU,        14,N
DEFINE DATACOLLECT,Quantity,3,N
;
; Temporary record buffer is:
DEFINE TEMPORARY,ErrorMsg,16,A
DEFINE TEMPORARY,PromptMsg,16,A
DEFINE TEMPORARY,MenuItem,1,A
DEFINE TEMPORARY,Sum1,8,N
;
; Lookup record buffer is:
DEFINE LOOKUP,LUItem,16,A
DEFINE LOOKUP,Location,10,A
DEFINE LOOKUP,QtyPrint,4,N
;
; Printer buffer is:
DEFINE PRINTER,P1,16
DEFINE PRINTER,P2,10
DEFINE PRINTER,P3,10
DEFINE PRINTER,P4,10
;
;-----------------------------------------------------------
;-----------------------------------------------------------
;   Start - Main program
;-----------------------------------------------------------
FUNCTION START
BEGIN
        CALL       Init                                         ; initialize ourselves
    *GetHeader
        CALL       GetEmpNumber                                 ; prompt for the employee number
        CALL       GetStoreNumber                               ; prompt for the store number
        WRITE      HEADER,,*GetFunction                         ; write header to DC file
        MOVE       "Memory full", ErrorMsg                      ; set the error message
        CALL       DisplayError                                 ; display the error message
        JUMP       *GetHeader                                   ; go back to beginning
    *GetFunction
        CALL       GetMenuItem                                  ; get the user's function
        COMPARE    "1",EQ, MenuItem, *GetFun1; check if function 1 was entered
        CALL       FuncEntry                                    ; perform the entry request
        JUMP       *GetFunction                                 ; get next user request
    *GetFun1
        COMPARE    "2",EQ, MenuItem, *GetFun2                   ; check if function 1 was entered
```

-continued

Application Example

```
            CALL        FuncLookup                      ; perform the entry request
            JUMP        *GetFunction                    ; get next user request
    *GetFun2
            JUMP        *GetHeader                      ; go back to operator prompt
END
;----------------------------------------------------------------
; Init - initialization routine
;----------------------------------------------------------------
FUNCTION Init
BEGIN
            CLEAR       Sum1                            ; set our sum counter to 0
END
;----------------------------------------------------------------
; FuncEntry - routine to perform data entry
;----------------------------------------------------------------
FUNCTION FuncEntry
BEGIN
            CALL        GetSKUNumber                    ; get the SKU number
            CALL        GetQty                          ; get the item quantity
            WRITE       DATACOLLECT,,*FCE1              ; write DC buffer to DC file
            RETURN
    *FCE1
            MOVE        "Memory full", ErrorMsg         ; set the error message
            CALL        DisplayError                    ; display the error message
END
;----------------------------------------------------------------
; FuncLookup - routine to perform data lookup
;----------------------------------------------------------------
FUNCTION FuncLookup
BEGIN
            CAll        GetLUItem                       ; prompt for the item to Lookup
            QUERY       LUItem,EQ,INPUT,,*FLU2          ; query for the item
            MOVE        "Item not found",ErrorMsg       ; set the error message
            CALL        DisplayError                    ; display the error to user
            RETURN                                      ; item wasn't found
    *FLU2
            READ        LOOKUP                          ; read the record into the buffer
            LOCATE      #1,#1                           ; set screen position
            MOVE        Location, DISPLAY               ; display LU field "location"
            GET         KEYBOARD,#0,#1                  ; pause until user ready
            MOVE        LUItem, P1                      ; move LU item ID to print
            MOVE        Location, P2                    ; move LU item location to print
            MOVE        QtyPrint, P3                    ; move LU item quantity to print
            ADD         Qtyprint, Sum1                  ; sum quantity printed
            MOVE        Sum1, P4                        ; move totat qty to print
            PRINT       #2,,,*FLU4                      ; print the data
            MOVE        "Printer Error",ErrorMsg        ; set error message
            CALL        DisplayError
    *FLU4
            CLEAR       PRINTER                         ; clear the print buffer
END
;----------------------------------------------------------------
; GetEmpNumber - Obtains the employee number
;----------------------------------------------------------------
FUNCTION GetEmpNumber
BEGIN
            MOVE        "Employee", PromptMsg           ; set the prompt message
            MOVE        "Invalid Number",ErrorMsg       ; set the error message
    *GEN1
            CALL        DisplayPrompt                   ; display the prompt message
            GET         KEYBOARD,#4,#6,,*GEN2           ; wait for user to enter number
            CALL        DisplayError                    ; display error message
            JUMP        *GEN1                           ; go reprompt for employee number
    *GEN2
            MOVE        INPUT, Employee                 ; save the employee number
END
;----------------------------------------------------------------
; GetStoreNumber - Obtains the store number
;----------------------------------------------------------------
FUNCTION GetStoreNumber
BEGIN
            MOVE        "Store:", PromptMsg             ; set the prompt message
            MOVE        "Invalid Store",ErrorMsg        ; set the error message
    *GSN1
            CALL        DisplayPrompt                   ; display the prompt message
            GET         KEYBOARD,#6,#8,,*GSN2           ; wait for user to enter number
            CALL        DisplayError                    ; display error message
```

Application Example

```
                JUMP        *GSN1                              ; go reprompt for store number
        *GSN2
                MOVE        INPUT, Store                       ; save the store number
        END
;----------------------------------------------------------------
; GetSKUNumber - Obtains the SKU number
;----------------------------------------------------------------
        FUNCTION GetSKUNumber
        BEGIN
                MOVE        "SKU:",PromptMsg                   ; set the prompt message
                MOVE        "InvaLid SKU",ErrorMsg             ; set the error message
        *GSK1
                CALL        DisplayPrompt                      ; display the prompt message
                SCANSET     #1,#1                              ; initialize scanner for UPCA
                GET         KEYBOARD,SCANNER,#12,#12,,*GSK2    ; wait for number entry
                CALL        DisplayError                       ; display error message
                JUMP        *GSK1                              ; go reprompt for SKU number
        *GSK2
                VALIDATE    INPUT,#15,,*GSK3                   ; check if UPCA number is correct
                CALL        DisplayError                       ; display error
                JUMP        *GSK1                              ; go reprompt for SKU number
        *GSK3
                MOVE        INPUT, SKU                         ; save the SKU number
        END
;----------------------------------------------------------------
; GetQty - Obtains the item quantity
;----------------------------------------------------------------
        FUNCTION GetQty
        BEGIN
                MOVE        "Quantity:", PromptMsg             ; set the prompt message
                MOVE        "Invalid Qty", ErrorMsg            ; set the error message
        *GQT1
                CALL        DisplayPrompt                      ; display the prompt message
                GET         KEYBOARD,#1,#3,,*GQT2              ; wait for user to enter number
                CALL        DisplayError                       ; display error message
                JUMP        *GQT1                              ; go reprompt for quantity number
        *GQT2
                MOVE        INPUT, Quantity                    ; save the quantity number
        END
;----------------------------------------------------------------
; GetMenuItem -.Obtains the user function
;----------------------------------------------------------------
        FUNCTION GetMenuItem
        BEGIN
                MOVE        "Data 2LU 3Exit",PromptMsg         ; set the prompt message
                MOVE        "Invalid Option",ErrorMsg          ; set the error message
        *GMI1
                CALL        DisplayPrompt                      ; display the prompt message
                GET         KEYBOARD,#1,#1,,*GMI2              ; wait for user to enter number
                CALL        DisplayError                       ; display error message
                JUMP        *GMI1                              ; go reprompt for store number
        GMI2
                MOVE        INPUT, MenuItem                    save the user's function
                COMPARE     "3",LE,MenuItem,,*GMI3             ; check for invalid function
                CALL        DisplayError                       ; display error message
                JUMP        *GMI1                              ; go reprompt for function
        *GMI3
        END
;----------------------------------------------------------------
; GetLUItem - Obtains the item to Lookup
;----------------------------------------------------------------
        FUNCTION GetLUItem
        BEGIN
                MOVE        "Lookup Item:",PromptMsg           ; set the prompt message
                MOVE        "Invalid item",ErrorMsg            ;set the error message
        GLI1
                CALL        DisplayPrompt                      ; display the prompt message
                GET         KEYBOARD,#12,#16,,*GLI2            ; wait for user to enter number
                CALL        DisplayError                       ; display error message
                JUMP        *GLI1                              ; go reprompt for Lookup Item number
        *GLI2
                MOVE        INPUT, LUItem                      ; save the Lookup Item number
        END
;----------------------------------------------------------------
; DisplayPrompt - common routine to display prompt
;----------------------------------------------------------------
        FUNCTION DisplayPrompt
```

-continued

| Application Example | | | |
|---|---|---|---|
| BEGIN | | | |
| | CLEAR | DISPLAY | ; clear the display |
| | LOCATE | #1,#1 | ; position to start of error |
| | MOVE | PromptMsg, DISPLAY | ; display prompt message |
| | LOCATE | #2,#1 | ; position to start of entry |
| END | | | |
| ;---------------------------------------------------------------- | | | |
| ;DisplayError - Common routine to display error | | | |
| ;---------------------------------------------------------------- | | | |
| FUNCTION DisplayError | | | |
| BEGIN | | | |
| | CLEAR | DISPLAY | ; clear the display |
| | LOCATE | #1,#1 | ; position to start of error |
| | MOVE | ErrorMsg, DISPLAY | ; display error message |
| | BEEP | | ; sound tone for half second |
| | LOCATE | #2,#1 | ; position to start of entry |
| | MOVE | "Press Enter", DISPLAY | ; display continuation message |
| | GET | KEYBOARD,#0,#1 | ; wait for user acknowledgment |
| END | | | |

We claim:

1. A label printing and data collection program generator for use in a processing system having a display, an input device actuable by a user to enter information, a memory for storing information and a processor coupled to the input device, display and memory, the processor operating in accordance with the program generator to generate a software program for a labeler, said label printing and data collection program generator comprising:

means when executed by said processor for storing a user entered sequence of commands selected from a set of allowable commands that control label printing, data collection and data manipulation operations of said labeler and commands that provide directives to said processor;

means when executed by said processor for validating a sequence of commands entered by said user, said validating means controlling said processor to compare each label printing, data collection or data manipulation command in said sequence to data representing said set of allowable commands to determine if said command is valid; and means when executed by said processor for translating said sequence of label printing and data collection commands to form an application program capable of being executed by said labeler to control at least one of a label printing operation, a data collection operation or a data manipulation operation.

2. A label printing and data collection program generator as recited in claim 1 wherein said set of allowable label printing, data collection and data manipulation commands includes a first command that requires a plurality of parameters to be entered in association with said first command and said validating means includes a first command validator executable by said processor for determining whether said parameters define an allowable label printing, data collection or data manipulation operation.

3. A label printing and data collection program generator as recited in claim 1 wherein said allowable label printing, data collection and data manipulation commands includes a first command that requires a plurality of parameters to be entered in association with said first command, and said validating means includes a first command validator executable by said processor for counting the number of parameters entered in association with a first command to determine whether said counted number is allowable.

4. A label printing and data collection program generator as recited in claim 1 wherein said set of allowable commands includes a command for defining a work buffer of said labeler to be used by said labeler in performing a data manipulation operation, said translating means being responsive to said work buffer definition command to build a record for said labeler to configure said labeler to have the defined work buffer.

5. A label printing and data collection program generator as recited in claim 4 wherein said set of allowable commands includes a data manipulation command that requires the identity of a work buffer to be entered in association with the command and said validating means includes a buffer validator executable by said processor to determine whether a work buffer identified in a data manipulation command is defined in a work buffer definition command.

6. A label printing and data collection program generator as recited in claim 1 further including means responsive to said validating means for generating an error message identifying the errors in an entered sequence of commands that does not validate.

7. A label printing and data collection program generator as recited in claim 6 wherein said error message generating means generates an error message identifying each command in said sequence that does not validate and the type of error in said command that is preventing the command from being validated.

8. A label printing and data collection program generator as recited in claim 1 wherein said translating means is responsive to a directive command that identifies a second sequence of commands that is stored in said memory and that is to be included in said application program, to insert into said application program at a location indicated by the position of said directive command in said user entered sequence of commands, a copy of said second sequence of commands.

9. A label printing and data collection program generator as recited in claim 1 wherein said translating means is responsive to a directive command, that identifies a stored print format file having at least one print format therein that defines the layout of information to be printed on a label, to associate with said application program being generated a copy of said identified print format file.

10. A label printing and data collection program generator as recited in claim 1 further including means for allowing a user to edit a sequence of commands, said editing means operating independently of said translating means.

11. A label printing and data collection program generator as recited in claim 1 wherein said memory stores a database including a plurality of data fields with associated data records and said translating means includes means for determining from a sequence of commands whether the application program generated from said sequence requires a look up table, means responsive to a determination that a look up table is required for prompting a user via said display to enter information defining database search criteria, and means responsive to entered search information to search said database for data records falling within said search criteria and to extract said data records from said database to create said required look up table.

12. A label printing and data collection program generator for a processing system as recited in claim 11 wherein said data base is formed from data collected by said labeler.

13. A label printing and data collection program generator for a processing system having a display, an input device actuable by a user to enter information, a memory for storing information and a processor coupled to the input device, display and memory, the processor operating in accordance with the program generator to generate a software program for a labeler, said label printing and data collection program generator comprising:

means when executed by said processor for storing a user entered first sequence of commands selected from a set of commands that control label printing, data collection and data manipulation operations and commands that provide directives to said processor; and means when executed by said processor for translating said sequence of commands to form an application program capable of being executed by said labeler to control at least one of a label printing operation, a data collection operation or a data manipulation operation, said translating means being responsive to a directive command that identifies a second sequence of commands that is stored in said memory and that is to be included in said application program, to insert into said application program at a location indicated by the position of said directive command in said user entered sequence of commands, a copy of said second sequence of commands.

14. A label printing and data collection program generator as recited in claim 13 wherein said translating means includes means for validating each of said label printing, data collection and data manipulation commands of said sequence to determine whether said commands define allowable label printing, data collection and data manipulation operations.

15. A label printing and data collection program generator as recited in claim 13 wherein said translating means is responsive to a directive command, that identifies a stored print format file having at least one print format therein that defines the layout of information to be printed on a label, to associate with said application program being generated a copy of said identified print format file.

16. A label printing and data collection program generator as recited in claim 13 further including means for allowing a user to edit a sequence of commands, said editing means operating independently of said translating means.

17. A label printing and data collection program generator as recited in claim 13 wherein said memory stores a database including a plurality of data fields with associated data records and said translating means includes means for determining from a sequence of commands whether the application program generated from said sequence requires a look up table, means responsive to a determination that a look up table is required for prompting a user via said display to enter information defining database search criteria, and means responsive to entered search information to search said database for data records falling within said search criteria and to extract said data records from said database to create said required look up table.

18. A label printing and data collection program generator for a processing system as recited in claim 17 wherein said data base is formed from data collected by said labeler.

19. A label printing and data collection program generator for a processing system having a display, an input device actuable by a user to enter information, a memory for storing information and a processor coupled to the input device, display and memory, the processor operating in accordance with the program generator to generate a software program for a labeler, said label printing and data collection program generator comprising:

means when executed by said processor for storing in a file in said memory a sequence of user entered commands selected from a set of commands that control label printing, data collection and data manipulation operations;

means when executed by said processor for editing said file of commands in response to user entered information; and means when executed by said processor for translating said sequence of commands to form an application program capable of being executed by said labeler to control at least one of a label printing operation, a data collection operation or a data manipulation operation, said editing means operating independently of said translating means.

20. A label printing and data collection program generator for a processing system having a display, an input device actuable by a user to enter information, a memory having a database stored therein, said database including a plurality of data fields with associated data records and said processing system having a processor coupled to the input device, display and memory, the processor operating in accordance with the program generator to generate a software program for a labeler, said label printing and data collection program generator comprising:

means when executed by said processor for storing a user entered sequence of commands selected from a set of command that control label printing, data collection and data manipulation operations; and means when executed by said processor for translating said sequence of commands to form an application program capable of being executed by said labeler to control at least one of a label printing operation, a data collection operation or a data manipulation operation, said translating means including means responsive to an entered sequence of commands to determine whether said application program requires a look up table; means responsive to a determination that an application program requires a look up table for prompting a user to enter information defining a database search criteria; and means responsive to entered search information to search said database for data records falling within said search criteria and to extract said data records from said database to create said required look up table.

21. A label printing and data collection program generator for a processing system as recited in claim 20 wherein said data base is formed from data collected by said labeler.

22. A bar code printing and data collection program generator for use in a processing system having a display, an input device actuable by a user to enter information, a memory for storing information and a processor coupled to the input device, display and memory, the processor operating in accordance with the program generator to generate a software program for a bar code printer, said printing and data collection program generator comprising:

means when executed by said processor for storing a user entered sequence of commands selected from a set of allowable commands that control printing, data collection and data manipulation operations of said bar code printer and commands that provide directives to said processor;

means when executed by said processor for validating a sequence of commands entered by said user, said validating means controlling said processor to compare each printing, data collection or data manipulation command in said sequence to data representing said set of allowable commands to determine if said command is valid; and means when executed by said processor for translating said sequence of printing and data collection commands to form an application program capable of being executed by said bar code printer to control at least one of a printing operation, a data collection operation or a data manipulation operation.

23. A printing and data collection program generator as recited in claim 22 wherein said set of allowable printing, data collection and data manipulation commands includes a first command that requires a plurality of parameters to be entered in association with said first command and said validating means includes a first command validator executable by said processor for determining whether said parameters define an allowable printing, data collection or data manipulation operation.

24. A printing and data collection program generator as recited in claim 22 wherein said allowable printing, data collection and data manipulation commands includes a first command that requires a plurality of parameters to be entered in association with said first command, and said validating means includes a first command validator executable by said processor for counting the number of parameters entered in association with a first command to determine whether said counted number is allowable.

25. A printing and data collection program generator as recited in claim 22 wherein said set of allowable commands includes a command for defining a work buffer of said bar code printer to be used by said printer in performing a data manipulation operation, said translating means being responsive to said work buffer definition command to build a record for said printer to configure said bar code printer to have the defined work buffer.

26. A printing and data collection program generator as recited in claim 25 wherein said set of allowable commands includes a data manipulation command that requires the identity of a work buffer to be entered in association with the command and said validating means includes a buffer validator executable by said processor to determine whether a work buffer identified in a data manipulation command is defined in a work buffer definition command.

27. A printing and data collection program generator as recited in claim 22 further including means responsive to said validating means for generating an error message identifying the errors in an entered sequence of commands that does not validate.

28. A printing and data collection program generator as recited in claim 27 wherein said error message generating means generates an error message identifying each command in said sequence that does not validate and the type of error in said command that is preventing the command from being validated.

29. A printing and data collection program generator as recited in claim 22 wherein said translating means is responsive to a directive command that identifies a second sequence of commands that is stored in said memory and that is to be included in said application program, to insert into said application program at a location indicated by the position of said directive command in said user entered sequence of commands, a copy of said second sequence of commands.

30. A printing and data collection program generator as recited in claim 22 wherein said translating means is responsive to a directive command, that identifies a stored print format file having at least one print format therein that defines the layout of information to be printed on a label, to associate with said application program being generated a copy of said identified print format file.

31. A printing and data collection program generator as recited in claim 22 further including means for allowing a user to edit a sequence of commands, said editing means operating independently of said translating means.

32. A printing and data collection program generator as recited in claim 22 wherein said memory stores a database including a plurality of data fields with associated data records and said translating means includes means for determining from a sequence of commands whether the application program generated from said sequence requires a look up table, means responsive to a determination that a look up table is required for prompting a user via said display to enter information defining database search criteria, and means responsive to entered search information to search said database for data records falling within said search criteria and to extract said data records from said database to create said required look up table.

33. A printing and data collection program generator for a processing system as recited in claim 32 wherein said database is formed from data collected by said bar code printer.

34. A printing and data collection program generator for a processing system having a display, an input device actuable by a user to enter information, a memory for storing information and a processor coupled to the input device, display and memory, the processor operating in accordance with the program generator to generate a software program for a bar code printer, said printing and data collection program generator comprising:

means when executed by said processor for storing a user entered first sequence of commands selected from a set of commands that control printing, data collection and data manipulation operations of said bar code printer and commands that provide directives to said processor; and means when executed by said processor for translating said sequence of commands to form an application program capable of being executed by said bar code printer to control at least one of a printing operation, a data collection operation or a data manipulation operation, said translating means being responsive to a directive command that identifies a second sequence of commands that is stored in said memory and that is to be included in said application program, to insert into said application program at a location indicated by the position of said directive command in said user entered sequence of commands, a copy of said second sequence of commands.

35. A printing and data collection program generator as recited in claim 34 wherein said translating means is responsive to a directive command, that identifies a stored print format file having at least one print format therein that defines the layout of information to be printed on a label, to associate with said application program being generated a copy of said identified print format file.

36. A printing and data collection program generator for a processing system having a display, an input device actuable by a user to enter information, a memory for storing information and a processor coupled to the input device, display and memory, the processor operating in accordance with the program generator to generate a software program for a bar code printer, said printing and data collection program generator comprising:

means when executed by said processor for storing in a file in said memory a sequence of user entered commands selected from a set of commands that control printing, data collection and data manipulation operations of said bar code printer;

means when executed by said processor for editing said file of commands in response to user entered information; and means when executed by said processor for translating said sequence of commands to form an application program capable of being executed by said bar code printer to control at least one of a printing operation, a data collection operation or a data manipulation operation, said editing means operating independently of said translating means.

37. A printing and data collection program generator for a processing system having a display, an input device actuable by a user to enter information, a memory having a database stored therein, said database including a plurality of data fields with associated data records and said processing system having a processor coupled to the input device, display and memory, the processor operating in accordance with the program generator to generate a software program for a bar code printer, said printing and data collection program generator comprising:

means when executed by said processor for storing a user entered sequence of commands selected from a set of command that control printing, data collection and data manipulation operations; and means when executed by said processor for translating said sequence of commands to form an application program capable of being executed by said bar code printer to control at least one of a printing operation, a data collection operation or a data manipulation operation, said translating means being responsive to an entered sequence of commands to determine whether said application program requires a look up table, said translating means being responsive to a determination that an application program requires a look up table for prompting a user to enter information defining a database search criteria, and said translating means being responsive to entered search information to search said database for data records falling within said search criteria and to extract said data records from said database to create said required look up table.

38. A printing and data collection program generator for a processing system as recited in claim 37 wherein said data base is formed from data collected by said bar code printer.

* * * * *

UNITED STATES PATENT AND TRADEMARK OFFICE
CERTIFICATE OF CORRECTION

PATENT NO.: 5,467,433
DATED: November 14, 1995
INVENTOR(S): Lamprecht, Jr., et al.

It is certified that error appears in the above-identified patent and that said Letters Patent is hereby corrected as shown below:

IN THE CLAIMS:

Claim 1, col. 29, line 47, delete "an application program" and insert -- a software application program -- therefor.

Claim 8, col. 30, lines 54 and 55, delete "application program" and insert -- software application program -- therefor.

Claim 9, col. 30, line 64, delete "application program" and insert -- software application program -- therefor.

Claim 13, col. 31, line 33, delete "an application program" and insert -- a software application program -- therefor.

Claim 13, col. 31, line 40, delete "application program" and insert -- software application program -- therefor.

Claim 15, col. 31, line 57, delete "application program" and insert -- software application program -- therefor.

Claim 17, col. 32, line 1, delete "application program" and insert -- software application program -- therefor.

Claim 19, col. 32, line 30, delete "an application program" and insert -- a software application program -- therefor.

Claim 20, col. 32, line 48, delete "command" and insert -- commands -- therefor.

UNITED STATES PATENT AND TRADEMARK OFFICE
CERTIFICATE OF CORRECTION

PATENT NO.: 5,467,433
DATED: November 14, 1995
INVENTOR(S): Lamprecht, et al.

It is certified that error appears in the above-identified patent and that said Letters Patent is hereby corrected as shown below:

Claim 20, col. 32, line 51, delete "an application program" and insert -- a software application program -- therefor.

Claim 20, col. 32, line 57, delete "application program" and insert -- software application program -- therefor.

Claim 22, col. 33, line 25, delete "an application program" and insert -- a software application program -- therefor.

Claim 23, col. 33, line 29, delete "A printing" and insert -- A bar code printing -- therefor.

Claim 24, col. 33, line 38, delete "A printing" and insert -- A bar code printing -- therefor.

Claim 25, col. 33, line 47, delete "A printing" and insert -- A bar code printing -- therefor.

Claim 26, col. 33, line 55, delete "A printing" and insert -- A bar code printing -- therefor.

Claim 27, col. 33, line 63, delete "A printing" and insert -- A bar code printing -- therefor.

Claim 28, col. 34, line 1, delete "A printing" and insert -- A bar code printing -- therefor.

UNITED STATES PATENT AND TRADEMARK OFFICE
CERTIFICATE OF CORRECTION

PATENT NO.: 5,467,433
DATED: November 14, 1995
INVENTOR(S): Lamprecht, Jr. et al.

It is certified that error appears in the above-identified patent and that said Letters Patent is hereby corrected as shown below:

Claim 29, col. 34, line 7, delete "A printing" and insert -- A bar code printing -- therefor.

Claim 29, col. 34, lines 11 and 12, delete "application program" and insert -- software application program -- therefor.

Claim 30, col. 34, line 16, delete "A printing" and insert -- A bar code printing -- therefor.

Claim 30, col. 34, line 21, delete "application program" and insert -- software application program -- therefor.

Claim 31, col. 34, line 23, delete "A printing" and insert -- A bar code printing -- therefor.

Claim 32, col. 34, line 27, delete "A printing" and insert -- A bar code printing -- therefor.

Claim 32, col. 34, line 31, delete "the application program" and insert -- the software application program -- therefor.

Claim 33, col. 34, line 40, delete "A printing" and insert -- A bar code printing -- therefor.

Claim 34, col. 34, line 44, delete "A printing" and insert -- A bar code printing -- therefor.

Claim 34, col. 34, line 59, delete "an application program" and insert -- a software application program -- therefor.

UNITED STATES PATENT AND TRADEMARK OFFICE
CERTIFICATE OF CORRECTION

PATENT NO. : 5,467,433
DATED: November 14, 1995
INVENTOR(S): Lamprecht, Jr. et al.

It is certified that error appears in the above-identified patent and that said Letters Patent is hereby corrected as shown below:

Claim 34, col. 34, line 66, delete "application program" and insert -- software application program -- therefor.

Claim 35, col. 35, line 4, delete "A printing" and insert -- A bar code printing -- therefor.

Claim 35, col. 35 line 9, delete "application program" and insert -- software application program -- therefor.

Claim 36, col. 35, line 11, delete "A printing" and insert -- A bar code printing -- therefor.

Claim 36, col. 35, line 29, delete "an application program" and insert -- a software application program -- therefor.

Claim 37, col. 35, line 35, delete "A printing" and insert -- A bar code printing -- therefor.

Claim 37, col. 36, line 12, delete "command" and insert -- commands -- therefor.

Claim 37, col. 36, line 16, delete "an application program" and insert -- a software application program -- therefor.

UNITED STATES PATENT AND TRADEMARK OFFICE
CERTIFICATE OF CORRECTION

PATENT NO. : 5,467,433
DATED : November 14, 1995
INVENTOR(S) : Lamprecht, Jr. et al.

It is certified that error appears in the above-identified patent and that said Letters Patent is hereby corrected as shown below:

Claim 37, col. 36, line 22, delete "application program" and insert -- software application program -- therefor.

Claim 38, col. 36, line 31, delete "A printing" and insert -- A bar code printing -- therefor.

Signed and Sealed this

Seventh Day of April, 1998

Attest:

BRUCE LEHMAN

*Attesting Officer*  *Commissioner of Patents and Trademarks*